INVENTOR
WILLIAM P. BYRNES

BY Emery Robinson
ATTORNEY

March 8, 1960 W. P. BYRNES 2,927,960

TELEGRAPH SYSTEM

Filed March 29, 1956 30 Sheets-Sheet 2

INVENTOR
WILLIAM P. BYRNES

BY Emery Robinson
ATTORNEY

TELEGRAPH SYSTEM

Filed March 29, 1956 30 Sheets-Sheet 3

INVENTOR
WILLIAM P. BYRNES
BY Emery Robinson
ATTORNEY

March 8, 1960 W. P. BYRNES 2,927,960

TELEGRAPH SYSTEM

Filed March 29, 1956 30 Sheets-Sheet 4

INVENTOR
WILLIAM P. BYRNES

BY Emery Robinson

ATTORNET

March 8, 1960 W. P. BYRNES 2,927,960

TELEGRAPH SYSTEM

Filed March 29, 1956 30 Sheets-Sheet 5

INVENTOR
WILLIAM P. BYRNES

BY Emery Robinson
ATTORNEY

| | 6 | 5 | 4 | 3 | 2 | 1 | |
|---|---|---|---|---|---|---|---|
| 0 | 0 | 0 | 0 | 0 | 0 | 0 | BLANK * |
| 1 | 0 | 0 | 0 | 0 | 0 | 1 | E |
| 2 | 0 | 0 | 0 | 0 | 1 | 0 | L.F. * |
| 3 | 0 | 0 | 0 | 0 | 1 | 1 | A |
| 4 | 0 | 0 | 0 | 1 | 0 | 0 | SPACE * |
| 5 | 0 | 0 | 0 | 1 | 0 | 1 | S |
| 6 | 0 | 0 | 0 | 1 | 1 | 0 | I |
| 7 | 0 | 0 | 0 | 1 | 1 | 1 | U |
| 8 | 0 | 0 | 1 | 0 | 0 | 0 | C.R. * |
| 9 | 0 | 0 | 1 | 0 | 0 | 1 | D |
| 10 | 0 | 0 | 1 | 0 | 1 | 0 | R |
| 11 | 0 | 0 | 1 | 0 | 1 | 1 | J |
| 12 | 0 | 0 | 1 | 1 | 0 | 0 | N |
| 13 | 0 | 0 | 1 | 1 | 0 | 1 | F |
| 14 | 0 | 0 | 1 | 1 | 1 | 0 | C |
| 15 | 0 | 0 | 1 | 1 | 1 | 1 | K |
| 16 | 0 | 1 | 0 | 0 | 0 | 0 | T |
| 17 | 0 | 1 | 0 | 0 | 0 | 1 | Z |
| 18 | 0 | 1 | 0 | 0 | 1 | 0 | L |
| 19 | 0 | 1 | 0 | 0 | 1 | 1 | W |
| 20 | 0 | 1 | 0 | 1 | 0 | 0 | H |
| 21 | 0 | 1 | 0 | 1 | 0 | 1 | Y |
| 22 | 0 | 1 | 0 | 1 | 1 | 0 | P |
| 23 | 0 | 1 | 0 | 1 | 1 | 1 | Q |
| 24 | 0 | 1 | 1 | 0 | 0 | 0 | O |
| 25 | 0 | 1 | 1 | 0 | 0 | 1 | B |
| 26 | 0 | 1 | 1 | 0 | 1 | 0 | G |
| 27 | 0 | 1 | 1 | 0 | 1 | 1 | FIGURES * |
| 28 | 0 | 1 | 1 | 1 | 0 | 0 | M |
| 29 | 0 | 1 | 1 | 1 | 0 | 1 | X |
| 30 | 0 | 1 | 1 | 1 | 1 | 0 | V |
| 31 | 0 | 1 | 1 | 1 | 1 | 1 | LETTERS * |

FIG. 7

| | 6 | 5 | 4 | 3 | 2 | 1 | |
|---|---|---|---|---|---|---|---|
| 32 | 1 | 0 | 0 | 0 | 0 | 0 | |
| 33 | 1 | 0 | 0 | 0 | 0 | 1 | 3 |
| 34 | 1 | 0 | 0 | 0 | 1 | 0 | * |
| 35 | 1 | 0 | 0 | 0 | 1 | 1 | – |
| 36 | 1 | 0 | 0 | 1 | 0 | 0 | * |
| 37 | 1 | 0 | 0 | 1 | 0 | 1 | BELL * |
| 38 | 1 | 0 | 0 | 1 | 1 | 0 | 8 |
| 39 | 1 | 0 | 0 | 1 | 1 | 1 | 7 |
| 40 | 1 | 0 | 1 | 0 | 0 | 0 | * |
| 41 | 1 | 0 | 1 | 0 | 0 | 1 | S |
| 42 | 1 | 0 | 1 | 0 | 1 | 0 | 4 |
| 43 | 1 | 0 | 1 | 0 | 1 | 1 | ' |
| 44 | 1 | 0 | 1 | 1 | 0 | 0 | , |
| 45 | 1 | 0 | 1 | 1 | 0 | 1 | ! |
| 46 | 1 | 0 | 1 | 1 | 1 | 0 | : |
| 47 | 1 | 0 | 1 | 1 | 1 | 1 | ( |
| 48 | 1 | 1 | 0 | 0 | 0 | 0 | 5 |
| 49 | 1 | 1 | 0 | 0 | 0 | 1 | " |
| 50 | 1 | 1 | 0 | 0 | 1 | 0 | ) |
| 51 | 1 | 1 | 0 | 0 | 1 | 1 | 2 |
| 52 | 1 | 1 | 0 | 1 | 0 | 0 | MOTOR·STOP |
| 53 | 1 | 1 | 0 | 1 | 0 | 1 | 6 |
| 54 | 1 | 1 | 0 | 1 | 1 | 0 | Ø |
| 55 | 1 | 1 | 0 | 1 | 1 | 1 | 1 |
| 56 | 1 | 1 | 1 | 0 | 0 | 0 | 9 |
| 57 | 1 | 1 | 1 | 0 | 0 | 1 | ? |
| 58 | 1 | 1 | 1 | 0 | 1 | 0 | & |
| 59 | 1 | 1 | 1 | 0 | 1 | 1 | * |
| 60 | 1 | 1 | 1 | 1 | 0 | 0 | . |
| 61 | 1 | 1 | 1 | 1 | 0 | 1 | / |
| 62 | 1 | 1 | 1 | 1 | 1 | 0 | ; |
| 63 | 1 | 1 | 1 | 1 | 1 | 1 | |

FIG. 7A

* THESE CHARACTERS DO NOT HAVE SPACES ON THE TYPE WHEEL

INVENTOR
WILLIAM P. BYRNES
BY Emery Robinson
ATTORNEY

March 8, 1960 W. P. BYRNES 2,927,960

TELEGRAPH SYSTEM

Filed March 29, 1956 30 Sheets-Sheet 7

INVENTOR
WILLIAM P. BYRNES

BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

March 8, 1960 W. P. BYRNES 2,927,960
TELEGRAPH SYSTEM
Filed March 29, 1956 30 Sheets-Sheet 10

INVENTOR
WILLIAM P. BYRNES
BY Emery Robinson
ATTORNEY

INVENTOR
WILLIAM P. BYRNES

BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

| FIG. 18 | FIG. 19 | FIG. 20 |
|---|---|---|

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

March 8, 1960 W. P. BYRNES 2,927,960

TELEGRAPH SYSTEM

Filed March 29, 1956 30 Sheets-Sheet 23

INVENTOR
WILLIAM P. BYRNES
BY Emery Robinson
ATTORNEY

INVENTOR
WILLIAM P. BYRNES

BY Emery Robinson
ATTORNEY

INVENTOR
WILLIAM P. BYRNES
BY Emery Robinson
ATTORNEY

INVENTOR
WILLIAM P. BYRNES
BY Emery Robinson
ATTORNEY

INVENTOR
WILLIAM P. BYRNES

BY Emery Robinson
ATTORNEY

INVENTOR
WILLIAM P. BYRNES
BY Emery Robinson
ATTORNEY

March 8, 1960 W. P. BYRNES 2,927,960

TELEGRAPH SYSTEM

Filed March 29, 1956 30 Sheets-Sheet 29

INVENTOR
WILLIAM P. BYRNES

BY Emery Robinson
ATTORNEY

March 8, 1960 W. P. BYRNES 2,927,960

TELEGRAPH SYSTEM

Filed March 29, 1956 30 Sheets-Sheet 30

| FIG. 36 | FIG. 37 | FIG. 38 |
| --- | --- | --- |

INVENTOR
WILLIAM P. BYRNES

BY Emery Robinson
ATTORNEY 2,927,960
Patented Mar. 8, 1960

2,927,960

TELEGRAPH SYSTEM

William Patrick Byrnes, Glenview, Ill., assignor to Teletype Corporation, Chicago, Ill., a corporation of Delaware Application March 29, 1956, Serial No. 574,655

44 Claims. (Cl. 178—23)

This invention relates to printing telegraph systems and more particularly to such systems utilizing electronic facilities to attain very high speed operation.

With the trend toward higher speed operation, it becomes necessary to provide apparatus and systems which will operate at higher speeds and which will not have a limiting maximum speed that is relatively low. Therefore, the system according to the present invention provides facilities, both electronic and mechanical, which are instrumental conjointly in producing a degree of high speed operation not heretofore attained.

Briefly, according to the invention, the transmitting station comprises a keyboard which upon the depression of a keylever closes a contact to complete a circuit which, through a 32 to 5 diode converter, eventuates in five parallel code impulse circuits, which in turn, together with a control impulse circuit also controlled by the keyboard, are directed to the electronic transmitting distributor unit, which performs a parallel to serial conversion and adds the start and stop impulses, before transmission over the signal line. The receiving distributor accepts the serial start-stop signal from the transmitter and converts it back into a parallel (or five-wire) code combination after the start and stop impulses have been deleted. This parallel (five-wire) signal is then fed to the storage and control units which (1) recognize functions and (2) cooperate with the printing unit to select the character to be printed. Printing is accomplished "on-the-fly" with seventy-eight continuously rotating type wheels and seventy-eight print hammers for production of a line with a maximum of seventy-eight characters. Each print hammer mechanism is tripped by its respective electromagnet which is energized at the right time by the storage and control units. The hammer is propelled against the rotating type wheel by a motor in a regenerative action that provides close timing and thus, accurate registration of the printed character. The basic operating speed of the printing mechanism is 250 words per minute. Three separate storage positions enable the printing of three characters in one revolution of the type wheels, thereby providing a maximum speed of 750 words per minute. Obviously, the inclusion of additional storage positions would permit corresponding increases in speed above this rate.

A primary object of the invention is to provide a printing telegraph system wherein electronic and mechanical facilities are coordinated for achieving very high speed operation.

Another object of the invention is to provide a typewheel page printer having novel features which are conducive to very high speed recordation.

Another object of the invention is to provide electronic and mechanical facilities for accurately controlling the timing of the print hammer blow with respect to the arrival of the selected character at the printing point.

A further object of the invention is to provide electronic means for controlling the delivery of the printing pulse to the print magnets at the precise moment to effect printing of the selected character.

Another object of the invention is to provide means under the control of the printer for informing the control circuit, at every instant, of the angular positionment of the typewheel so as to enable the control circuit to properly time the operation of the print hammer with respect to the constantly rotating typewheel.

A still further object of the invention is to provide a binary counter unit to electronically inform the storage and character recognition unit as to which character on the typewheel is at the printing point.

Still another object of the invention is to provide a magnetic pickup device associated with the typewheel shaft to generate synchronizing pulses to operate the binary counter unit.

Other objects, features, and advantages of the invention, although not specifically recited above, will appear as the invention is described in detail.

A more thorough understanding of the invention may be had by reference to the following description when read in conjunction with the drawings, wherein:

Figs. 7 and 7A illustrate the binary counter combinations and corresponding characters;

Figure 14:
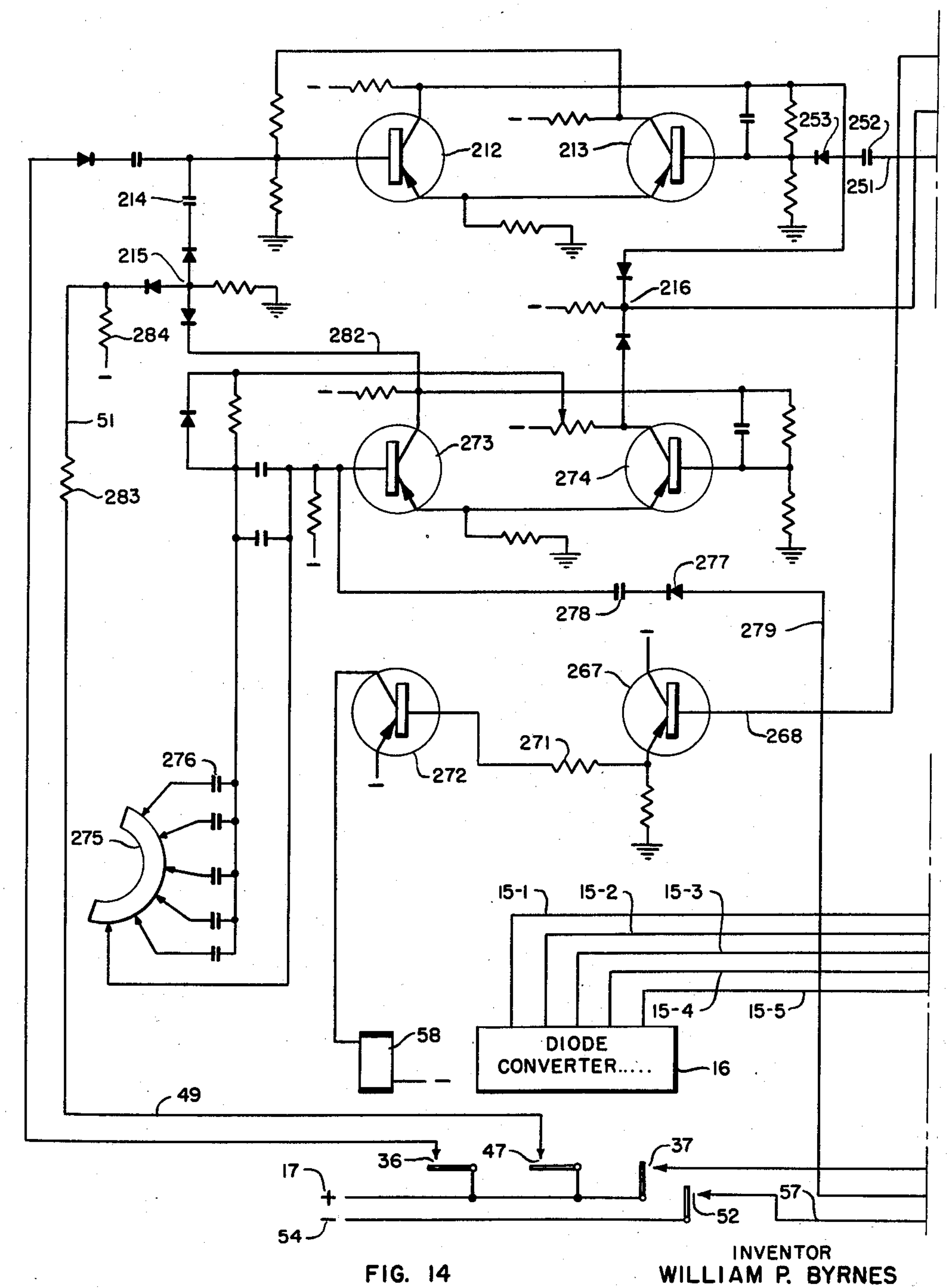
Figure 15:
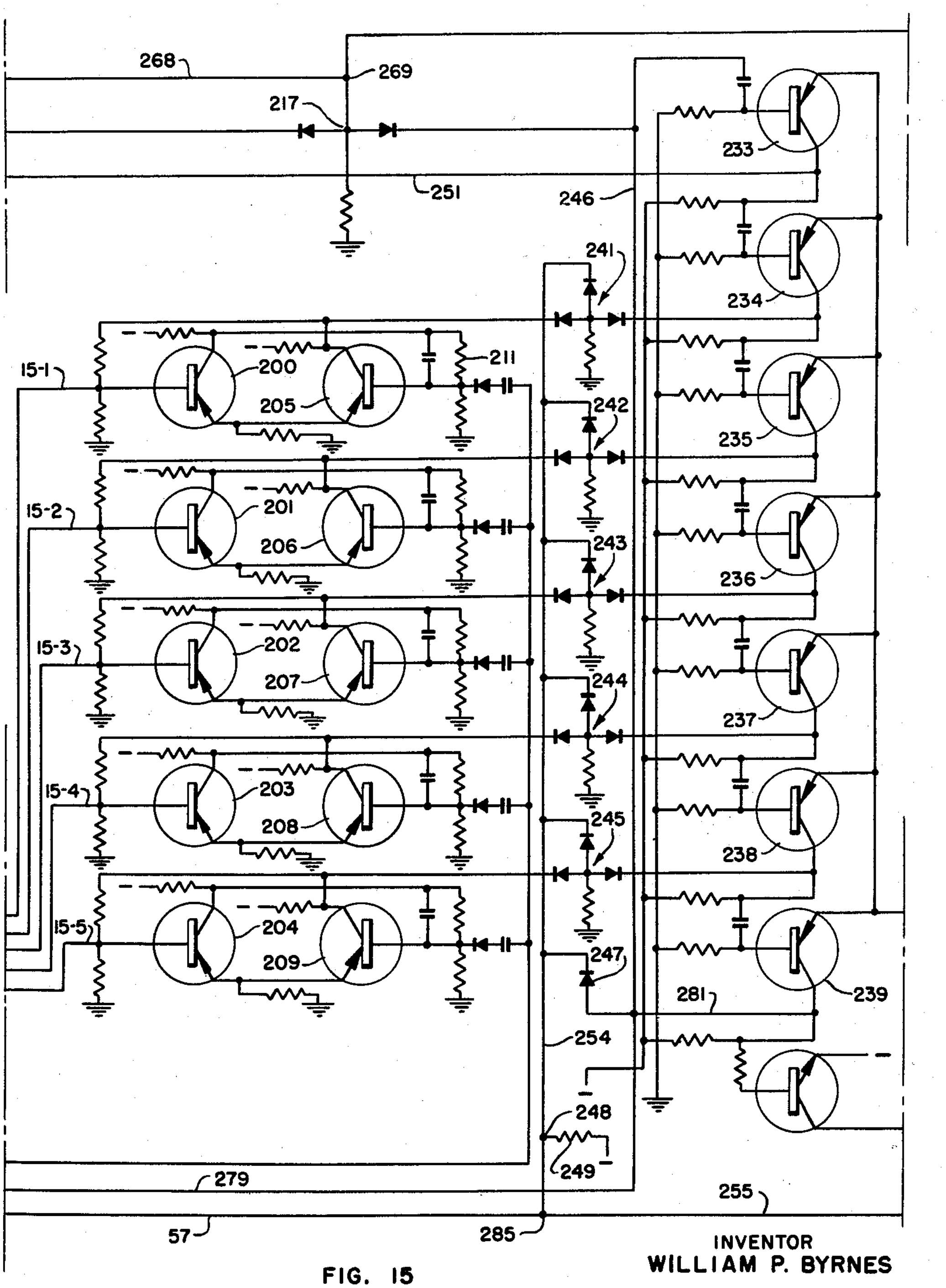
Figure 16:
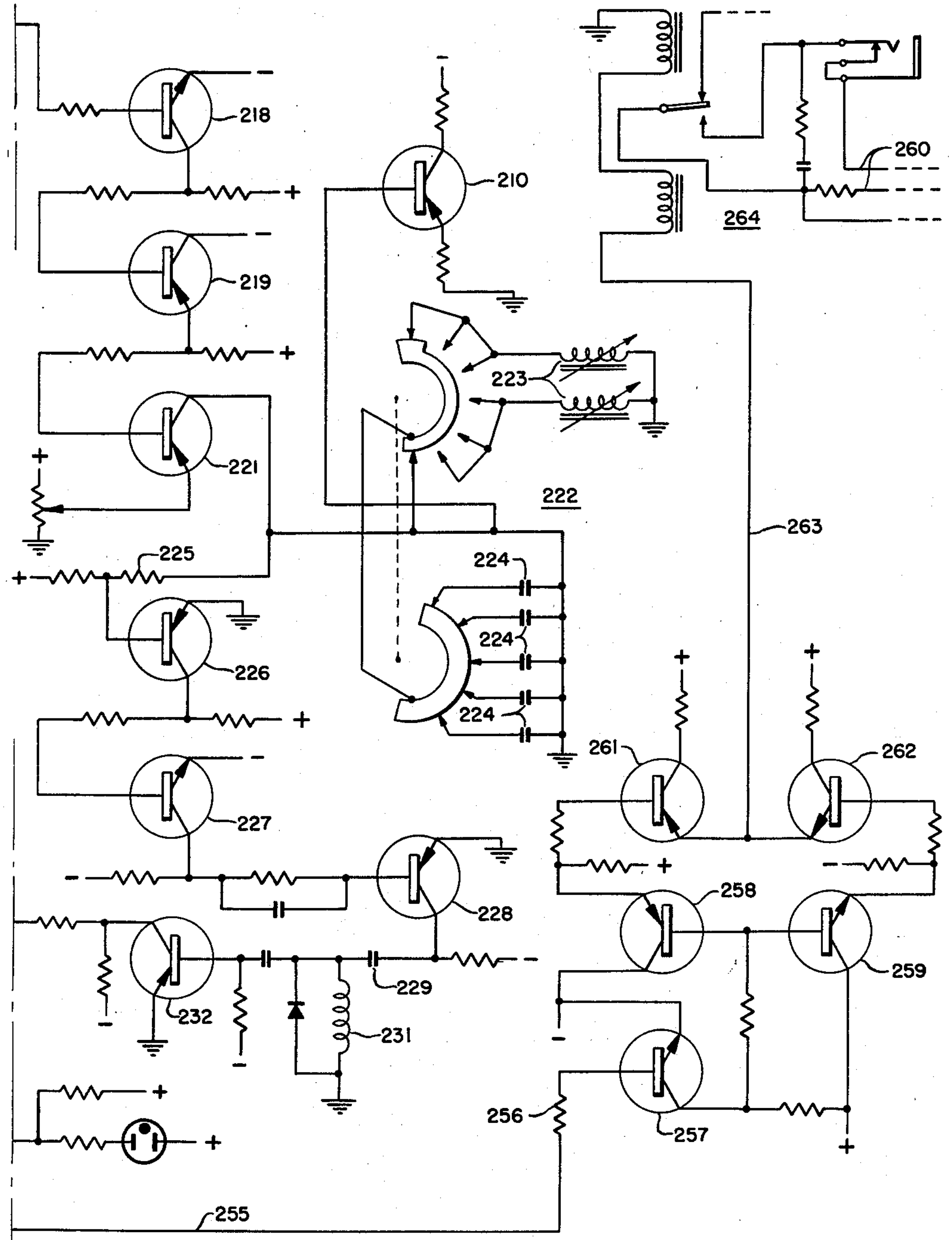
Figure 17:
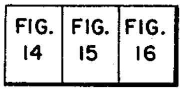
Figure 18:
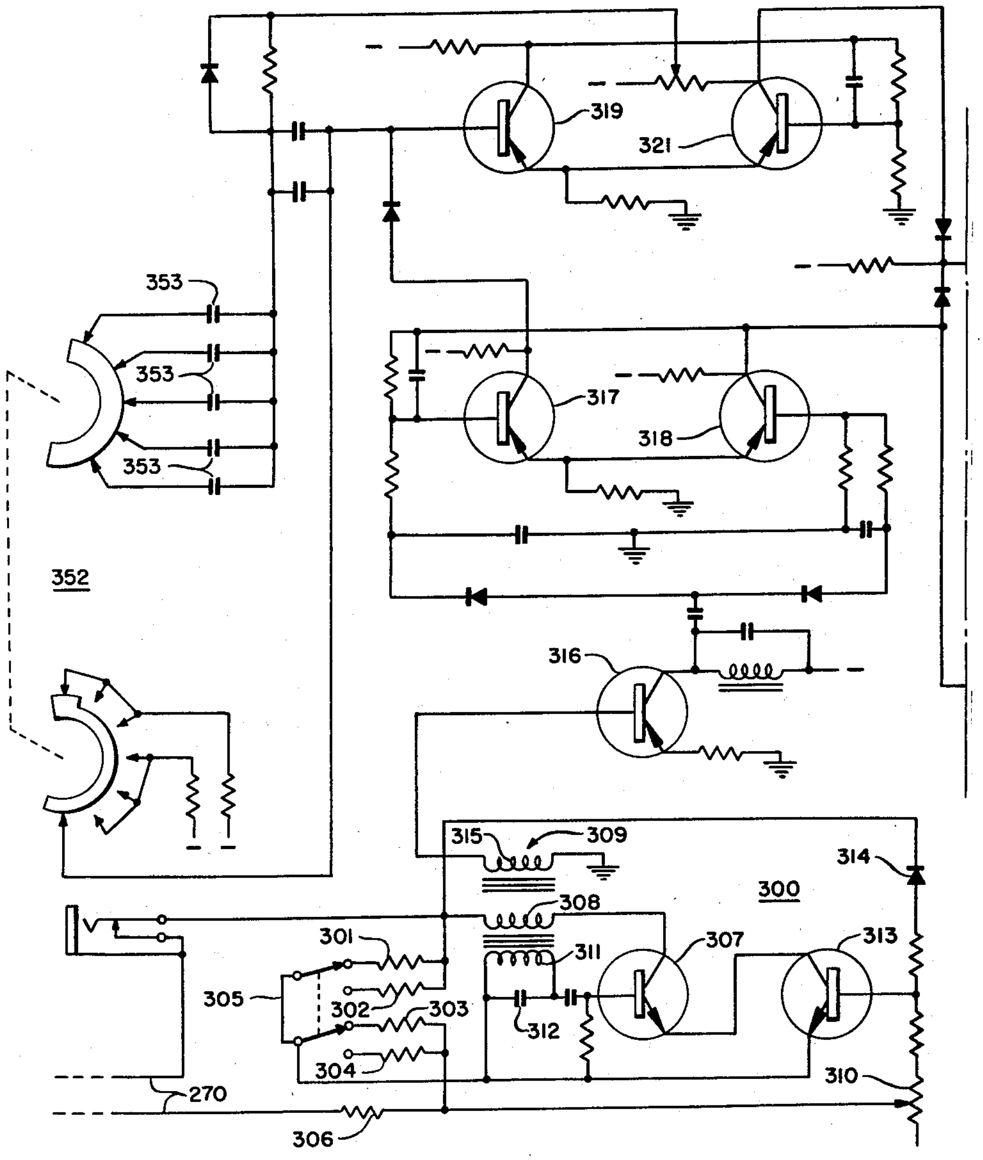
Figure 19:
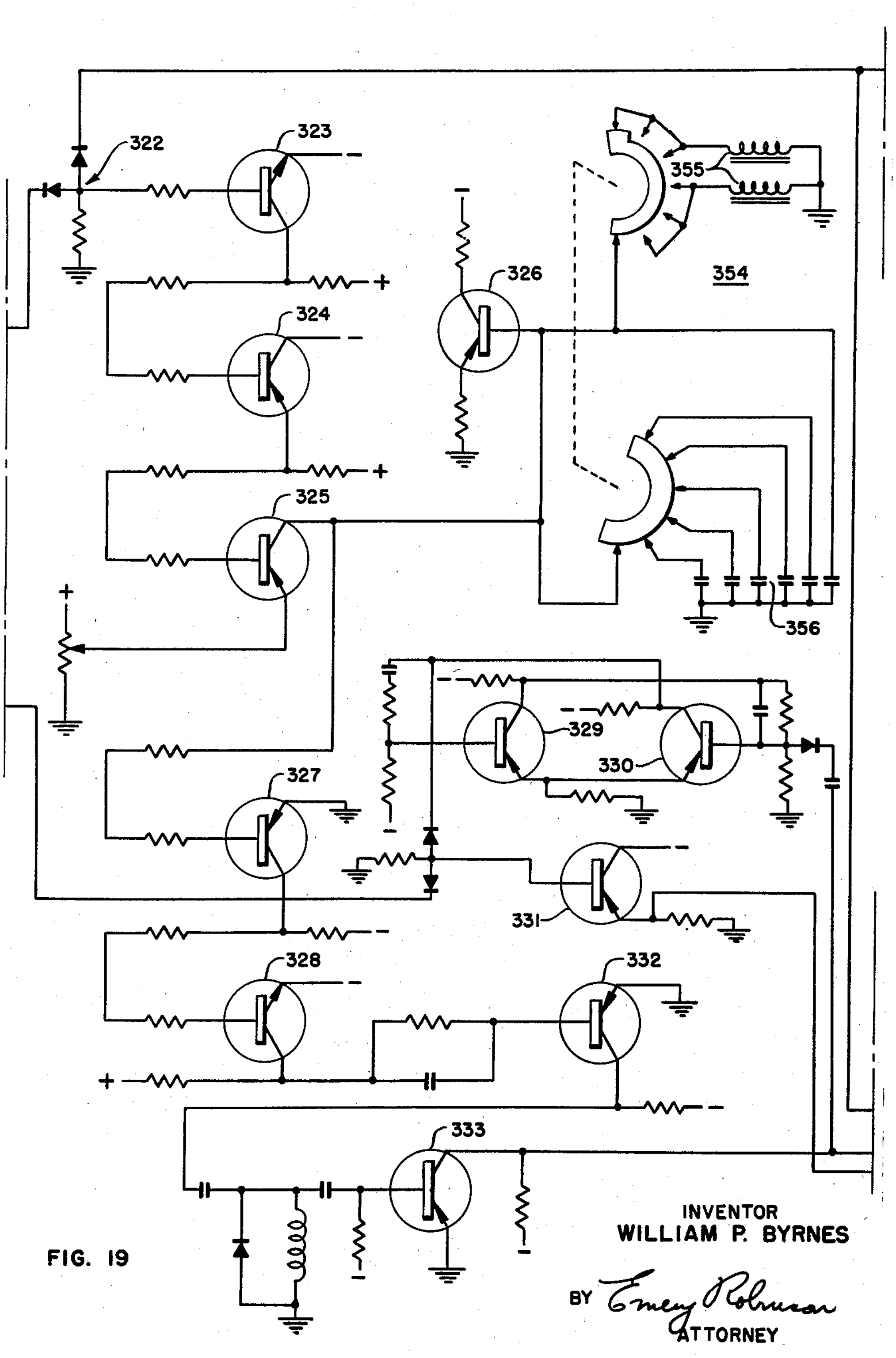
Figures 20, 21:
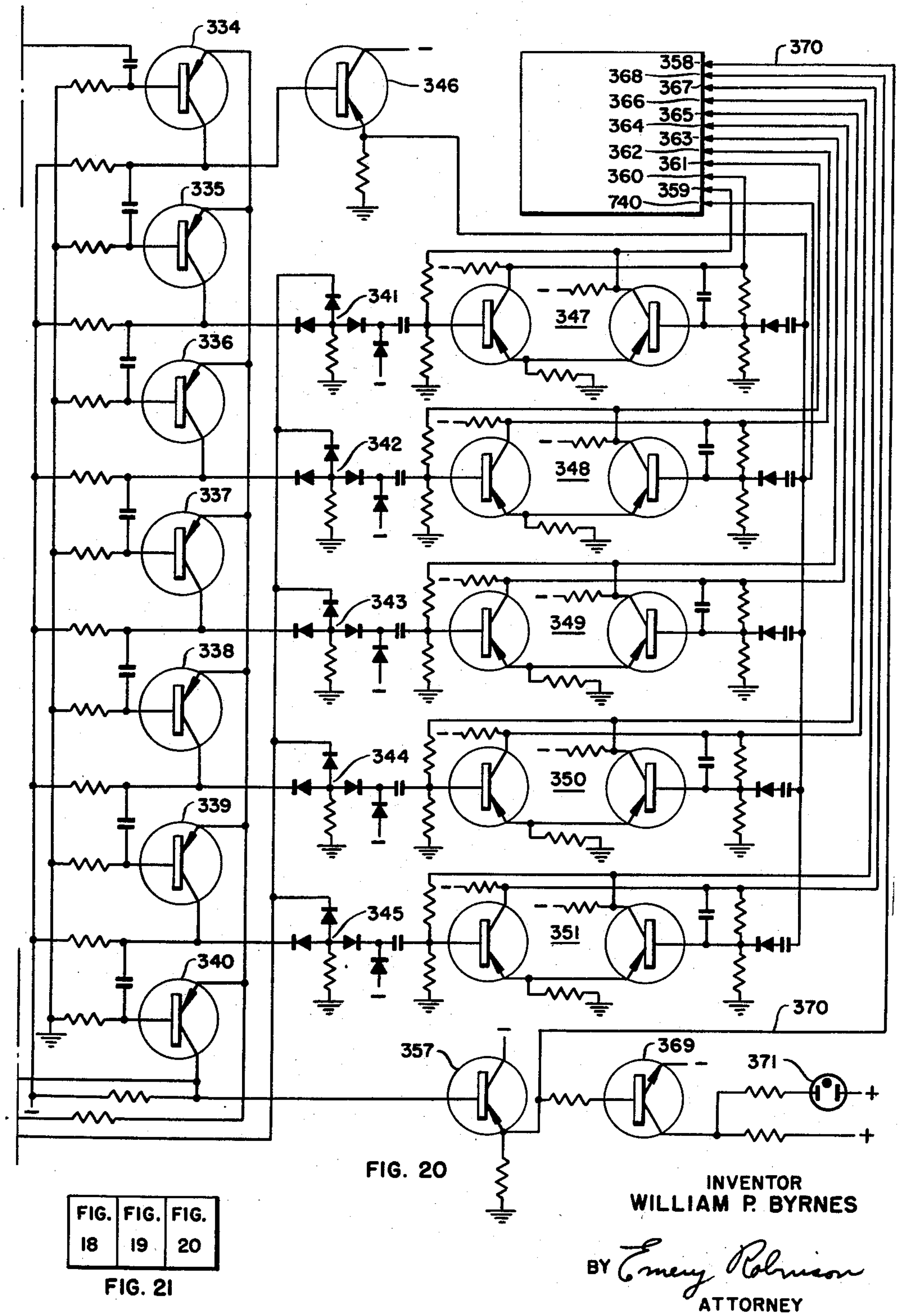
Figure 22:
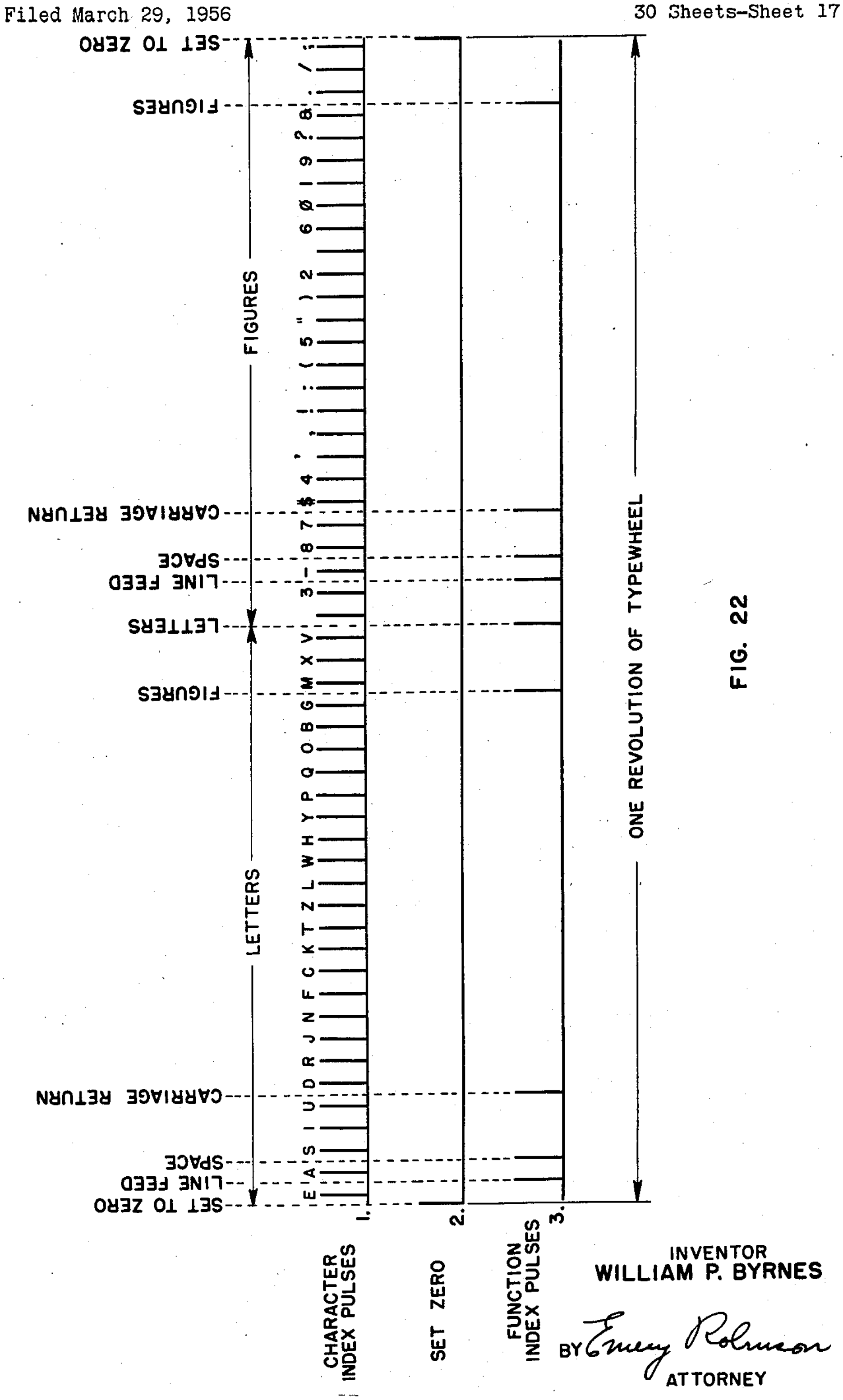
Figure 26:
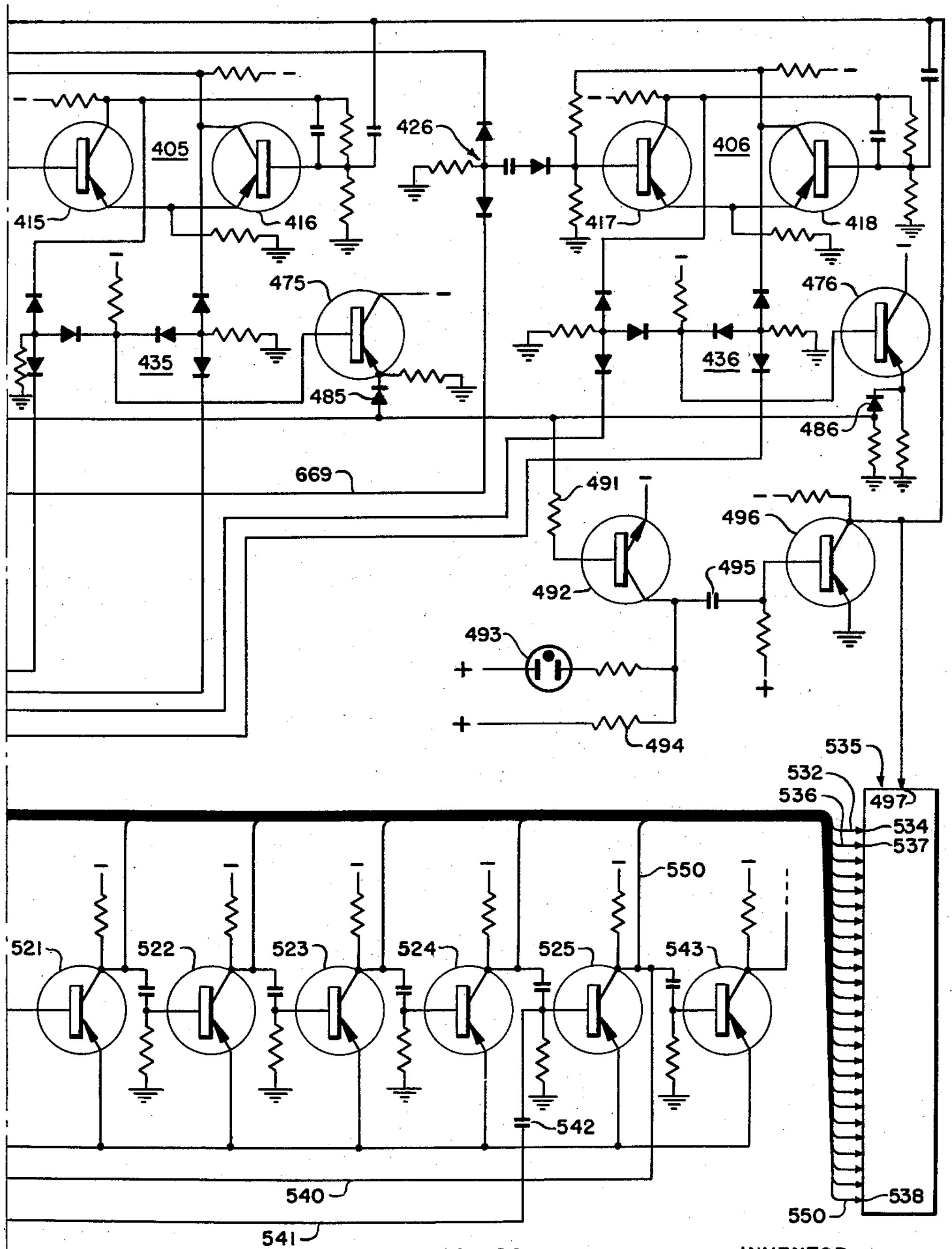
Figure 27:
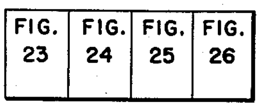
Figure 28:
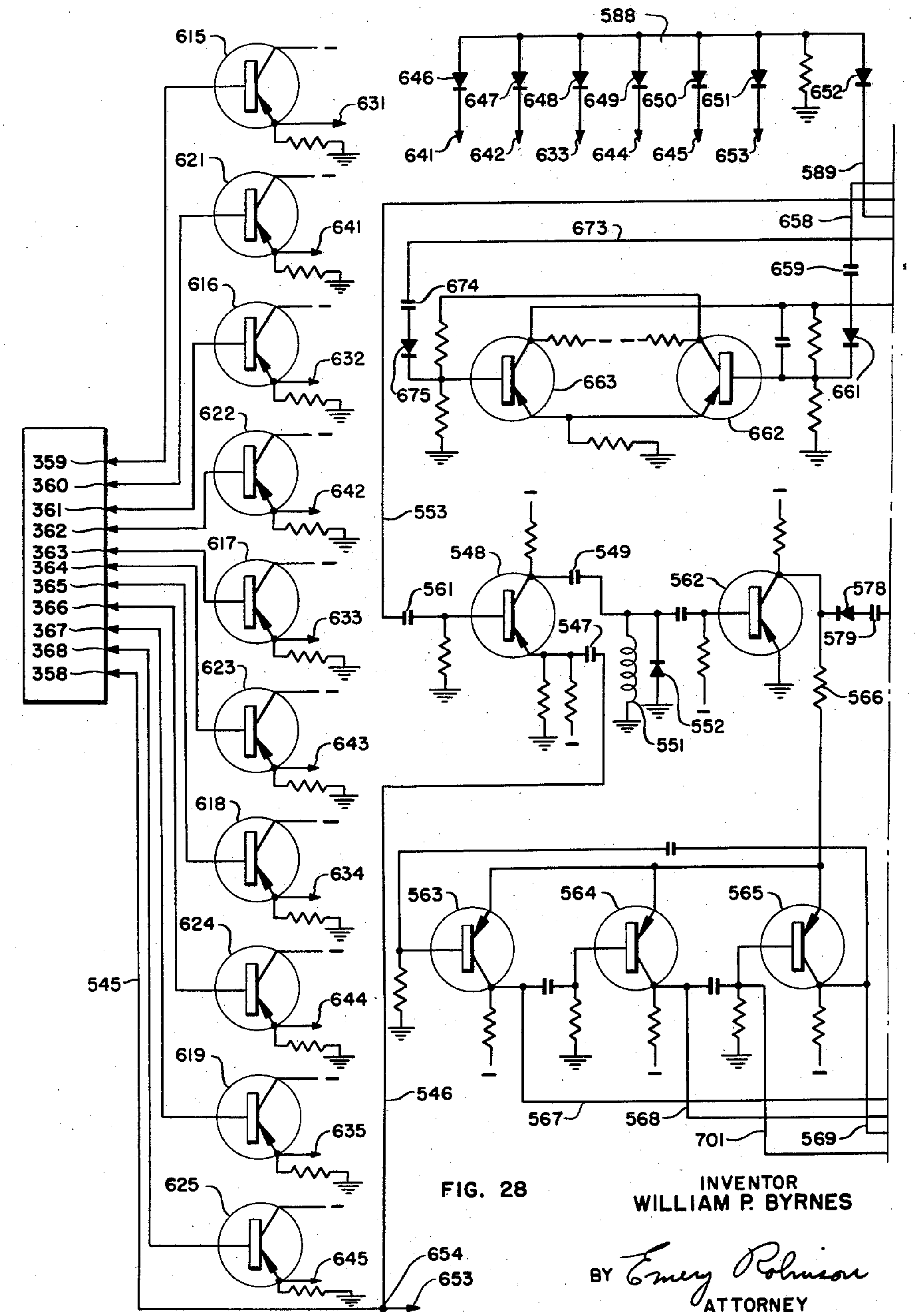
Figure 29:
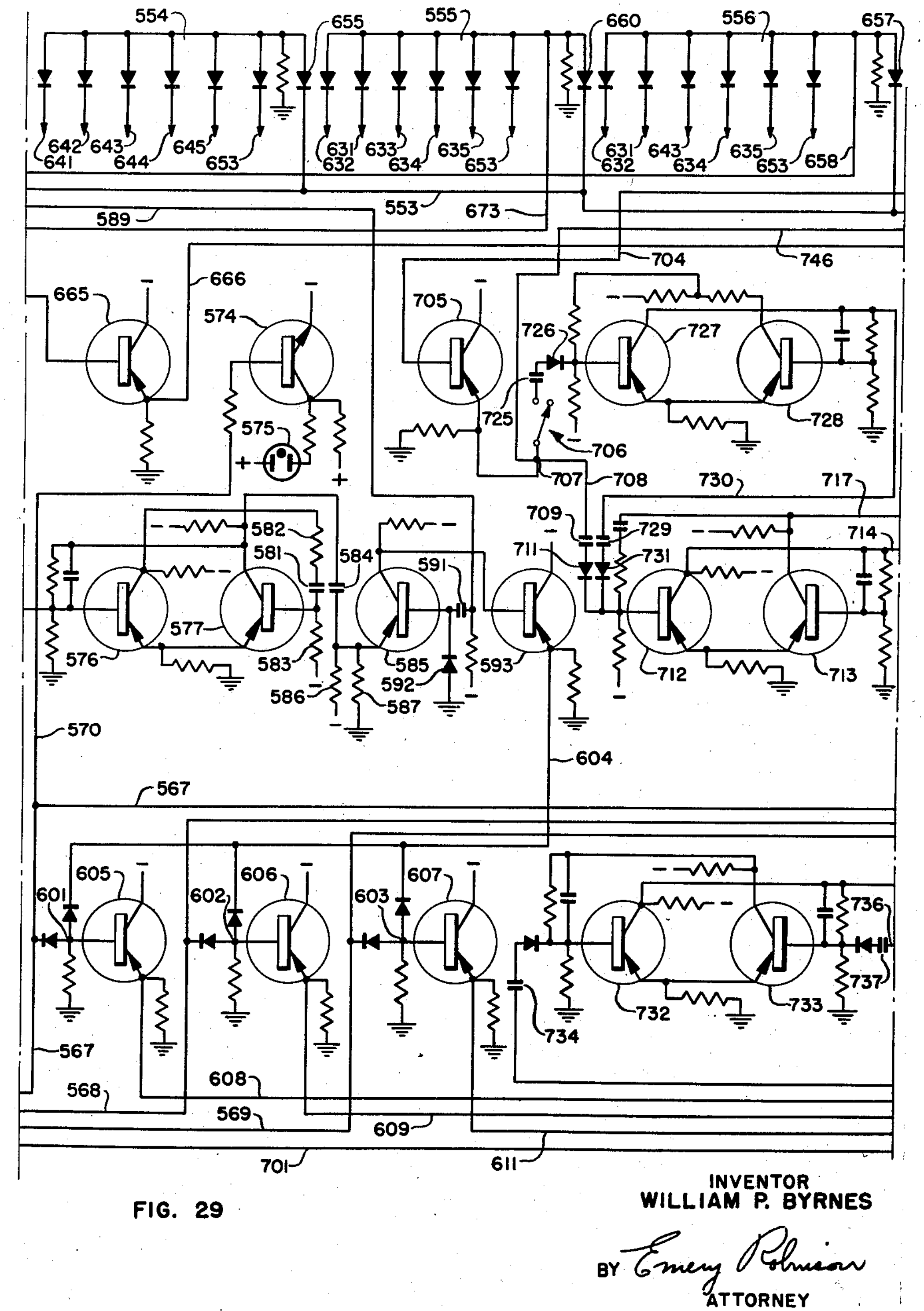
Figure 30:
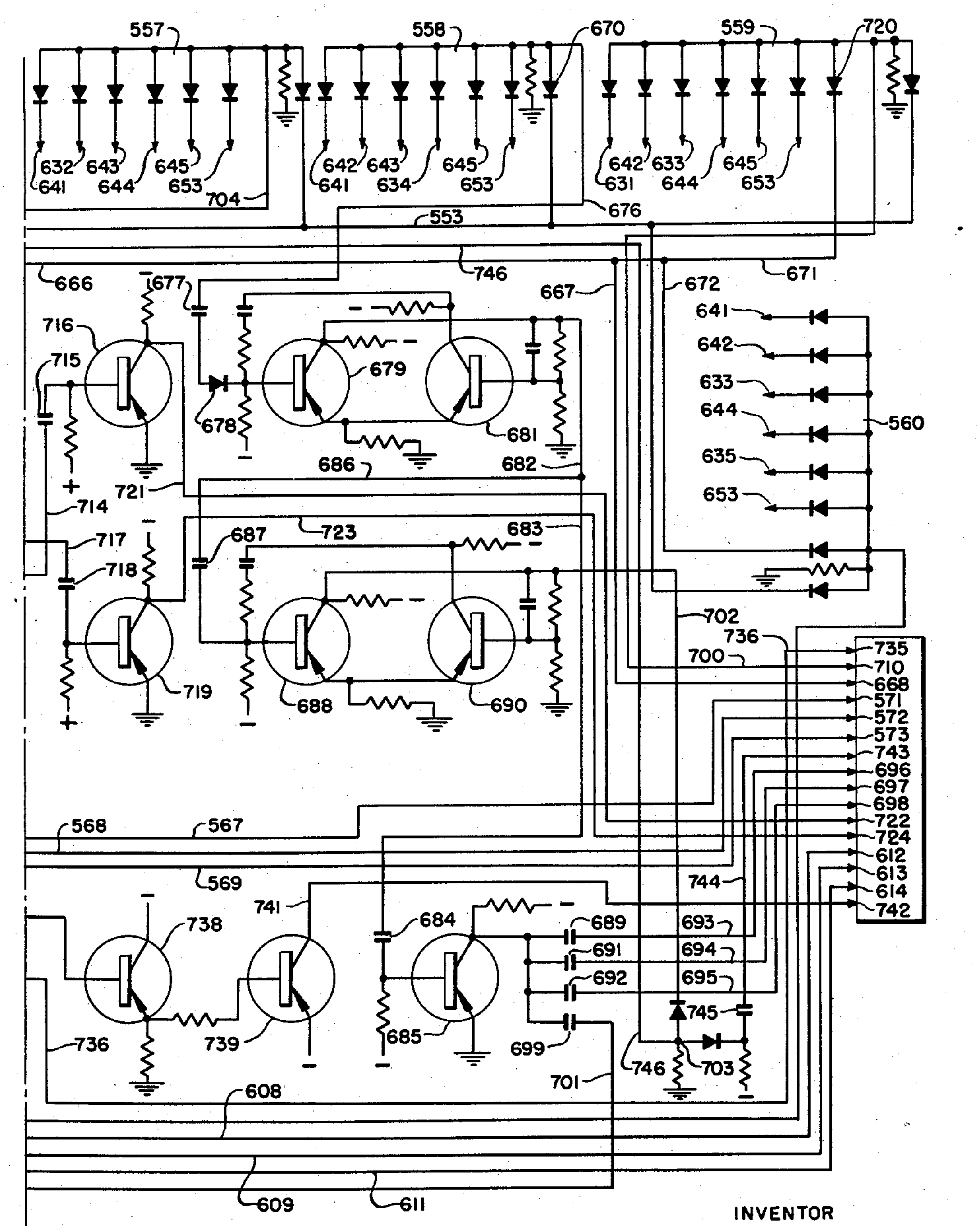
Figure 31:
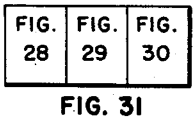
Figure 32:
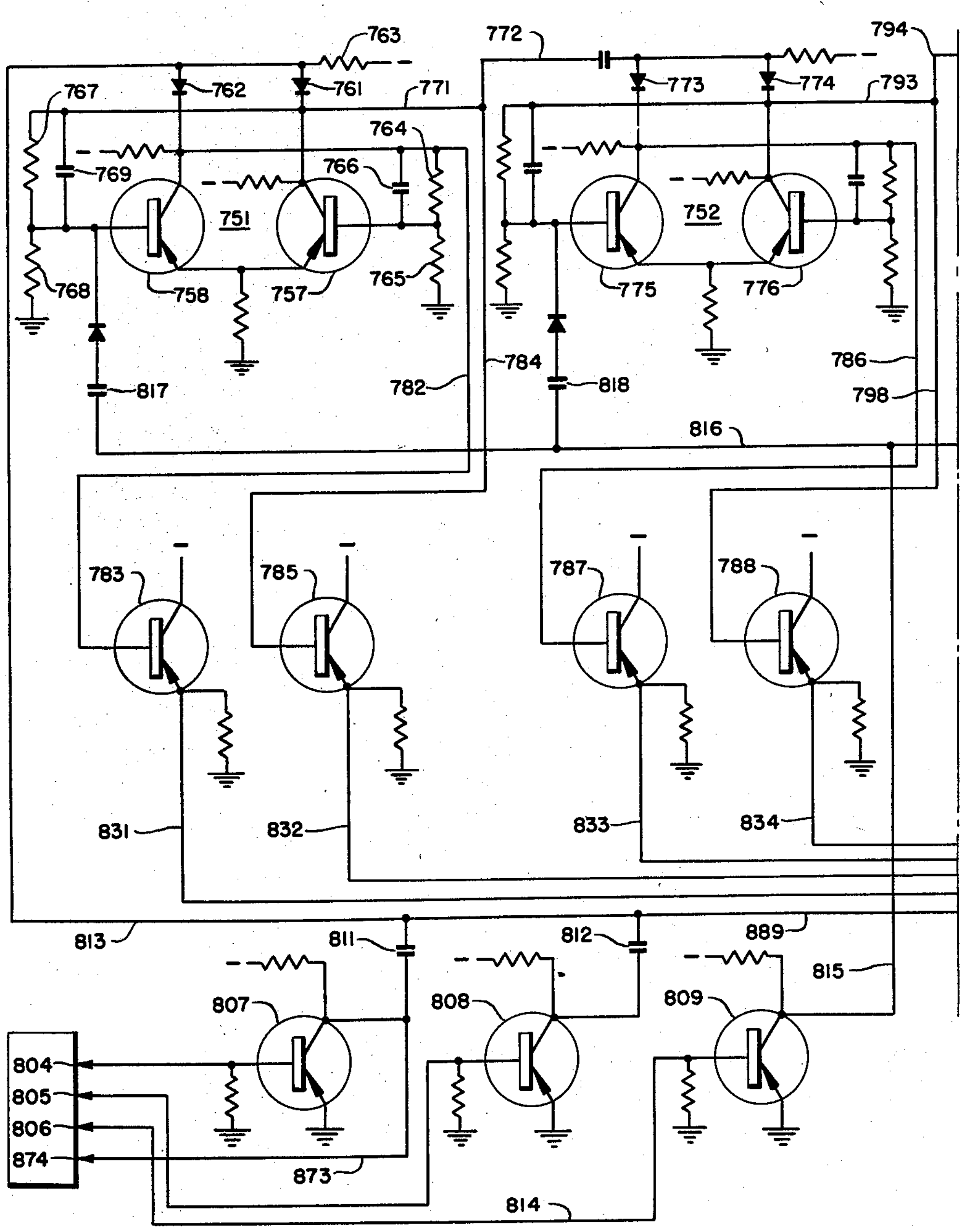
Figure 33:
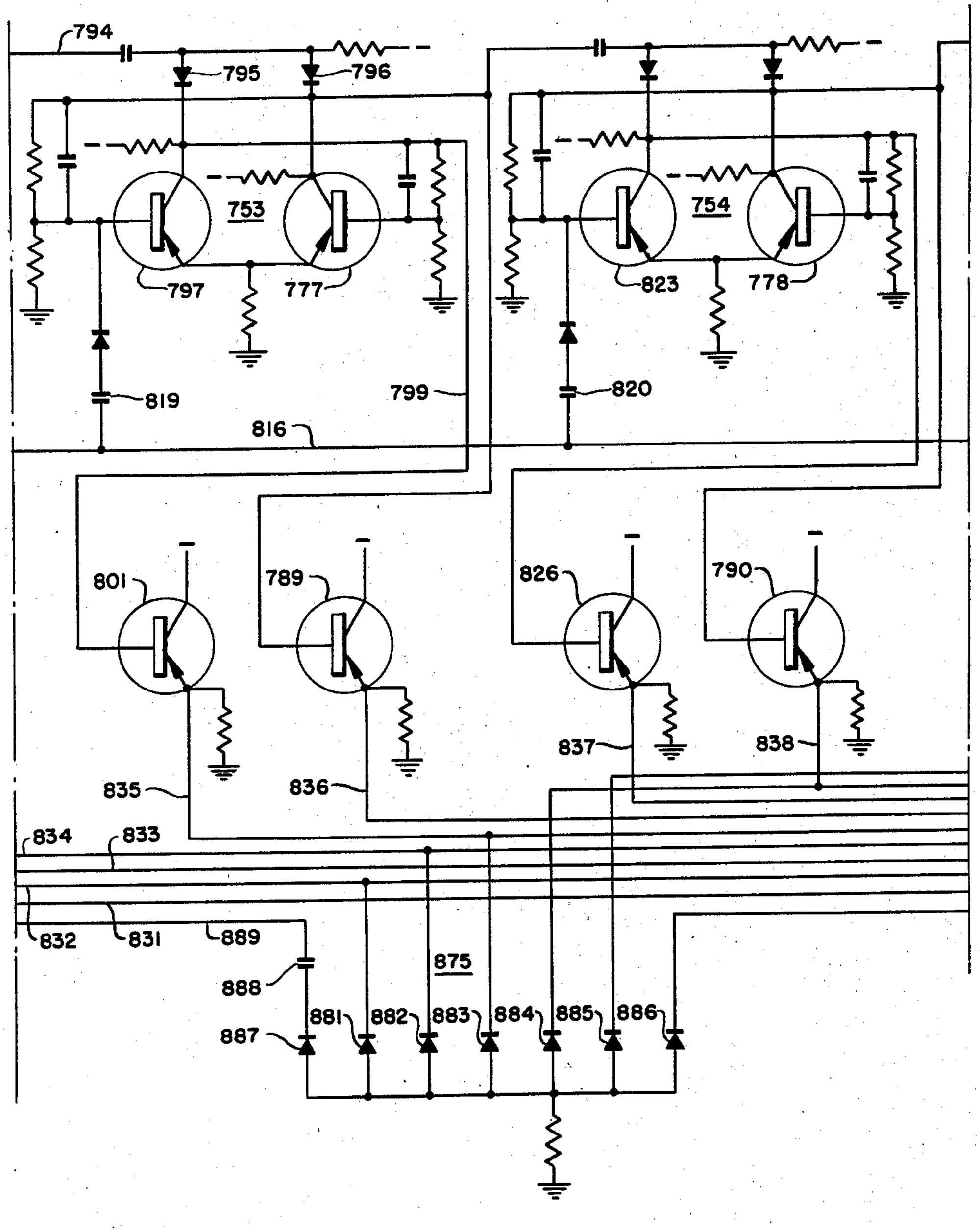
Figure 34:
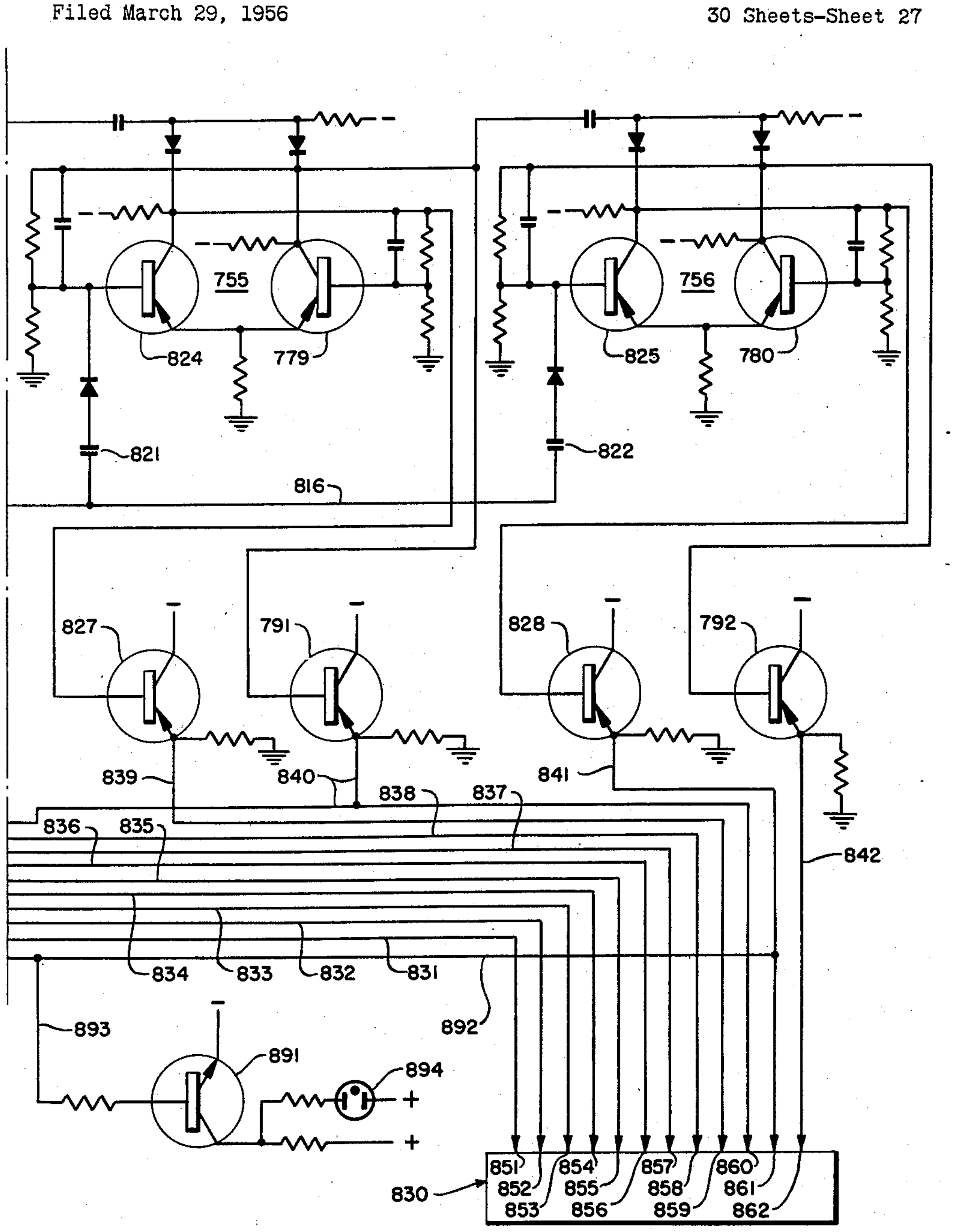
Figure 35:
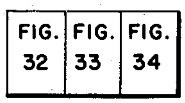
Figure 36:
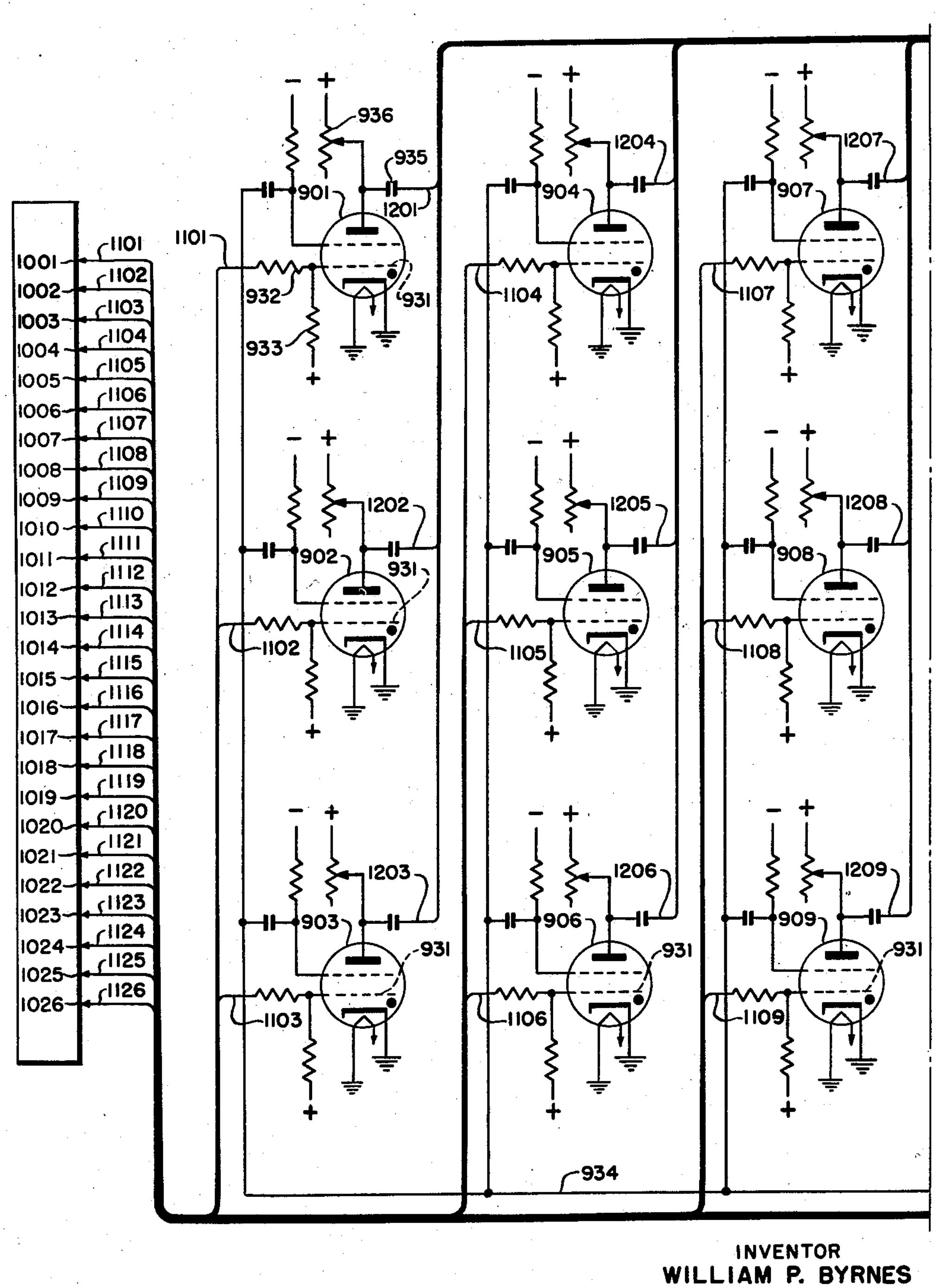
Figure 37:
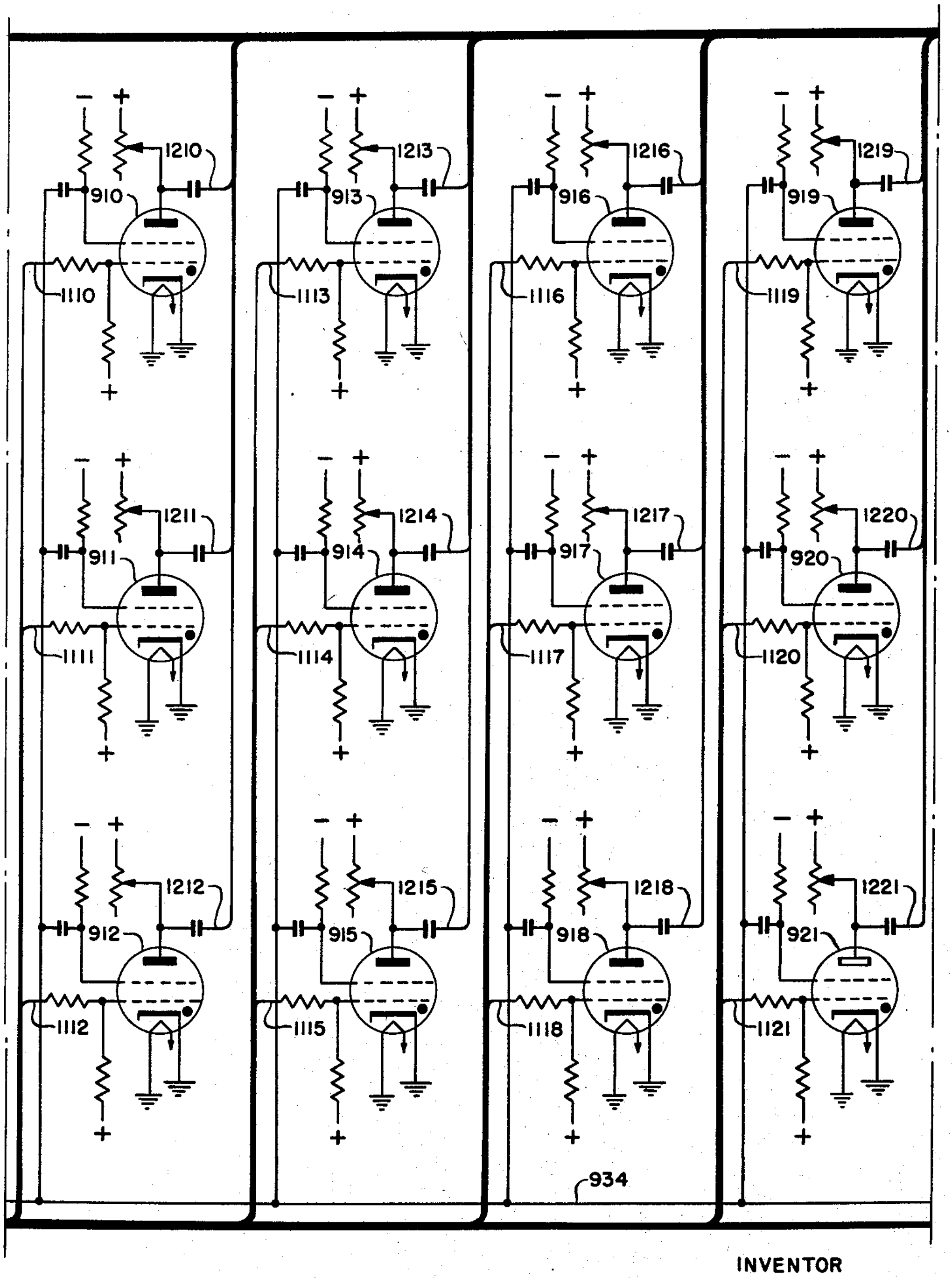
Figures 38, 39:
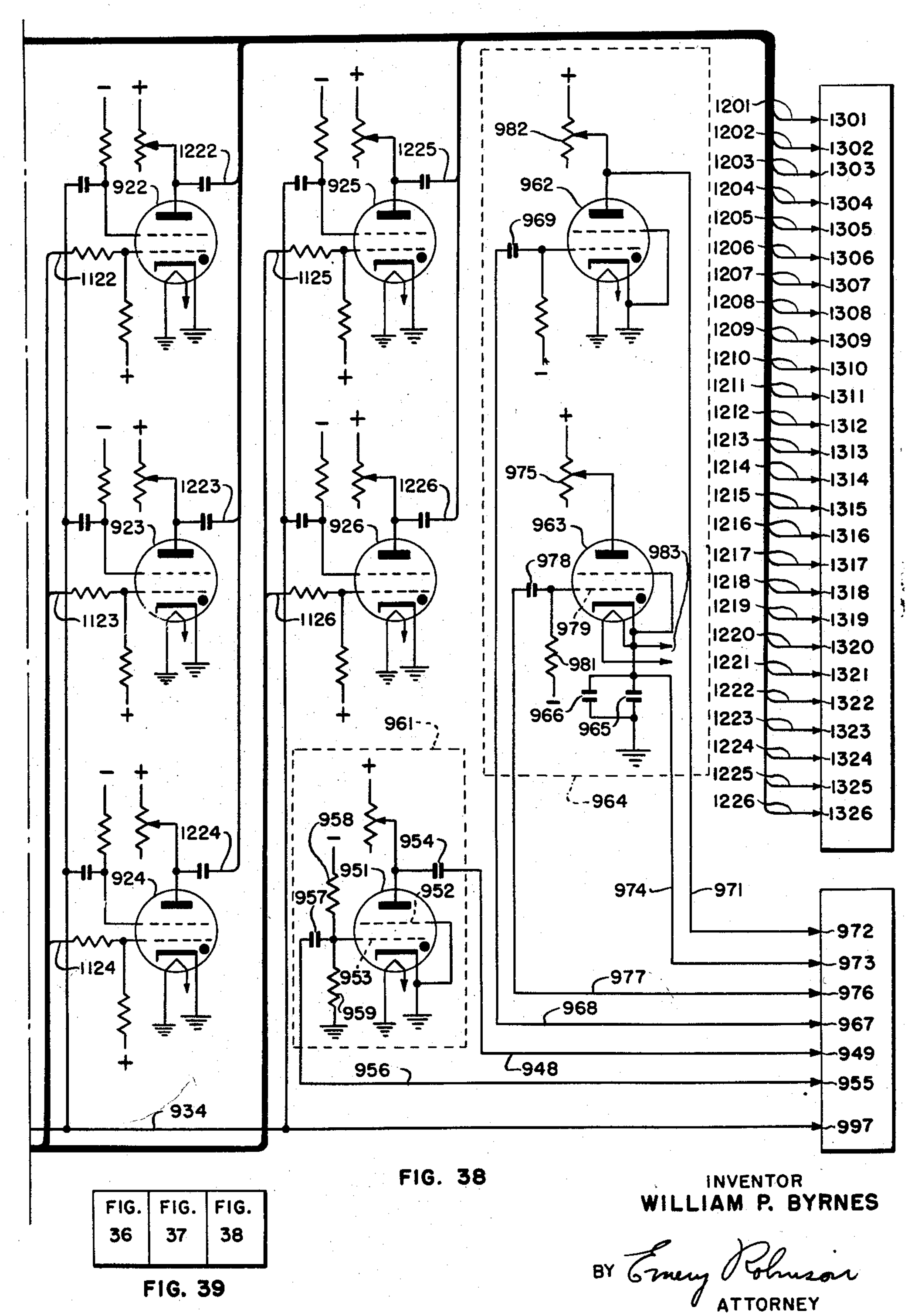

Figs. 14, 15 and 16 when assembled in the manner indicated in Fig. 17 illustrate the electrical circuit of the transmitting distributor unit according to the present invention;

Figs. 18, 19 and 20 when assembled in the manner indicated in Fig. 21 illustrate the electrical circuit of the receiving distributor unit according to the present invention;

Fig. 22 is a diagram showing the spacing of the index pins on the index wheel which are cooperable with the magnetic pickup devices;

Figs. 23, 24, 25 and 26 when assembled in the manner indicated in Fig. 27 illustrate the electrical circuit of the storage and character recognition unit according to the invention;

Figs. 28, 29 and 30 when assembled in the manner indicated in Fig. 31 illustrate the electrical circuit of the control unit of the present invention;

Figs. 32, 33 and 34 when assembled as shown in Fig. 35 illustrate the electrical circuit of the binary counter unit according to the invention; and Figs. 36, 37 and 38 when assembled as shown in Fig. 39 illustrate the thyratron print circuit according to the present invention.

Figure 1:
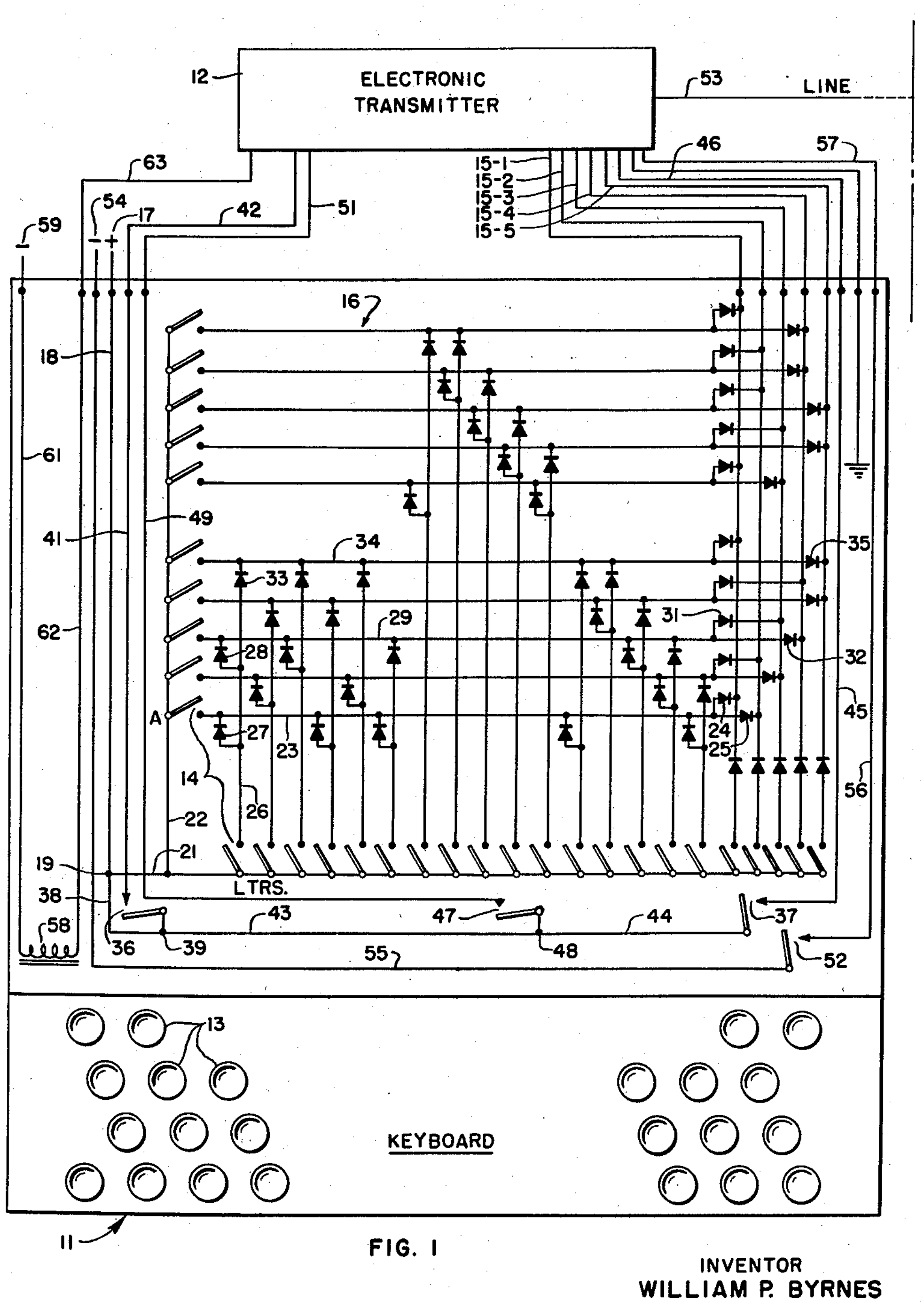
Fig. 1 is a schematic representation of the transmitting portion of the basic system forming the subject matter of the present invention.
Figure 3:
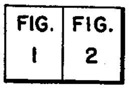
Fig. 3 shows the relative arrangement of Figs. 1 and 2.

Having reference to Fig. 1, the transmitting portion or station comprises a keyboard device 11 which controls the generation of impulses and the delivery thereof to an electronic transmitting distributor unit 12 basically of the type disclosed in copending application Serial No. 542,735, filed October 25, 1955 by R. J. Reek. Upon the depression of a key 13, as will presently appear, one of the contacts 14 corresponding thereto will be closed to impress on the conductors 15–1 to 15–5, leading to the transmitter 12, permutations of impulses corresponding to the key depressed. For example, if the key 13 representing the character "A" is depressed, the "A" contact 14 will be closed to complete the following circuits through a 32 to 5 diode converter 16. From source of current 17, over conductor 18 to junction 19, over conductors 21 and 22, through contact A–14 (now closed), over conductor 23 and through rectifiers 24 and 25 to conductors 15–1 and 15–2, respectively. Also, if the "letters" key 13 is depressed, impulses will be impressed on all five conductors 15–1 to 15–5, since the "Letters" signal is an all-marking signal. Thus, circuits will be completed from source of current 17, over conductor 18 to junction 19, then over conductor 21, through contact 14 (now closed) associated with the "Letters" key, then over conductor 26, through rectifier 27, over conductor 23, through rectifiers 24 and 25 to conductors 15–1 to 15–2 respectively. Furthermore, circuits will be completed over conductor 26, through rectifier 28, over conductor 29, through rectifiers 31 and 32 to conductors 15–3 and 15–4 respectively. Moreover, a circuit will also be completed over conductor 26, through rectifier 33, over conductor 34 and through rectifier 35 to conductor 15–5. As is known, the rectifiers in the diode converter 16 are so arranged as to set up circuits to impress marking current impulses on the output conductors 15–1 to 15–5 in accordance with the well known Baudot permutation code, and in the manner basically disclosed in British Patent No. 499,900.

Start control contacts 36 and storage release contact 37 are closed with the operation of every key representing a character or a function, whose circuit is completed through the diode converter 16. When contact 36 closes, a circuit is completed from source of current 17, over conductor 18 to junction 19, thence over conductor 38 to junction 39, then through contact 36 (when closed), over conductors 41 and 42 to the "start control" facilities, to be hereinafter described, in the electronic transmitter 12, whereby the transmitting distributor is started into operation. When contact 37 closes, a circuit is completed from source of current 17, over conductors 18, 38, 43 and 44, through contact 37, when closed, over conductors 45 and 46 to clear the previous character out of storage in the electronic transmitter 12, as will hereinafter appear.

A repeat key contact 47 is provided which, when depressed, automatically repreats the last character transmitted as long as the key is held operated. When the contact 47 is closed, a circuit is completed from source of current 17, over conductors 18, 38 and 43 to junction 48, then through contact 47, when closed, and over conductors 49 and 51 to a so-called "repeat gate" (to be hereinafter described) in the electronic transmitter 12.

A "break" key contact 52 is provided which, when operated, causes a continuous spacing signal to be sent over the signal line 53. When the contact 52 is closed, a circuit is completed from a source of current 54, over conductor 55, through contact 52 (when closed), and over conductors 56 and 57 to instrumentalities in the electronic transmitter 12 which will cause the line relay of said transmitter to send a continuous spacing signal over the signal line 53.

A keyboard lock magnet 58 is provided which, through a lock bail 87 (Fig. 8) prevents a second key from being depressed while the character represented by the first key is being transmitted. This lock magnet 58 is released immediately after the No. 5 code impulse has been transmitted, so that a second key can be depressed during the stop pulse interval. To accomplish this, the magnet 58 is included in a circuit extending from source of current 59, over conductor 61, through the winding of magnet 58, and over conductors 62 and 63 to control facilities (hereinafter described) in the electronic distributor 12.

The timing of the storage release contact 37, the code pulse control contacts 14 and the start control contact 36 is such that contact 37 closes first, the selected contact 14 next, and the contact 36 last. It is absolutely necessary that the contact 37 close well before the code contacts 14. The timing between the code contacts 14 and the start control contact 36, however, is not critical. If necessary, contact 36 and a selected contact 14 could close substantially simultaneously.

As previously referred to, the electronic receiving distributor 65 (Fig. 2) accepts the serial start-stop signal from the transmitter over the signal line 53 and converts said signal back into a parallel (or five-wire) code combination after the start and stop impulses have been deleted. The electronic receiving distributor (or code converter) is basically of the type disclosed in copending application Serial No. 542,662, filed October 25, 1955 by R. J. Reek et al., now Patent No. 2,879,332, granted March 24, 1959.

Figure 2:
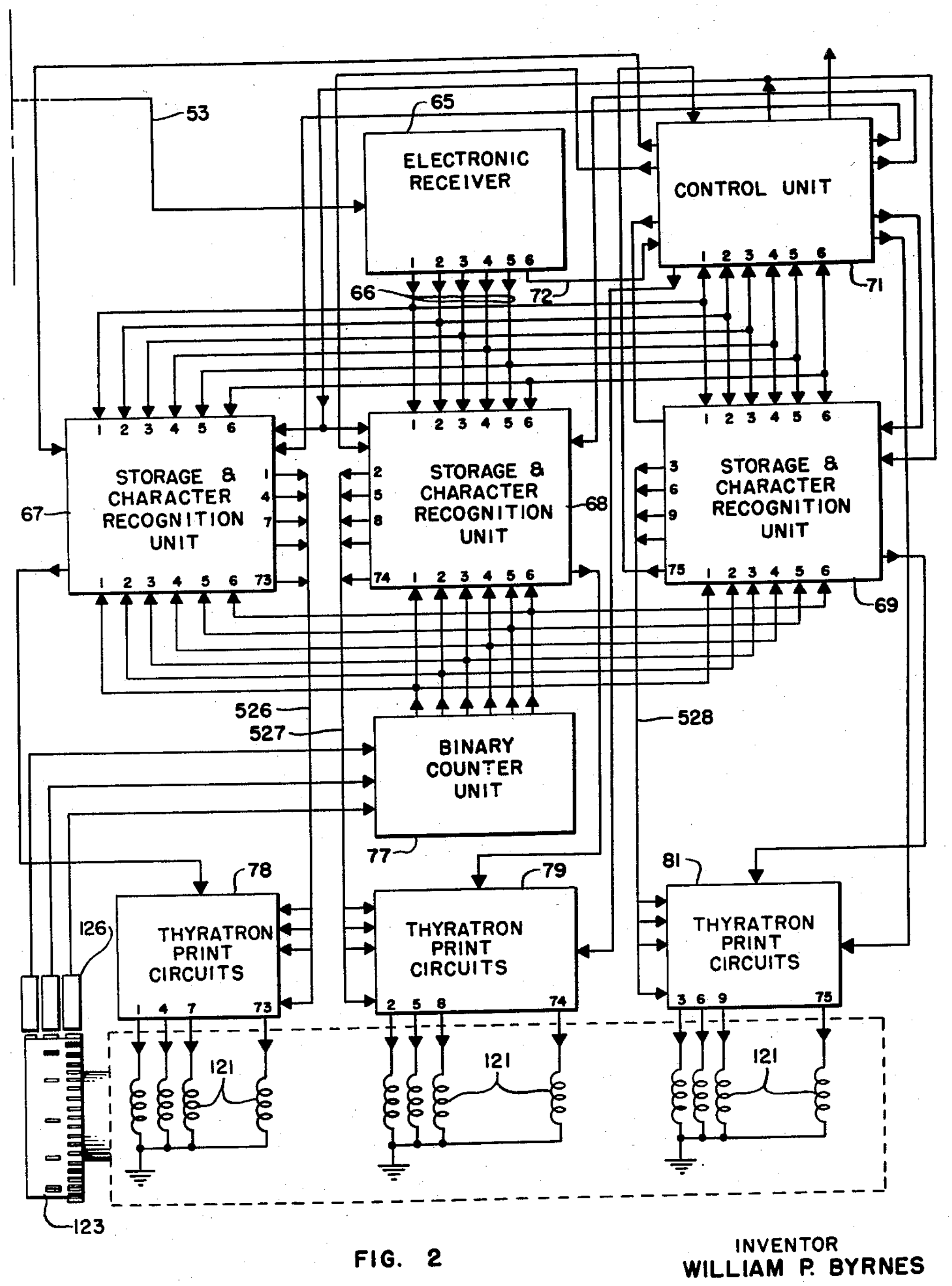
Fig. 2 is a schematic representation of the receiving portion of the basic system according to the present invention.
Figure 4:
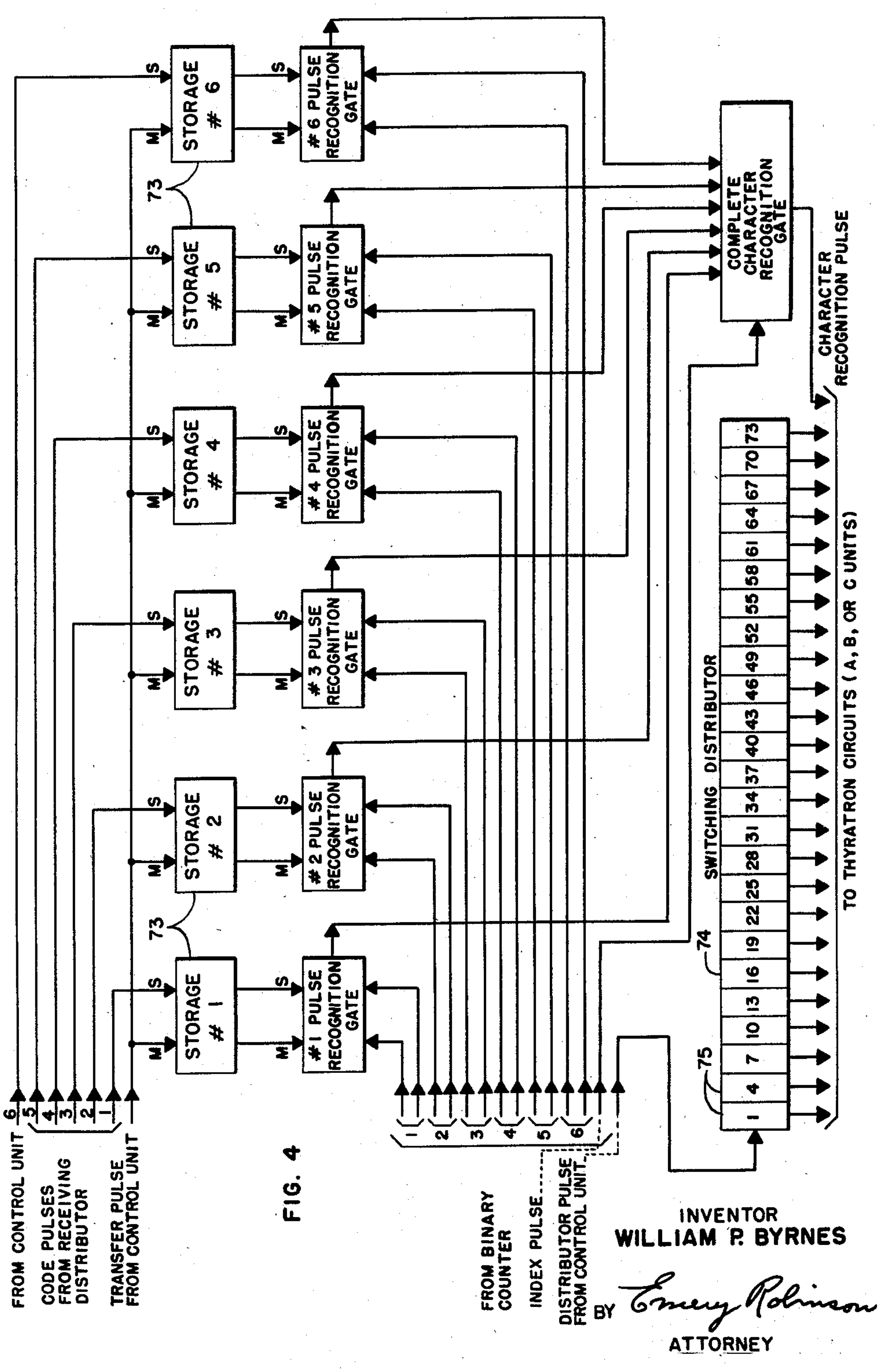
Fig. 4 is a schematic diagram of the storage and character recognition unit.

As indicated in Fig. 2, the code impulses are delivered over the five-wire output 66 to three storage and character recognition units 67, 68 and 69, and also to a control unit 71. The stop impulse is also delivered over conductor 72 to the control unit 71. The storage and character recognition units 67, 68 and 69, are identical and, as indicated in Fig. 4, consist of six storage elements 73, character recognition circuits, and a 25 element switching distributor 74. The switching distributor blocks 75 are numbered in accordance with the unit 67, wherein the numbers refer to character printing positions with which the unit 67 is associated. Unit 68 would have numbers 2, 5, 8, 11, etc. and unit 69 would have numbers 3, 6, 9, 12, etc. The general function of units 67, 68 and 69 is to accept the code combination from the receiving unit 65, recognize the character, and deliver a firing impulse to the proper thyratron print circuit, as will hereinafter appear. This firing pulse is herein called a character recognition pulse.

Individual drive and transfer pulses are delivered to the switching distributors 74 of units 67, 68, or 69 from the control unit 71. The transfer pulse actually puts the character into storage, and the switching distributor drive pulse, in driving the switching distributor, sets up the proper thyratron print circuit to receive the character recognition pulse.

Figure 5:
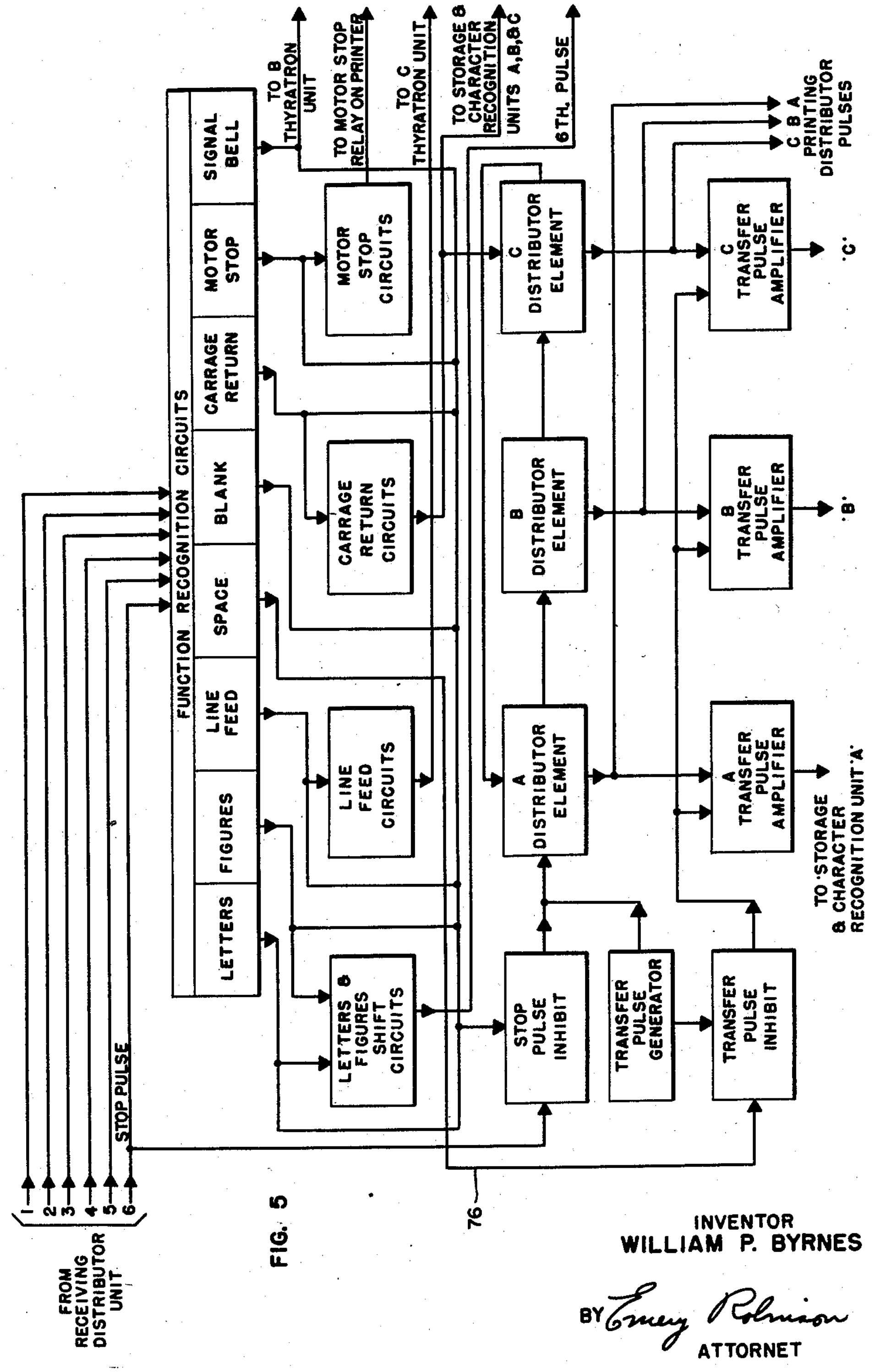
Fig. 5 is a schematic diagram of the control unit.

The control unit 71, Fig. 5, determines which of the storage units 67, 68 or 69 is to receive the code pulses from the receiving distributor 65. For example, the first character in a line of print is directed to unit 67, the second to unit 68, and the third to unit 69. Before the fourth character is received, the first character is printed and the storage unit 67 is clear; therefore, the fourth character is sent to storage unit 67. All action in the control unit 71 is begun by the receipt of the stop pulse from the receiving distributor 65 over conductor 72 (Fig. 2).

In addition, the control unit 71 (Fig. 5) recognizes and initiates the carrying out of the various functions, i.e., Letters, Figures, Carriage Return, Space, Blank, Line Feed, Motor Stop, and Signal Bell. Other functions include optional double line feed and automatic carriage return-line feed. Letters-Figures shift is accomplished by adding a sixth pulse to every character following the receipt of the Figures combination. This sixth pulse goes to the No. 6 storage element 73 (Fig. 4) in the storage units 67, 68, and 69, and in effect changes the signal from a five-unit code to a six-unit code. All functions, except Space, must inhibit or suppress printing and spacing and, therefore, connect to the stop pulse inhibit circuit. This prevents the code combinations from being put into storage and also prevents the switching distributor 74 from being pulsed. The space function circuit exemplified by conductor 76 (Fig. 5) is shown connected only to the transfer pulse inhibit circuit and only prevents the code combination from being stored. The switching distributor pulse is not suppressed or inhibited. This provides a spacing in the line of type but no printing operation.

Figure 6:
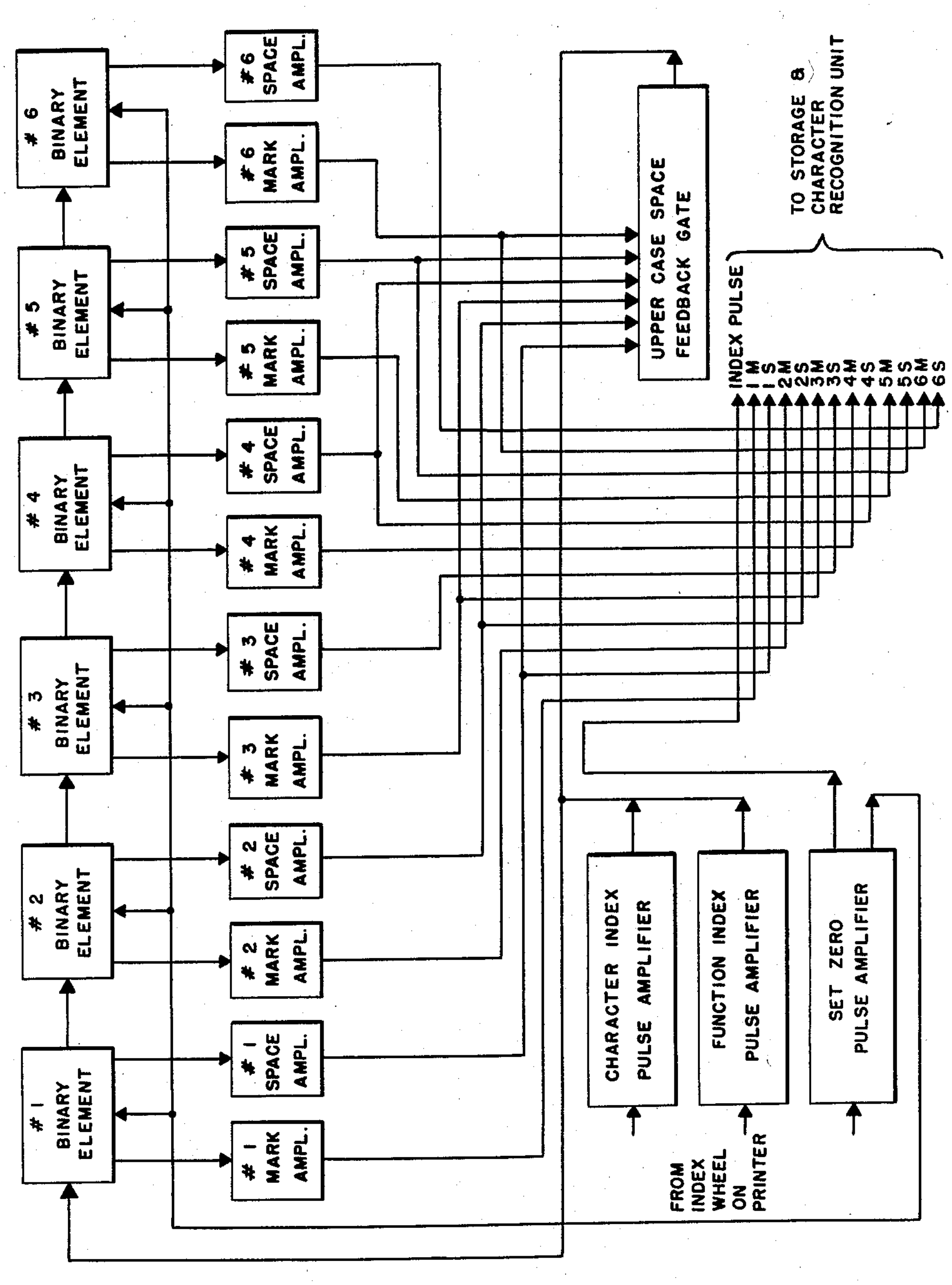
Fig. 6 is a schematic diagram of the binary counter unit.

The function of the binary counter 77, shown in Fig. 2, is to inform the Storage and Character Recognition units 67, 68, and 69 as to which character on the typewheel is in printing position. Index pulses, from index wheel or pulse generator 123 on the typewheel shaft 102 (Fig. 10), drive the six-stage binary counter 77, schematically shown in Fig. 6. In one revolution of the typewheels (as will hereinafter appear), sixty-three index pulses are generated; namely, fifty-two pulses for the fifty-two characters on the typewheel, ten pulses for nonprinting characters (functions) for which there are no spaces or positions on the typewheel, and one pulse for setting the binary counter 77 back to zero. Index pulses are not generated for two functions: a "blank" and a "letters" function, which are in the Baudot code, and which appear at the beginning and the end of the recognition cycle. Neither would serve a useful purpose, since the set-zero pulse is provided.

The characters on each typewheel are arranged in such a manner that their code combinations are in the order of their binary count. Figs. 7 and 7A show the characters, their code combinations, and their sequential order. Therefore, in one revolution of the typewheel, the binary counter is set up in the code combination of each character on the typewheel as that character reaches the printing position. The outputs from the binary counter 77 go to the character recognition circuits of the three storage and character recognition units 67, 68 and 69. When the code combinations in storage matches the code combination from the binary counter 77, the character recognition circuits generate a pulse that fires the thyratron print circuits 78, 79 or 81, as will hereinafter appear.

At this point, the basic principles of the binary counter will be given. A binary counter, as contemplated in the practice of the present invention, is a device which counts to the base of 2, that is, there are only two digits with which to express a number. These digits are "zero" (0) and "one" (1). This is compared to the decimal system which has ten digits for expressing numbers:

| Received: | Binary |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |

Each stage of a binary counter can be in only one of two states: either "0" or "1." A two stage counter, therefore, can represent numbers 0, 1, 2 and 3; or, in other words, can be in four possible combinations. Expanding this to a five-stage counter results in 32 combinations, and expanding to a six-stage counter results in 64 combinations. It should be noted that the 32 possible combinations of a five-stage counter are identical to a five unit telegraph code. Generally, the "one" (1) in the binary rotation is indicative of a "marking" condition in the telegraph code, and "zero" (0) is indicative to a "spacing" condition. The electronic circuit comprising the binary counter 77 is shown in Figs. 32, 33 and 34 to be hereinafter described.

The thyratron print circuits (Fig. 2), according to the present invention, comprise three units 78, 79 and 81, each unit consisting of twenty-five thyratron printing circuits. For example, the twenty-five thyratrons in the unit 78 energize the printing control magnets 121 which control the page printing positions Nos. 1, 4, 7, etc. to 73; the twenty-five thyratrons in units 79 energize the magnets 121 which control the page printing positions Nos. 2, 5, 8, etc. to 74; and twenty-five thyratrons in unit 81 energize the magnets 121 which control the page positions Nos. 3, 6, 9, etc. to 75. Since only seventy-five character printing control thyratrons are provided, the end three of the aforementioned printing positions are not utilized, and the line length will be limited to seventy-five characters. Character recognition pulses from the storage and recognition unit 67 go to all twenty-five thyratrons in the thyratron print circuit unit 78. The thyratron which is to be fired by the pulse is selected by the switching distributor 74 in the storage and character recognition unit 67. The same operation applies to the units 68 and 69. In addition to the print circuits, thyratron unit 79 employs a thyratron circuit for signal bell function, and thyratron unit 81 uses two thyratron circuits for line feed functions.

Figure 8:
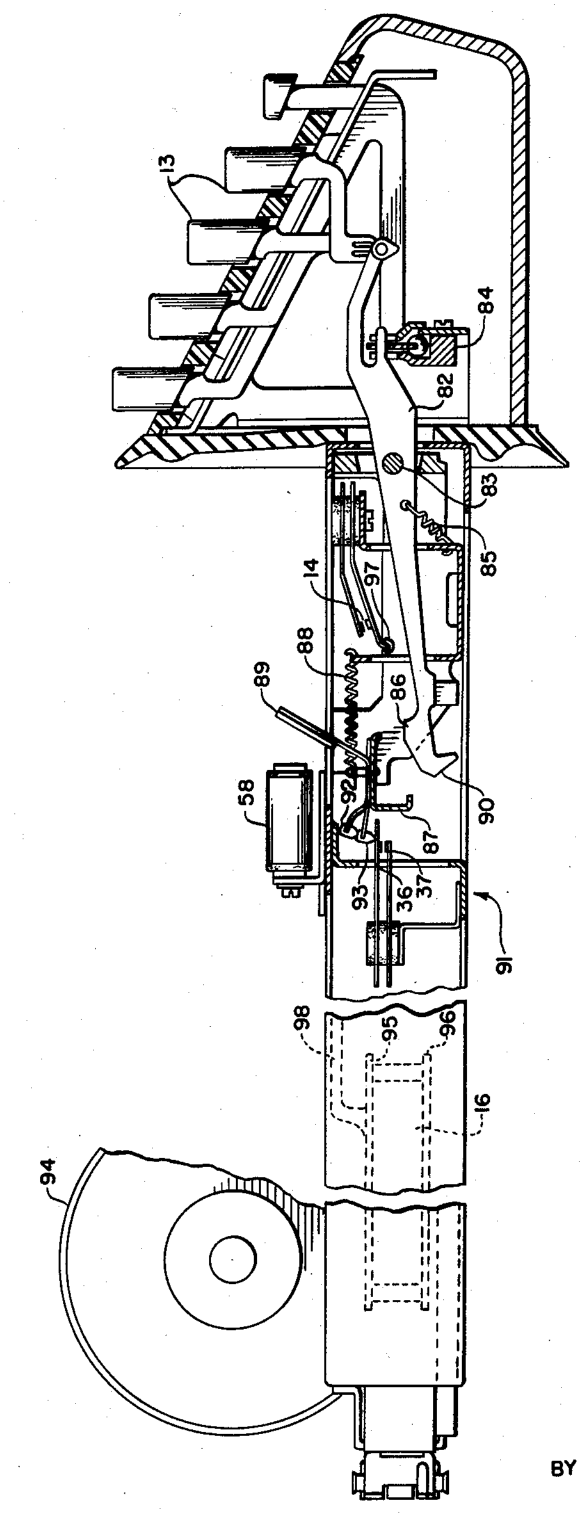
Fig. 8 is a cross sectional view of the keyboard device according to the present invention.

Having set forth the general organization of the system according to the present invention, detailed descriptions of the keyboard device, page printer and electrical circuits will now be given. Referring to Fig. 8, the keyboard device shown therein is of the type disclosed in United States Patent No. 2,607,848, granted August 19, 1952 to W. J. Zenner. However, in the present embodiment of the invention, a series of key-lever-operated contacts have been substituted for the selector mechanism of said patent, so that upon the depression of a key 13, as previously mentioned, a permutation code combination of impulses is generated under the control of the diode converter 16 and delivered over conductors 15–1 to 15–5 to the electronic transmitter 12.

The keys 13 are slidable vertically and are pivotally articulated to individually associated operating levers 82 mounted on a common pivot shaft 83. A ball lock mechanism 84, well known in the art, is employed as a key lock, preventing the depression of more than one key at any one time. Levers 82 are normally biased counterclockwise (as viewed in Fig. 8) by individual springs 85. As described in said Patent No. 2,607,848, each lever 82 is provided adjacent its left end (as viewed in Fig. 8) with a projection 86 which cooperates with the upper flange of a bail 87, so that when a key 13 is depressed, its associated lever 82 is rotated clockwise to cause the projection 86 to strike the upper flange of bail 87 to cause the bail 87 to be rotated counterclockwise. The extremity 90 of lever 82 is conformed to provide a locking relation with the shortened lower flange of bail 87, whereby, upon actuation of one key member 13, the remaining key members 13 are locked against operation, and the lever 82 is locked in the operated position, both by the lower flange of bail 87. Bail 87 is normally biased counterclockwise by its spring 88.

Appropriately carried on the bail 87 is the armature 89 of the previously mentioned keyboard lock magnet 58 suitably mounted on the base 91. Also, mounted side by side on the bail 87 are two contact actuators 92 and 93 adapted to operate in proper timed relation, the start control contact 36 and the storage release contact 37, respectively. As previously mentioned, the contact 37 is closed first by actuator 93, and contact 36 is closed last by actuator 92. A motor 94 is suitably mounted on the base 91.

The diode converter 16 is composed of a plurality of silicon diodes (24, 25, 27, 28, etc. in the present embodiment) mounted on two terminal boards 95 and 96, stacked one on top of the other and mounted in the left rear compartment of the base 91. The levers 82 when operated by their respective keys 13, act upon actuators 97 to close the contacts 14. The thirty-two inputs of the diodes converter 16 are thus connected to the individual character code lever contacts 14 by means of a cable 98 mounted along the inner left side of the base 91.

The following operational sequence is given by way of example, and it is understood that the timing and movements indicated are not absolute. For example, the selection of a particular character output signal is controlled by the depression of the corresponding key 13. The linkage of each key to its corresponding lever 82 produces a rotation of the latter about the shaft 83 for any downward displacement of the key. When the lever 82 revolves through an angle of three degrees, it comes into contact with the bail 87. Further rotation produces movement of the bail 87, resulting in closure of contacts 36 and 37, and also produces closure of a contact 14.

When the bail 87 is rotated ten degrees from its original position, the storage release contact 37 is closed by its individual actuator 93, putting out a positive potential pulse. This pulse is used to clear the previously selected character out of the storage or bi-stable circuits in the transmitting distributor, as will hereinafter appear. When the bail 87 reaches the 15-degree position, the selectively operated lever 82 closes its contact 14, sending a positive pulse to the corresponding input in the diode converter 16.

When the bail 87 reaches the 25-degree position, start control contact 36 is closed by its actuator 92, sending a positive pulse into the start control bi-stable storage device. This starts the transmitting distributor, which in turn energizes the locking magnet 58. When the bail 87 is thus in the locked position, the selectively operated lever 82 is locked in the clockwise position by the lower projection of bail 87 cooperating with the surface of extremity 90 until the transmitting distributor has completed the transmission of the character corresponding to the operated lever 82, and de-energizes the locking magnet 58. At that time, spring 85 on the operated lever 82, and spring 88 on the bail 87 return the mechanism to its original position, ready for the next selection.

Closure of the storage release contact 37, the operated contact 14, and the start control contact 36 produces positive pulses whose lengths are dependent upon how long the key 13 remains depressed. To achieve non-repeating, coupling capacitors, in the associated unit, are placed between the contacts and their respective circuits in the transmitting distributor, so that a positive pulse is provided only at the moment of closure of each contact. This permits removal of key pressure by the operator at will after the key is initially depressed, and requires complete release and reoperation of the key if the character is to be repeated. The ball-lock device 84 prevents more than one key from being depressed at any one time.

The repeat key, which is one of the function keys, is attached to a lever 82 which has no rear extension 86 to engage the bail 87. The only function of the lever 82 associated with the repeat key is to close its contact 47 (Fig. 1), similarly positioned and operated to contacts 14, to send a positive pulse into the repeat circuits in the transmitting distributor 12. The last character put into storage in the transmitter 12 is then repeated automatically as long as the repeat key is held depressed.

The break key is attached to a similar short lever 82 whose function is to close the break contact 52 (Fig. 1), again similar to contacts 14, sending a positive pulse into the line relay circuit of the transmitting distributor 12, causing it to send the spacing (open line) signal as long as the break key is held depressed.

Having reference to Figs. 9 to 13, inclusive, the page printing apparatus according to the present invention will now be described.

The printing mechanism consists of a multiple typewheel 101, a series of print hammers 107 in an assembly, (Fig. 10) a print hammer impeller 113, a paper feed device (Fig. 9), a ribbon feed device (Fig. 11), and a pulse generator device (Figs. 12 and 13) associated with the typewheel shaft 102.

Figure 10:
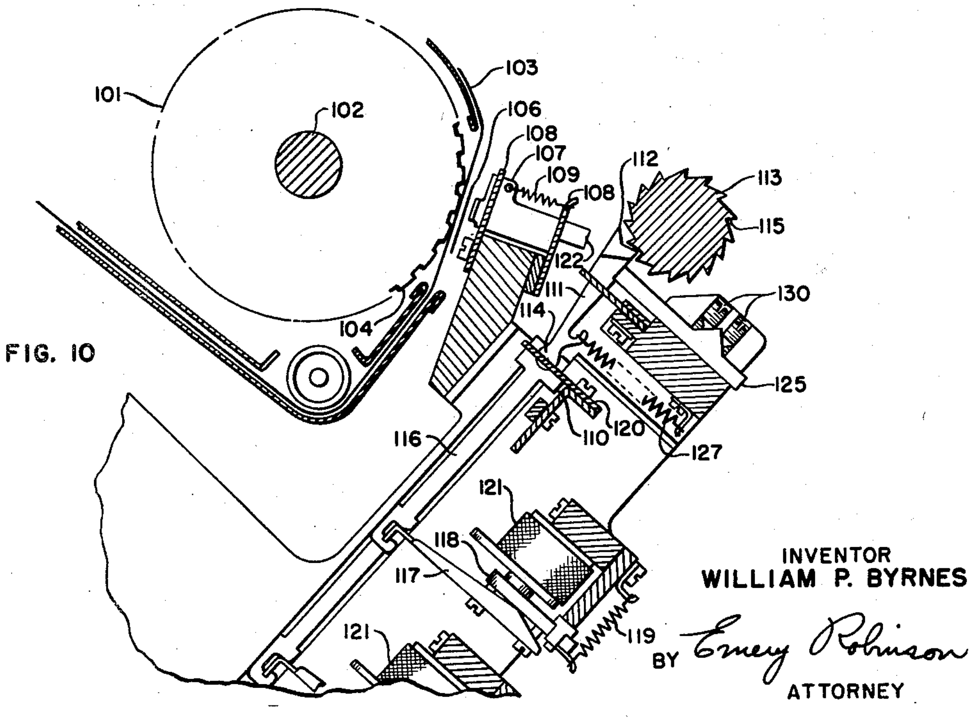
Fig. 10 is a cross sectional view of the printing elements associated with the page printer shown in Fig. 9.

Referring now to Fig. 10, the multiple typewheel 101 is made up of seventy-eight identical typewheels keyed to the shaft 102 to be rotated thereby at a predetermined rate of speed. Each typewheel consists of fifty-two character positions 104 around its periphery and is so keyed to the shaft that each corresponding character position 104 occupies the same angular position relative to the shaft 102.

The paper 103 is fed through the paper feed device, to be described in detail later, so as to be tangent to the periphery of the multiple typewheel 101 while the ribbon 106 is positioned between the paper 103 and a print hammer 107.

Associated with each of the above-mentioned individual typewheels is a print hammer assembly, as shown in Fig. 10. In the interest of clarity, only one such assembly will be described, but it shall be understood that there are seventy-eight such assemblies. A pair of print hammer guides 108 are suitably mounted on the frame and have a print hammer 107 slidably mounted therein. The hammer 107 is held in its retracted position by a spring 109.

A print hammer pawl 111 is pivotally mounted at 114 to a slidably mounted interponent 116 which is in turn articulated to one end of an armature extension 117. The armature extension 117 is fashioned to move with a pivotally mounted armature 118 which is associated with a printing control magnet 121 and normally pivoted counterclockwise by its spring 119 when the magnet 121 is not energized. The impeller 113, with individual teeth 115, is suitably positioned above the extension 112 of the pawl 111 and is rotated at a constant speed. The speed of the impeller 113 relative to that of the multiple typewheel 101 is in a ratio such that one tooth passes the pawl extension 112 for each typewheel character 104 that passes the face of the hammer 122.

Figure 12:
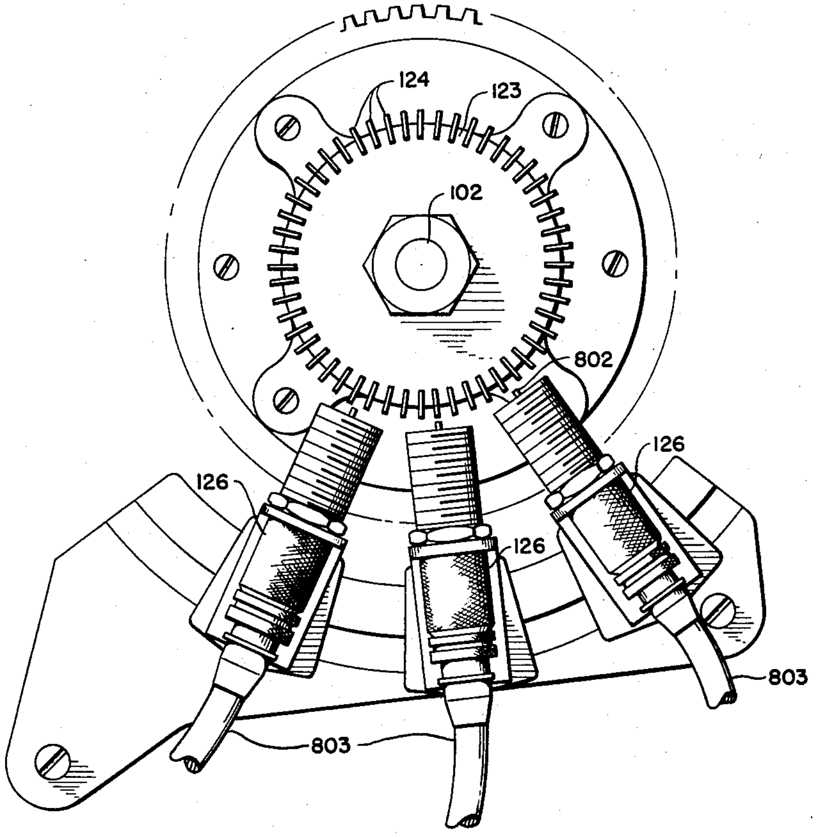
Figs. 12 and 13 are views showing the index wheel and magnetic pickup assembly.
Figure 13:
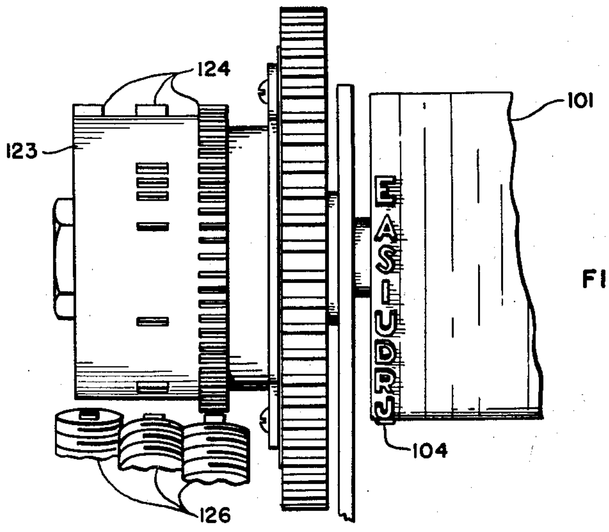

Referring now to Figs. 12 and 13, a rotor or index wheel 123 is keyed to the shaft 102 of the multiple typewheel 101. The rotor 123 has three rows of teeth 124. A magnetic pickup 126 is associated with each row and is wired to the binary counter 77 (to be hereinafter described) to feed the pulses thereto. The inner row has fifty-two equally spaced teeth, corresponding to the character positions on the multiple typewheel 101. The middle row has ten teeth that serve to introduce additional pulses to step the binary counter past those code combinations which do not correspond to characters to be printed. The outer row has one tooth, the purpose of which is to set the binary counter back to zero at the proper point in each printing cycle. The operation of the binary counter is to be taken up in detail later in the specification.

Figure 11:
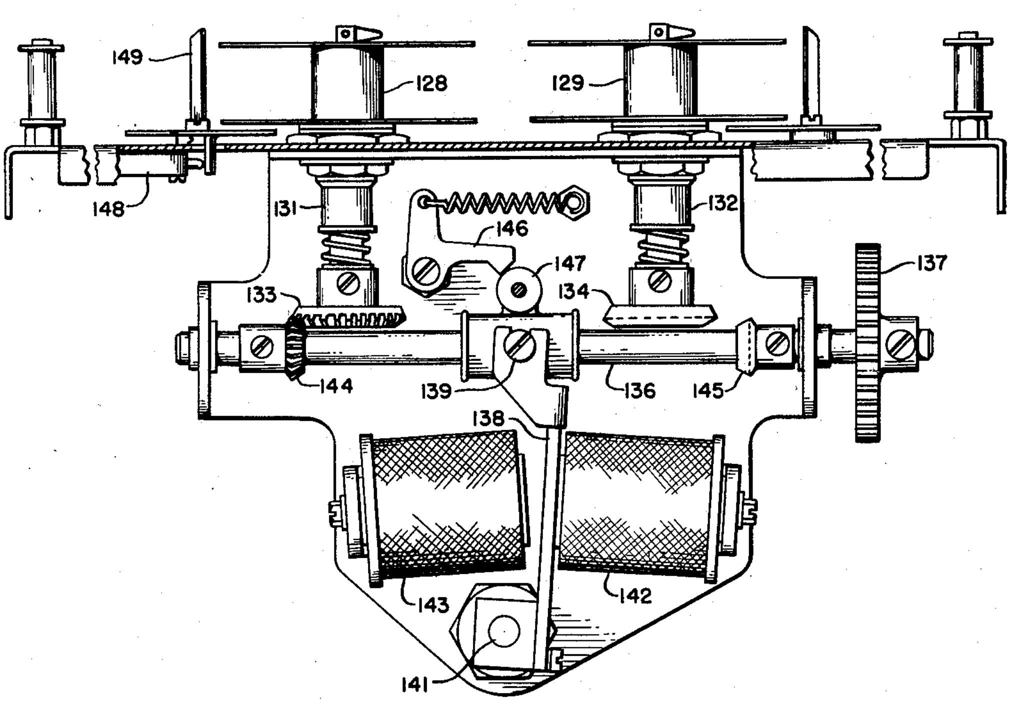
Fig. 11 is an elevational view of the ribbon feed and reverse mechanism.

Referring now to Fig. 11, a shaft 136 is suitably mounted in the frame so as to be continuously rotated by the typewheel shaft in any suitable manner such as a belt between the typewheel shaft and the ribbon shaft at the sprocket-type pulley 137. An armature 138 is pivotally articulated with the shaft 136 at the point 139 and pivotally fastened to the frame at 141 so as to be rotated either clockwise by the magnet 142 or counterclockwise by the magnet 143. Energization of magnet 142 causes the armature to be rotated clockwise and thereby moves the shaft 136 to the right so that the left gear 144 is engaged with the level gear 133 on the shaft 131 which drives the left ribbon spool 128. The shaft 136 is constrained in its selected position by cooperation of the detent lever 146 with the detent 147. When the magnet 143 is energized, the right-hand spool 129 is similarly engaged through the counterclockwise movement of armature 138, moving shaft 136 to the left, engaging gear 145 to bend gear 134, thereby causing a reversal of the ribbon feed.

Reversal of the ribbon feed is accomplished through energization of magnet 142 or 143. Associated with each magnet is a normally open switch 148 and a bifurcated switch lever 149 through which the ribbon passes. When the reversing eyelet on the ribbon engages the bifurcated lever 149, the lever is pulled over to thereby close its associated switch 148 and energize its associated magnet. The shaft 136 is thereby shifted, as set forth above, to reverse the ribbon feed. As the reversing eyelet moves away from the lever 149 the lever 149 is returned to its normal position by an associated spring (not shown) and the switch 148 is opened to de-energize the magnet.

Figure 9:
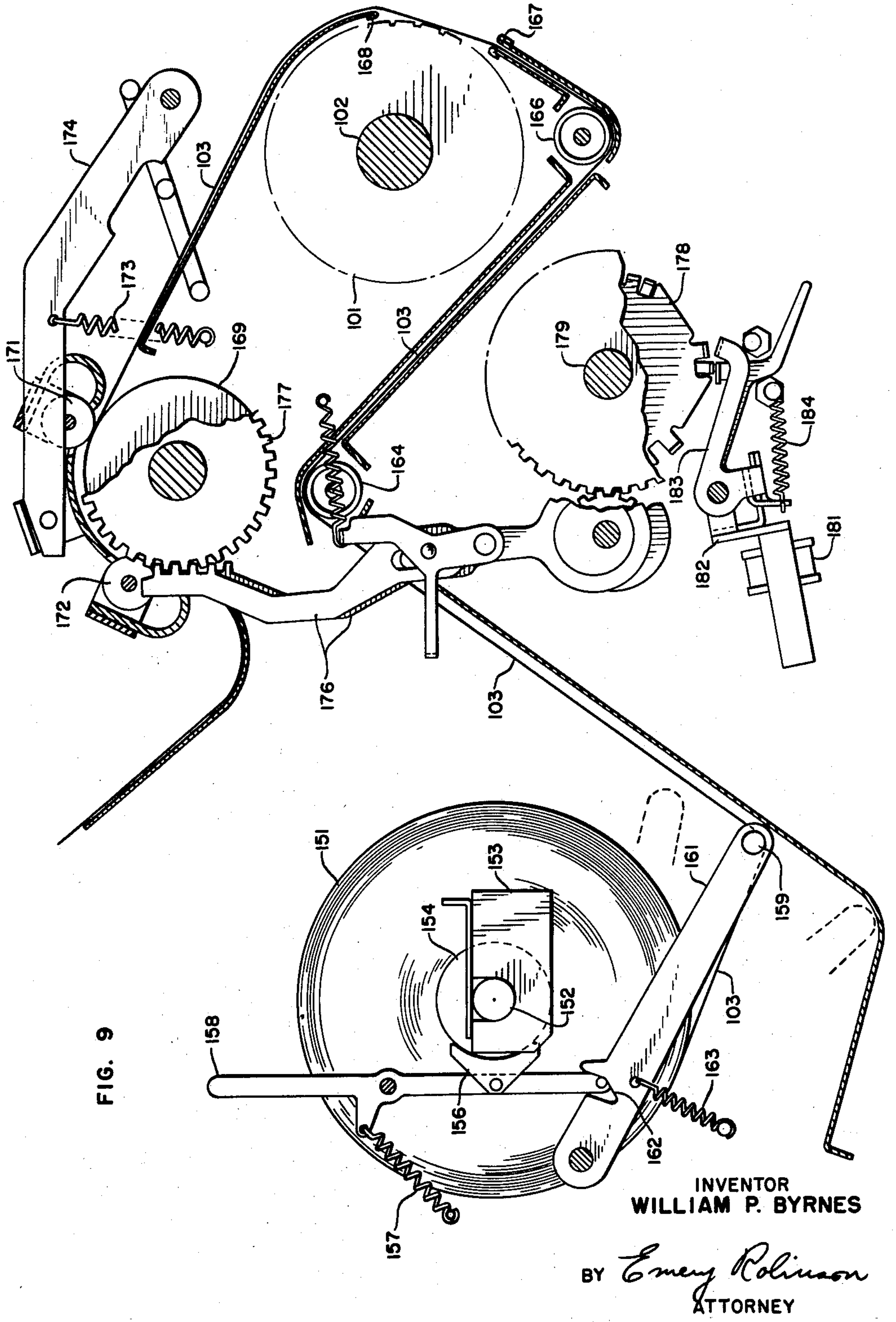
Fig. 9 is a cross sectional view of the page printer according to the present invention.

The paper feed is shown in Fig. 9. The paper 103 is stored on a roll 151 which is mounted on a spindle 152. The spindle 152 is supported in bracket 153 and has a brake drum 154 on one end thereof against which a brake shoe 156 is urged by the cooperation of a spring 157 and a lever 158. The brake is for the purpose of preventing the paper roll from over-traveling which would cause slack in the paper at the printing position. The paper 103 is passed under a roller 159 which is attached to the end of a lever 161 tensioned by spring 163 so that the paper 103 is constantly under tension.

The lever 161 has a cam surface at 162 which is associated with a cam follower on the lower end of the brake arm 158. The configuration of the cam surface 162 is such that when the tensioning lever 161 is in its lowermost position the brake arm 158 is unrestrained, hence applies the maximum of pressure to the brake drum 154. As the available loop of paper is utilized, the tensioning arm 161 is rotated counterclockwise until cam surface 162 engages the cam follower on the lower end of arm 158, after which it tends to rotate the brake arm 158 clockwise thereby reducing the pressure of the brake shoe 156 on the drum 154. With the brake pressure released, paper roll 151 is accelerated for the more rapid stripping of paper therefrom.

As paper usage increases, the lever 161 moves further upward thus causing an increase of tension because of the stretching of the springs 157 and 163, thereby effecting an even greater accelerated stripping of the paper from roll 151. When usage becomes less than the rate of supply, arm 161 drops, cam surface 162 disengages from lever 158, brake 156 engages drum 154, and the roll 151 is brought to a rapid stop, with paper tension maintained by the weight of roller 159 and arm 161, and the tension in spring 163.

The paper is fed around the rollers 164 and 166, through the lower guide 167 over the upper guide 168 and around the paper feed roller 169. The paper is held in contact with the paper feed roller 169 by the pressure rollers 171 and 172 which are urged toward the feed roller 169 by the spring 173 acting through the lever 174.

The paper 103 is advanced by rotating the paper feed roller 169 which is selectively driven by the cooperation of a pair of eccentrically mounted pawls 176 with the feed roller gear 177 which is fastened to the feed roller 169. A detailed description of the feed roller advancing mechanism is given in the United States Patent No. 2,667,256, issued to B. F. Madsen, on January 26, 1954, wherein the pawls 176 and the gear 177 correspond to the pawls 13 and 14, and gear 11 shown in Figs. 1 and 2 of said patent. The line feed clutch 178, which in the present invention is a six stop clutch, is mounted on the clutch shaft 179. The shaft 179 is suitably driven by any convenient source, such as the typewheel shaft 102.

The line feed function is accomplished when the line feed magnet 181 is momentarily energized from the control unit 71 (to be presently described) in response to the line feed function code signal. Energization of the magnet 181 causes the armature 182 to move toward the magnet 181 to thereby rotate the clutch trip lever 183 clockwise against the urging of its spring 184 to permit the clutch 178 to rotate. Because the magnet 181 is only temporarily energized, the lever 183 is rotated back into its blocking position by its spring 184 before the clutch 178 makes one-sixth of a revolution, thereby causing the clutch to disengage after one-sixth of a revolution. As described in the aforementioned Madsen patent, rotation of the clutch 178 actuates the pawls 176 to rotate the paper feed roller 169, an incremental angular amount and thus advances the paper 103.

In operation, the multiple typewheel 101 (Figs. 10 and 13) is being rotated at a constant speed while the impeller 113 is being rotated at a speed which is proportional to the speed of the typewheel 101 so that one of the teeth 115 of the impeller 113 is in position to actuate the print hammer 107 each time one of the character positions 104 passes the printing position. As will presently appear, the binary counter 77 receives the signal and coordinates it with the pulses from the rotor 123 (Fig. 12). Through the pulses from the rotor 123, the binary counter is oriented as to the momentary position of the typewheel. Other circuits in the storage and character recognition units 67, 68 and 69 determine the line position to be printed. In accordance with the aforementioned orientation the appropriate magnet 121 is energized at the proper instant of typewheel rotation.

Energization of the magnet 121 causes the armature 118 to be momentarily attracted toward the magnet 121 against the urging of the spring 119. As the armature 118 moves toward the magnet 121, the armature extension 117 moves with it, thereby moving the interponent 116 upward. The pawl 111 is also moved upward until a shoulder 110 on interponent 116 contacts a rest on frame 120. The pulse to the magnet 121 is of such duration that the magnet is de-energized before the upward travel of the linkage is completed and the travel is completed as a result of the original impetus. At the completion of the upward travel, the extension 112 of the pawl 111 is in the path of a tooth 115 of the impeller 113 so the pawl 111 is rotated counterclockwise to strike the extension 122 of the print hammer 107 to move the hammer 107 to the left thereby striking the selected character position with the paper 103 and the ribbon 106. The relative masses of the pawl 111 and the hammer 107 are such that most of the inertia of the pawl 111 is spent in imparting the movement to the hammer 107 so that its major motion after striking the hammer 107 is first downward in response to the spring 119 and then rightward in response to the spring 127, with the result that there is in interference with the impeller 113. Backstop lever 125 and cone printed adjusting screws 130 have been provided for the purpose of varying the position of pawl 111. The operation of the paper feed and ribbon are as heretofore described.

The transmitting circuit shown in Figs. 14, 15 and 16 is basically similar to the transistorized circuit disclosed in the aforementioned copending application, Serial No. 542,735. The connector 11 of said copending application is substituted by the keyboard device 11 of the embodiment disclosed herein, and the conductors 15–1 to 15–5 (Fig. 14) are analogous to conductors 12 to 16, inclusive, of said copending application. Each of the conductors 15–1 to 15–5 is connected to a bi-stable storage device which consists of a pair of junction transistors. These transistors are of the PNP junction type and are designated by the reference numerals 200 to 209, inclusive.

Each of the transistors 200 to 209, inclusive, has its collector connected to a source of negative battery and its emitter connected through a resistance to a ground potential. The base of each of these transistors is connected to a source of negative potential which is derived from the collector of the associated transistors 205 to 209. The base is at a more negative potential than the emitter potential for transistors 200 to 204, inclusive, consequently these transistors are normally in a conductive state, which is the condition or state following the receipt of the storage release pulse whose function it is to clear the last character out of storage, as will presently appear. The corresponding transistors 205 to 209, inclusive, are nonconducting, due to their bases being more positive than their emitters.

When a signal is applied on conductors 15–1 to 15–5 pursuant to the depression of a key 13, the appearance of a spacing condition (no potential) on conductor 15–1 does not affect the conductivity of the transistor 200. If a marking (positive potential) condition is impressed on conductor 15–1 then the base of transistor 200 rises to drive the base more positive with respect to its emitter, thereby shutting off this transistor. Upon transistor 200 being shut off, its collector potential drops (becomes more negative) and this drop in potential is impressed through a coupling resistance 211 to the base of the transistor 205 to drive the base negative with respect to its emitter, thus rendering the transistor 205 conductive. As the transistor 205 assumes a conductive condition, its emitter potential drops, and due to the coupling between emitter electrodes of the transistors 200 and 205, and between the collector of transistor 205 and the base of transistor 200, the transistor 200 is precluded from reoperating when the marking condition is removed from the conductor 15–1. As signal impulses representative of either a marking or spacing condition are impressed on the other leads 15–2, 15–3, 15–4 and 15–5 the respective bi-stable devices associated therewith are accordingly operated. It may be thus appreciated that the bi-stable devices are operated in a positive fashion in accordance with the received signal impressed over the conductors 15–1 to 15–5, inclusive. Moreover, it is understood that, in all cases, the bi-stable device is used to store information for a period of time. The transmitting and receiving distributors, and the storage units all use such bi-stable devices to store code impulses. In accordance with the present embodiment of the invention, the bi-stable devices 200 to 209, inclusive, are thus set in code for the last character transmitted.

In the normal idle condition of the transmitting circuit shown in Figs. 14, 15 and 16, which conjoin one another, as shown in Fig. 17, the bi-stable storage devices 200 to 209 are set up in code according to the last character transmitted; that is, certain ones of the transistors in the group 200 to 204 are nonconducting and vice versa. The start control bi-stable storage device 212—213 (Fig. 14) is in a reset condition with its transistor 212 in a normally conductive state waiting for the next start control pulse from the keyboard upon the closure of contact 36. Further, in said idle condition, the start-stop oscillator 210 (Fig. 16) is stopped; the start-stop distributor comprising transistors 233 to 239 (Fig. 15) has its stop element or transistor 239 in the "on" condition; the output amplifier circuits 261 and 262 are putting out steady marking signal to the relay 264 circuit, and the output signal is a steady "marking" signal.

The storage elements, as previously mentioned, are five bi-stable storage devices comprising transistors 200 to 209, inclusive, in which, for a "mark," the right side conducts and the left side is cut off. For a "space" the right side is cut off, and the left side conducts. When a character key 13 on the keyboard 11 is depressed, the storage release contacts 37 close to deliver a positive storage release pulse to the base of the right transistors 205 to 209, inclusive, in order to clear the last character out of storage. Thereafter, the contact 14 (Fig. 8) associated with the key depressed, closes and code pulses in the combination for the character to be transmitted are then applied, through the diode converter 16, to the bases of the left transistors 200 to 204, and the character is set up in storage in the bi-stable storage devices 200 to 209. The output from the bi-stable storage devices are taken from the right transistors 205 to 209. These outputs (−7 volts for "mark" and −17 volts for "space") go to the pulse "AND" gates 241 to 245 and await the operation of the start-stop distributor 233 to 239.

As previously mentioned, the start control circuit comprises the bi-stable transistor pair 212—213 whose left side is normally conducting and whose right side 213 is normally cut off. The function of this circuit is to start the start-stop oscillator 210. The start control pulse from the keyboard, generated upon the closure of contact 36, is a positive pulse of predetermined potential applied to the base of transistor 212. The other input to this base through capacitor 214 associated with the repeat gate 215 is for the repeat function to be hereinafter described. When the start control bi-stable device 212—213 is triggered the collector of transistor 212 becomes more negative (−17 volts). This output goes to the stop pulse timer gate 216, the function of which will be hereinafter described. Gate 216 is an OR gate for a predetermined potential (−7 volts) and AND gate for a different potential (−17 volts). The other input to the gate 216 is normally −17 volts (for example) so the output becomes −17 volts. This potential is fed to the start control gate 217, whose function is to start the oscillator 210. The output of gate 217 is −17 volts when either input is −17 volts, and this is fed to transistor 218 in the oscillator control circuit comprising transistors 218, 219 and 221. The oscillator 210 will run when the input to the control circuits (218, 219 and 221) is −17 volts.

The output of the oscillator 210 is a sine wave which swings, for example, from −6 to +5 volts. The period of one cycle corresponds to the duration of one pulse in the start-stop code signal. The words-per-minute (wpm) speed is changed by a switch device, indicated generally as 222, for controlling the proper combination of inductances 223 with capacitances 224 to provide the desired resonant circuit for word speeds for example, of 60, 66, 75, 100, 250 or 750 per minute. The variable inductors 223 provide fine adjustment of frequency. The oscillator signal is delivered through resistance 225 to the base of transistor 226. Transistors 226, 227 and 228 are all common emitter amplifiers which are used to change the sine wave output of the oscillator 210 into a square wave with a 180° phase reversal. The output of transistor 228 is applied to a resonant ringing circuit comprising capacitance 229 and inductance 231. This ringing circuit is similar in its basic principles to that in the transistor ring type distributor disclosed in copendng application, Serial No. 349,637, filed April 20, 1953 by R. A. Slusser, now Patent No. 2,876,365, granted March 3, 1959, and produces one sharp positive impulse for each negative to positive input signal transition from transistor 228. The output of the drive pulse amplifier 232, in response to the positive impulses, is a series of 10 microsecond negative spikes approximately 12 volts in amplitude, which are used to drive the start-stop distributor, comprised of transistors 233 to 239, inclusive, and pulse "AND" gates 241 to 245, inclusive. In said start-stop distributor, the transistor 233 with the associated gate 217 controls the start impulse of the start-stop code signal. The transistors 234 and 238 with their associated gates 241 to 245, respectively, control the intelligence pulses, and transistor 239, through diode 247, controls the stop pulse.

Thus, the start-stop distributor comprising transistors 233 to 239 is a seven-element ring consisting of a start element, five code elements, and a stop element. Its operation is similar to that described in the aforemention application Ser. No. 349,637. In the idle condition, the transistor 239 (governing the stop element of the code) is conducting or "on," and the six other elements 233 to 238, inclusive, are "off." As an example, the outputs of the distributor are taken from the collectors and are —7 volts for "on" and —17 volts for "off."

The first drive pulse turns the stop element transistor 239 "off" and the start element transistor 233 "on." It is observed that there is a connection from the collector of the stop element transistor 239 over conductors 281 and 246 to the start control gate 217, putting —17 volts (for example) into this gate when the stop transistor 239 is turned "off." Therefore, the oscillator 210 will run as long as the stop element transistor is putting out —17 volts. The collector of transistor 239 is also connected through rectifier 247 to the output of all the gates 241 to 245, inclusive, changing the common output of the gates over conductor 254 at junction 248 and resistance 249 from —7 volts (marking) to —17 volts (spacing) and initiating the sending of the "start" pulse. The connection from the collector of start element transistor 233, over conductor 251 and through capacitance 252 and rectifier 253 to the base of transistor 213, resets the start control bi-stable device 212—213.

The start pulse transistor 233 stays "on," timing off the "start" pulse, until the second distributor drive pulse turns it "off" and the No. 1 pulse transistor 234 "on." It is noted at this time that the collectors of transistors 234 to 238, inclusive, are connected to the pulse "AND" gates 241 to 245, inclusive. As transistor 234 and each subsequent distributor element of transistors 235 to 238 are turned on by the series of drive pulses, their outputs are gated with the outputs of their respective bi-stable storage elements 200 to 209, producing the corresponding code element potentials. The seventh drive pulse turns on the stop pulse transistor 239, sending the —7 volt marking stop potential through rectifier 247 and also stopping the oscillator through the start control gate 217. The outputs of all the gates are tied together over conductor 254; and the resulting start-stop signal is fed over conductor 255 and through resistance 256 to the mixer transistor 257 of a common emitter amplifier comprising marking and spacing control transistors 258 and 259, respectively, and marking and spacing transistor amplifiers 261 and 262 respectively, thence over conductor 263 to a polar output relay 264 and over the signal line 260 in the manner described in said copending application Serial No. 542,735.

The special features of the transmitting circuit hereinabove referred to will now be described. As mentioned previously, a keyboard lock magnet 58 is provided which prevents, through bail 87, a second key from being depressed while the character represented by the first key is being transmitted. Facilities comprising transistors 267 and 272 are provided in the transmitting circuit, shown in Fig. 14, to operate the lock-magnet 58 upon the operation of each character key lever 13. The purpose of the keyboard lock circuit is to hold the keyboard inoperative during the transmission of a character, and then to release the keyboard for the setting up of the next character during the stop time. Transistor 267 (Fig. 14) is controlled by the start control gate 217 (Fig. 15) over conductor 268 from junction 269. Gate 217 has an output of —17 volts during transmission of a character and —7 volts at other times. The —17 volt potential applied to the base of transistor 267 (a common collector amplifier) from gate 217 causes conduction so that the emitter of transistor 267 drops to approximately —17 volts. Resistance 271 transfers this output to the base of a power transistor 272 which is driven into conduction. The current through transistor 272 energizes the keyboard lock magnet 58, which is in the collector circuit, holding the keyboard inoperative. When the output of the start control gate goes to —7 volts (at the beginning of the stop pulse) the keyboard latch magnet 58 is de-energized and the keyboard is released. This enables the next key to be depressed during the stop pulse.

The stop pulse timer, comprising transistors 273 and 274, is a univibrator circuit used to time off the stop pulse at the various keyboard transmitting speeds (for example, 60, 66, 75 and 100 words per minute). The switch device 275 switches in different timing capacitors 276 in order to change the operating period for the various speeds. A positive trigger pulse to the base of the transistor 273 is brought in through rectifier 277 and capacitance 278 over conductors 279 and 281 when the stop pulse transistor 239 of the distributor 233—239 turns "on." It is now observed that there are two outputs taken from the stop pulse timer 273—274.

The collector of transistor 274, which is normally at a potential of —17 volts, is connected to the stop pulse timer gate 216. Gate 216 is an "OR" gate whose output will be —7 volts when either input is —7 volts. It is recalled that in order to start the oscillator this gate had to put out —17 volts. The other input to gate 216 comes from transistor 212 of the start control bi-stable device 212—213. While the stop pulse timer (comprising transistors 273 and 274 and switch device 275) is timing off the stop pulse, the collector of transistor 274 is at —7 volts. This prevents stop pulse timer gate 216 from putting out —17 volts, even if the depression of another key triggers the start control bi-stable device 212—213, causing the other input to the gate to swing to —17 volts. In this event, the gate 216 must wait until the stop pulse timer 273—274 triggers back to its normal state, at which time it can put out —17 volts and start the oscillator 210 for the sending of the next character.

The other output is taken from the collector of transistor 273, which is normally at —7 volts, and applied to the repeat gate 215. While the stop pulse timer 273—274 is timing off the stop pulse, the collector of transistor 273 is at —17 volts. The function of the repeat gate 215 is to cause the re-transmission of the last character sent for as long as the repeat contact 47 is held closed by the prolonged depression of the repeat key. The repeat gate 215 is an "AND" gate which puts out —7 volts only when each input is —7 volts. The two inputs to the gate 215 are (1) from the repeat contact 47 over conductors 49 and 51 and (2) from the collector of transistor 273 over conductor 282. It is to be recalled that in accordance with the present invention, a character is held in storage until depression of the next character key clears the storage. Now, operation of the repeat key does not clear the storage of the last transmitted character.

The repeat key can be depressed at any time. Assume that a character has already been transmitted, and the stop pulse timer 273—274 is in its normal state with the collector of transistor 273 putting out —7 volts. The repeat key closes its contact 47 to source of current 17 (+12 volts) and applies —7 volts, from the junction of resistance 283 and resistance 284, to the other input of the repeat gate 215, causing the output of the gate to swing from —17 volts to —7 volts. This change is differentiated through capacitance 214 and the resulting positive pulse triggers the start control bistable device 212—213, initiating transmission. When the stop pulse timer 273—274 is subsequently triggered, designating the beginning of the stop time, the collector of transistor 273 swings to —17 volts, and the output of the repeat gate 215 also goes to —17 volts. At the end of the stop time the collector of transistor 273 goes back to —7 volts, again triggering the start control bi-stable device 212—213. This action cycle continues as long as the repeat key is held depressed, and the character originally in storage is repeatedly transmitted.

The break key on the keyboard closes contact 52 (Figs. 1 and 14) which applies —22 volts from source of potential 54, through contact 52 (when closed), over conductor 57 to junction 284 to the output of pulse AND gates 241 to 245, thereby introducing a continuous spacing "Signal Line Break" condition to the output relay circuits.

For operation at high speeds, for example, 250 to 750 words per minute, a high speed tape reader of the form shown in United States Patent No. 2,578,185, granted December 11, 1951, to R. H. Halvorsen, may be used.

The receiving distributor circuit shown in Figs. 18, 19 and 20, which conjoin one another, as shown in Fig. 21, is basically similar to the transistorized circuit disclosed in the aforementioned Patent No. 2,879,332. The start-stop signal enters the line relay circuit 300 of the receiving distributor over signal line 270, which may be an extension of signal line 260 in the cooperating sending distributor. The line current passes through either resistances 301 and 303 for 60-ma. operation, or through resistances 302 and 304 for 20-ma. operation, as selected by input current switch 305. The drop across loop resistor 306 is measured by a voltmeter on the power supply panel as an indication of the line current. The purpose of the line relay is to translate the start-stop signal into usable form, and to isolate the receiving distributor circuits from the signal line direct current power source.

Approximately −6 volts are developed across resistance 301 by the 60-ma. line current, or resistor 302 by the 20-ma. line current. Transistor 307, winding 308 of transformer 309, and a tank circuit formed by winding 311 of transformer 309 and capacitance 312 comprise a tuned-base oscillator circuit. The frequency of oscillation is approximately 68 kilocycles. Oscillation takes place only when a marking signal is received, with the line current providing all the power required. The +6 volts developed across resistance 301 or 302 is used as a collector potential for transistor 307. Transistor 313 must also be conducting in order for transistor 307 to sustain the oscillation. Transistor 313 is controlled by rectifier 314 (a Zener diode) whose back resistance breaks down at 3 volts, driving the base of transistor 313 positive and allowing transistor 313 to conduct. Thus, oscillation will not start until the voltage across resistances 301 and 303, or 302 and 304, has built up to +3 volts. The sensitivity control comprising resistance 310 varies the level at which transistor 313 is allowed to conduct and, consequently, the point at which the receiving distributor recognizes a mark-space or space-mark transition. The output from the line relay circuit is inductively coupled to winding 315 of transformer 309.

It is observed that the circuit shown in Figs. 18, 19 and 20 is substantially the same as the circuit shown in said copending application Serial No. 542,662, in that transistor 316 comprising the line relay amplifier, transistors 317 and 318 comprising the signal shaper, transistors 319 and 321 comprising the range control circuit, shown in Fig. 18 have their counterpart in said copending application Serial No. 542,662. Also, start control gate 322, oscillator control transistors 323, 324 and 325, start-stop oscillator 326, and transistors 327 to 333, shown in Fig. 19 have their counterpart in said copending application Serial No. 542,662. Moreover, the start-stop distributor transistors 334 to 340, gates 341 to 345; storage release amplifier 346, and the bi-stable storage devices 347 to 351, shown in Fig. 20 have their counterpart in said copending application.

In Fig. 18, a switch device 352, analogous to switch 275 (Fig. 14), is provided to switch in different timing capacitors 353 in order to change the operating period for the various speeds. Likewise, in Fig. 19, a switch device 354, analogous to switch 222 (Fig. 16), is provided for controlling the proper combination of inductances 355 with capacitances 356 to provide the desired resonant circuit for word speeds of 60 to 750 words per minute in predetermined steps.

The outputs of the receiving distributor consist of ten code potentials (five marking and five spacing) from the ten collectors of the five bi-stable storage devices 347 to 351, and a pulse from a stop pulse transistor amplifier 357 (Fig. 20). Transistor 357 (a common collector amplifier) receives its input from transistor 340 which is the stop element transistor of the distributor 334–340. The output from the emitter of transistor 357 swings from −17 volts to −7 volts when the stop element or transistor 340 turns on. This output is delivered over conductor 370 to terminal 358 and is called the "stop pulse." Terminals 359 to 368, inclusive, take code potentials from the bi-stable storage devices 347 to 351. These are −7 volts for marking and −17 volts for spacing on the odd numbered terminals, and the opposite potentials on the even numbered terminals, and are utilized during the stop pulse interval of the distributor 334–340. The code pulses go to the three storage and character units 67, 68 and 69, and to the control unit 71, as will hereinafter appear. The stop pulse goes to the control unit 71 (see Fig. 2).

The output of the stop pulse amplifier 357 is also applied to the indicator amplifier (transistor) 369 (a common emitter amplifier). Transistor 369 conducts during the stop interval, causing indicator lamp 371 to light. The flashing of lamp 371 indicates the activity of the receiving distributor in accepting signals. A steady glow shows that the distributor is at rest with no signals being received.

As previously mentioned in connection with Fig. 2, the code pulses from the receiving distributor 65 (the circuit for which was just described) are delivered over the five conductors 66 to the three storage and character recognition units 67, 68 and 69, the general function of which is to accept the code combinations from the receiving unit 65, recognize the character and deliver a firing impulse (herein called a character recognition pulse) to the proper thyratron print circuit to effectuate the printing operation. Moreover, the code pulses from the receiving distributor are also delivered to the control unit 71. Also, the stop pulse (previously alluded to) is delivered over conductor 72 (Fig. 2) to the control unit 71. It is to be understood that the operation of the storage and character recognition units 67, 68 and 69 depends upon the control unit 71, which determines which of the storage units 67, 68 or 69 is to receive the code pulses from the receiving distributor 65. However, the circuits in the units 67, 68 and 69 will first be described, to be followed by the description of the control unit circuit 71. Therefore, some of the following description may not appear to be complete until the control unit 71 is covered.

It was noted previously that the basic speed of the printing mechanism was approximately 250 words per minute, and that a speed of 750 w.p.m. was attained by simultaneously storing three characters and printing these three characters at an average of 120° spacing in one revolution of the typewheel. The three storage positions are contained in the storage and character recognition units 67, 68 and 69. The circuit shown in Figs. 23, 24, 25 and 26, which conjoin as shown in Fig. 27, applies to any one of the three units 67, 68 or 69, since they are identical, except for unit 69 wherein the 25th printing distributor element puts out a pulse for automatic carriage return and line feed.

Having reference to Figs. 23 to 26, the six bi-stable storage devices 401 to 406 comprise transistor pairs 407—408, 409—410, 411—412, 413—414, 415—416 and 417—418, respectively. Associated with said devices 401 to 406, are individual storage gates 421 to 426, respectively. The inputs to the six storage devices 401 to 406 come from their respective storage gates 421 to 426. Each storage gate 421 to 426 has two inputs; namely, a code pulse and a transfer pulse. Code pulses for the storage gates 421 to 426 come from the receiving distributor 65. The sixth code pulse comes from the control unit 71 (as will hereinafter appear) and appears for figures only, being turned on upon reception of the "Figures" code and remaining on until turned off by reception of "Letters" code. These six code pulses are fed to the storage gates 421 to 426 of all three units 67, 68 and 69. The transfer pulse comes from the control unit 71, but goes to only one of the three units 67, 68 or 69.

In the bi-stable storage devices 401 to 406, the left transistor is normally conducting and the right transistor is normally cut off. For example, in storage device 401, the collector of transistor 407 is normally at −7 volts. This represents a spacing condition. In order to trigger the circuit to the marking condition, with transistor 407 cut off (collector at −17 volts) and transistor 408 conducting (collector at −7 volts), a positive pulse must be applied to the base of transistor 407. The outputs from the storage devices 401 to 406 connect to their respective pulse recognition gates 431 to 436.

The storage gates 421 to 426, from which the storage devices 401 to 406 derive their triggering pulses, are "AND" gates. Code pulses, −7 volts marking and −17 volts spacing, brought in through terminals 441 to 446 on terminal block 450, are fed to their respective gates 421 to 426. Using gate 421 as an example, its code pulse comes in to rectifier 447. The other input is the transfer pulse, which is a sharp pulse swinging from −17 volts to −7 volts, received from the control unit 71. This transfer pulse comes in through terminal 448 and over conductor 449, and for the gate 421, is applied to rectifier 451. Upon receipt of this pulse, the outputs of those gates 421 to 426 whose code pulse inputs are marking (−7 volts) will swing from −17 volts, to −7 volts for the duration of the transfer pulse. This positive change is passed through a coupling capacitor and diode (capacitor 452 and diode 453 for gate 421) and becomes the positive pulse which triggers the respective storage device 401–406 to a marking condition.

Assume that the character signal received is for the first character in a line of print. As such, it must be directed to the first storage and character recognition unit 67. The actual directing, as will presently appear, is accomplished in the control unit 71 by means of a transfer pulse. The second character received is directed to the second storage unit 68, and the third character in the line of printing is directed to the third storage unit 69. Thus, as previously mentioned, the ensuing 4th, 7th, 10th, 13th, etc., character received up to and including the 73rd character in the line are directed to unit 67. The ensuing 5th, 8th, 11th, etc., characters received up to and including the 74th character are directed to unit 68. Lastly, the ensuing 6th, 9th, 12th, etc. characters received up to and including the 75th character in the line are directed to unit 69. Thus, unit 67 receives a transfer pulse for the 1st, 4th, etc. characters; unit 68 receives a transfer pulse for the 2nd, 5th, etc. characters; and unit 69 receives a transfer pulse for the 3rd, 6th, etc. characters.

Once the code combination of a character has been put into storage in the bi-stable devices 401 to 406, it is time to compare that code combination with the output of the binary counter 77. Figs. 7 and 7A illustrate the order in which the code combinations are fed in from the binary counter unit 77 and are indicative of the order or succession in which the characters on the typewheel 101 pass the printing point.

There are six pulse-recognition gates 431 to 436, one for each element in the code combination. Each pulse recognition gate 431 to 436 is comprised of two "AND" gates and one "OR" gate (for positive swinging potentials) and has four inputs. Two of the inputs come from the collectors of the respective bi-stable storage devices 401 to 406. The other two inputs come from the collectors of the respective stages of the six-stage binary counter circuit in the binary counter unit 77. As will presently be described, a binary counting stage consists of two transistors in a bi-stable circuit. A pulse recognition gate 431 to 436 delivers a −7 volt potential when the condition of its respective bi-stable storage device 401 to 406 matches the respective binary counting stage.

For example, referring to pulse recognition gate 431, the "space" "AND" gate consists of rectifiers 454 and 455, and resistor 456. The "mark" "AND" gate includes rectifiers 457 and 458, and resistor 459. The "OR" gate comprises rectifiers 461 and 462 and resistance 463. The outputs of the "AND" gates comprise the inputs to the "OR" gate. Assume that the bi-stable storage device 401 is in the marking condition with the collector of transistor 407 at −17 volts and the collector of transistor 408 at −7 volts. In order to match this condition, the first stage of the binary counter 77 must put −17 volts through terminal 464 to rectifier 455 of the "space" gate, and −7 volts through terminal 465 to rectifier 458 of the "mark" gate. The "mark" gate delivers −7 volts to rectifier 462 because both inputs are −7 volts, while rectifier 461 will receive −17 volts from the "space" gate. The output of the pulse recognition gate 431 will be −7 volts, because one of the inputs to the "OR" gate is −7 volts. Had there been a mismatch between the storage device 401 and binary counter, both "AND" gates and the output of the pulse recognition gate 431 would have remained at −17 volts. It is to be observed that if the storage device 401 had been spacing, and if the first stage of the binary counter had been reversed, the conditions would have matched also, and the "space" AND gate would have put out the −7 volts. When the complete code combination (all six code elements) in the storage devices 401 to 406 matches the combination put out by the binary counter 77, all pulse recognition gates 431 to 436 have an output of −7 volts.

The period during which the code combination in the storage unit 67 can be compared with the code combination from the binary counter 77 begins as soon as a character is put into storage by the transfer pulse. During this period the typewheel 101 will make one revolution, and the six-stage binary counter 77 will complete one cycle of counting, being set up in turn (i.e. successively), in the code combination to match every character on the typewheel. A printing character is set up in the binary counter 52 times during this period. The outputs of the pulse recognition gates 431 to 436 are fed to the recognition pulse amplifiers 471 to 476, respectively, which, as common emitter amplifiers, reproduce the pulses applied to their respective bases. Their emitters, therefore, put out either −7 or −17 volts, as the case may be.

It is observed that there is a rectifier 481 to 486 associated respectively with the amplifiers 471 to 476. These rectifiers 481 to 486 together with a rectifier 487 (Fig. 23) in conductor 488, to which the rectifiers 481 to 486 are connected, form an "AND" gate (character recognition gate) whose inputs come from the emitters of all the recognition pulse amplifiers 471 to 476. Another input comes in through terminal 489 from the binary counter 77 (as will presently appear) and is one of the positive going index pulses (−17 to −7 volts) which drives the six stage binary counter circuit. This pulse appears at terminal 489 at the instant that the binary counter is stepped to the code combinations represented by characters on the typewheel 101 (52 times per typewheel revolution). This pulse insures that the character recognition gate will have an output only at the instant a code combination is first set up in the binary counter circuit, rather than at any time during which the circuit is in that combination. The character recognition gate will have an output only when the −7 volt potentials from all the emitters of the recognition pulse amplifiers 471 to 476 are coincident with the relatively narrow (50 microseconds, for example) index pulse. The output pulse, hereinafter referred to as a character recognition pulse, is of a shape similar to the index pulse. This pulse is connected through resistance 491 to the base of an indicator amplifier 492.

The indicator amplifier 492, a common emitter amplifier, is primarily an amplifier for the indicator lamp 493, and secondarily, a phase inverter for the character recognition pulse. This 10 volt pulse, swinging from −17 to −7 volts, drives transistor amplifier 492, which is normally cut off by −17 volts bias on the emitter, into conduction. The collector potential drops from +75 volts toward −12 volts, providing sufficient potential difference to ignite the neon glow lamp 493. A large resistor 494 limits the leakage current through transistor 492 under cut off conditions. The negative swing on the collector is passed through capacitance 495 to the base of the character recognition pulse amplifier 496. The amplifier 496 is a common emitter amplifier and is biased to cut off by +3 volts on the base. The negative pulse from capacitance 495 drives amplifier 496 into conduction and the collector swings from −22 volts to 0 volts. This sharp pulse (approximately 25 microseconds in duration) is the output character recognition pulse which is fed to the associated thyratron print circuit units 78, 79 and 81. The character recognition pulse from the storage unit 67, for example, goes through terminal 497 to the thyratron print circuit unit 78. The output of transistor amplifier 496 is fed back to the bases of transistors 408, 410, etc. to 418. This pulse triggers all the bi-stable storage devices 401 to 406 back to the spacing condition, ready for the receipt of the next character code combination.

The printing distributor comprising transistors 501 to 525 (Figs. 23, 24, 25 and 26) is a twenty-five element point contact transistor distributor ring used to select one of the twenty-five thyratron circuits in the associated thyratron print circuit unit 78 (or 79 or 81) as shown in the block diagram in Fig. 2. The connections to the thyratron circuits are exemplified by leads or conductors 526 (or 527 or 528, respectively), in Fig. 2. The printing distributor is energized by an amplified pulse derived from ringing circuit 500. This ringing circuit is similar to that shown in said Patent No. 2,876,365. The input to capacitance 529 of this ringing circuit comes from the control unit 71 through terminal 530 of terminal block 450. These pulses are regulated in the control unit 71 in a manner similar to the transfer pulses. However, they precede the transfer pulses by approximately 100 microseconds. Every character that requires a space in the printed line is accompanied by a printing distributor pulse. (This includes all characters to be printed plus the "space" function. The latter function, however, does not require a transfer pulse because it need not be put into storage.)

The positive going (−17 to −7 volts) square shaped, printing distributor pulse, energizes the ringing circuit 500, and the resulting 10 microsecond pulse is amplified by the drive pulse amplifier 531, causing a swing from 0 to −12 volts to appear on its collector. This pulse is applied to the common emitters of the twenty-five element ring and the ring is stepped one element for each input pulse. Assume, for example, that the first character in a line of type is being received. The 25th element 525 of the printing distributor rings, in all three units 67, 68 and 69, are "on," because they had been turned "on" by the carriage return function of the previous line (as will hereinafter appear). Upon receipt of the printing distributor pulse from the control unit 71 for the first character in the line, the 25th element (transistor) 525 in the printing distributor ring (of the first storage unit 67) is turned "off" and the first element (transistor) 501 is turned "on." The collector of element 501 swings from −17 volts to −7 volts. This output is connected over conductor 532 (through cable 533) to terminal 534 of terminal block 535, from where it is used to prime one of the control grids of the first thyratron circuit in the thyratron print circuit unit 78. Approximately 100 microseconds later, the transfer pulse comes in and puts the character into storage. When the character is recognized, the character recognition pulse, which is impressed on the other control grid of all thyratrons in the unit 78, fires the first thyratron in unit 78 and the character is printed by the first print hammer mechanism (exemplified by magnet 121 in Fig. 10) in the line.

In the meantime, the second character is being received, and its printing distributor pulse is directed to the second storage unit 68. The 25th element (transistor) in the printing distributor of the unit 68 is turned "off" and the first element turned "on." The output of the first transistor of the distributor ring of unit 68 (analogous to transistor 501 of unit 67) primes the first thyratron in the thyratron print circuit or unit 79. This thyratron is operably associated (electrically) with the second print hammer mechanism (magnet 121, Fig. 2) in the line. When the second character is recognized, the thyratron is fired, and the character is printed in the second position. In similar manner, the third character is printed in the third position in the line by the cooperation of the storage unit 69 and the thyratron unit 81. It is noted that before the fourth character is received, the printing period for the first character has expired, and the storage unit 68 is empty (that is, devoid of stored code signals). Therefore, the fourth character causes the printing distributor of the "first" storage unit 67 to step to its second transistor (element) 502. The second element 502 delivers its output over conductor 536 to terminal 537, from whence it is delivered to the "first" thyratron unit 78 to prime the second thyratron in said unit. When the character is recognized, said second thyratron, which controls the fourth print hammer mechanism (magnet 121) is fired, causing the fourth character to be printed in the fourth position in the line. This operation continues with the "first" unit 78 controlling printing in positions 1, 4, 7, 10, etc.; the "second" unit 79 controlling printing in positions 2, 5, 8, 11, etc.; and the "third" unit 81 controlling printing in positions 3, 6, 9, 12, etc. until the carriage return function initiates a repetition of the aforedescribed line printing operation.

The recognition and control of the carriage return function is carried out in the control unit 71, as will hereinafter appear. Briefly, upon receipt of the carriage return signal, the control unit 71 delivers a pulse at the proper time to the base of the 25th distributor element (exemplified by transistor 525) in each of the storage and character recognition units 67, 68 and 69. This sets all distributors for the next line of printing. The line feed function and the automatic carriage return and line feed function will be described hereinafter.

Failure of a carriage return function to be received causes the printing function to revert from position 75 at the end of the line back to position 1, since the printing distributor closes on itself between elements No. 25 and No. 1 (exemplified by transistors 525 and 501, respectively). Position 75 is selected by the 25th printing distributor element (analogous to transistor 525) of the unit 69. When this 25th element is turned "on" the collector output not only selects position 75, but also is delivered back to the control unit 71 (over conductor 550 and through terminal 538 of block 535) where it initiates the automatic carriage return line feed function if these functions had not been received (as will presently appear).

The circuit just described (Figs. 23, 24, 25 and 26) controls the printing of a 75 character line, through three printing distributors (exemplified by transistor ring 501–525) having 25 elements (transistors) each. Shorter length lines may be obtained by moving the base input and collector output connections from the 25th elements to other elements (transistors), and longer lines by adding elements. A line of up to 78 characters may thus, for example, be provided to match the 78 typewheels 101 on the shaft 102. For such latter use, the connection from terminal 539 of block 450, over conductor 541, through capacitance 542 would be moved from the base of transistor 525 to the base of transistor 543, and the connection over conductor 540, through capacitance 544 (Fig. 23) to the base of transistor 501 would be moved from the collector of transistor 525 to the collector of transistor 543.

The general function of the control unit 71 was outlined previously. As was indicated in the description of the storage and character recognition units 67, 68 and 69, the main function of the control unit 71 is to direct the transfer and printing distributor pulses in accordance with the characters received. In addition to this the control unit 71 controls all of the functions.

The electrical circuit for the control unit 71 is shown in Figs. 28, 29 and 30 which conjoin as shown in Fig. 31. Inputs to the control unit 71 from the receiving distributor 65 include "mark" and "space" potentials of the five code pulses (terminals 359 to 368, inclusive, Fig. 28) and a pulse (called the stop pulse) from the stop element of the start-stop distributor ring through terminal 358. One other input comes from the 75th printing distributor element of storage and character recognition unit 69 and is used for automatic-carriage-return-line-feed.

The stop pulse from the receiving distributor unit 65 comes in on terminal 358 (Figs. 20 and 28) and accompanies every character signal. This pulse is responsible for initiating all operations of control unit 71, and is connected to two circuits; namely, (1) to function recognition circuits, which will be described later, and (2) to circuits which generate transfer and printing distributor pulses.

The positive going stop pulse (—17 to —7 volts) arriving through terminal 358 and over conductors 545 and 546 (Fig. 28) is differentiated by capacitance 547, and a sharp positive spike is delivered to the emitter of a stop pulse inhibitor transistor 548, a common base amplifier. Transistor 548 is normally held cut-off by —6 volts on the emitter. The positive spike drives transistor 548 into conduction, and the collector swings from —22 volts to about —10 volts. This positive swing is fed to capacitance 549 of a ringing circuit that includes inductance 551 and rectifier 552. It is noted that the base of transistor 548 also has an input which comes over conductor 553 from the function recognition gates 554 to 560, inclusive. Specifically, the function recognition gates are the "bank" recognition gate 554, "letters" recognition gate 555, "figures" recognition gate 556, "line feed" recognition gate 557 "carriage-return" recognition gate 558 the "signal bell" recognition gate 559, and the "motor stop" recognition gate 560. The input from the function recognition gates over conductor 553 is a positive going input which is differentiated into a positive spike by capacitance 561 and appears only upon the receipt of a function signal other than "space." This pulse drives the base of transistor 548 positive and inhibits or prevents the conduction of said transistor 548 when the stop pulse is applied to capacitance 547. This is the action, previously mentioned, that prevents printing and spacing on functions by inhibiting the transfer and printing distributor pulses.

The distributor drive circuits are identical to those previously described herein. Transistor 562 (Fig. 28) produces 10 microsecond pulses swinging from —1 to —12 volts at its collector. These pulses are used to drive the distributor comprising transistors 563, 564 and 565, and also to trigger the transfer pulse generator comprising transistors 576 and 577.

The distributor comprising transistors 563, 564 and 565 is a three element distributor ring, and is the circuit which directs the transfer pulses to the proper storage units 67, 68 and 69 and which produces the pulses for driving the printing distributors (501–525, for example) of the units 67, 68 or 69.

The drive pulses from transistor 562 are fed through the common emitter resistor 566 to the emitters of the three elements 563, 564 and 565. As each transistor 563, 564, and 565 is turned "on" its collector swings from —20 volts to —8 volts. These outputs serve two purposes; namely, (1) they go out over conductors 567, 568 and 569 through terminals 571, 572 and 573, respectively, to their respective storage and character recognition units 67, 68 and 69 where they enter at terminal 530 as printing distributor pulses, and (2) they direct the transfer pulses to the respective units 67, 68 and 69.

The distributor indicator (Fig. 29) consists of transistor 574 and neon lamp 575, the circuit of which is identical to that of the indicator 492—493 shown in Fig. 26. In operation, the transistor 574 (connected to conductor 567 by conductor 570) conducts and fires the neon glow lamp 575 when the collector of distributor element (transistor) 563 is "on."

The transfer pulse generator comprises transistors 576 and 577. The negative 10 microsecond distributor drive pulses coming from the collector of transistor 562, in addition to driving the distributor, pass through rectifier 578 and capacitance 579 to the base of transistor 576. Transistors 576 and 577 comprise a univibrator circuit with transistor 576 normally cut off and transistor 577 normally conducting. It is noted that this univibrator is triggered by a negative pulse coming in on the base of the "off" transistor 576. The purpose of this circuit is to generate a transfer pulse which lags the distributor drive pulse by 100 microseconds. When this circuit is triggered, the collector of transistor 577 swings from —7 to —17 volts and, and after an operating period of about 100 microseconds, as determined by capacitance 581 and resistors 582 and 583, swings back to —7 volts. The positive going swing from —17 to —7 volts differentiated by capacitance 584 and is fed to transistor 585, which is the transfer pulse inhibitor.

The positive pulse from the transfer pulse generator 576—577 through capacitance 584 is impressed on the emitter of the transfer pulse inhibitor 585, which is a common base amplifier, similar to transistor 548. Transistor 585 is normally held cut off by —4 volts emitter bias, as determined by resistors 586 and 587. The positive pulse on the emitter drives transistor 585 into conduction, swinging the collector from —20 volts to —8 volts. When a "space" signal is received, however, it is necessary to inhibit the operation of transistor 585. This is accomplished by connecting the output of the "space" recognition gate 588 (Fig. 28) over conductor 589 and through capacitance 591 to the base of transistor 585 (Fig. 29). The positive square wave output (—17 volts to —7 volts) from the "space" gate 588 is differentiated by capacitance 591, whose time constant is long enough so that the base of transistor 585 is held sufficiently positive, for more than 100 microseconds, to prevent conduction. The reverse resistance of rectifier 592 contributes to this time constant.

At this point it is recalled that each storage gate 421 to 426 (Figs. 23 to 26) has two inputs; namely, a code pulse from the receiving distributor 65, and a transfer pulse from the control unit 71. Further, since gates 421 to 426 are "AND" gates, it requires the application of both a code impulse and a transfer impulse thereon to effect the transfer of the code signal impulse to the associated storage device 401 to 406. When a character is to be printed, a pulse is sent through terminal 497 of terminal block 535 (Fig. 26) to the thyratron print circuit 78, 79 or 81 to effect the operation of a print magnet 121 if and when the signal stored in the storage devices 401–406 matches the signal set up in the pulse recognition gate 431–436 by the binary counter 77. Now, when a space signal is received, the transfer pulse is suppressed (inhibited) so that no transfer and storage can take place, and consequently no signal impulses are stored in the storage devices 401 to 406 with the result that no pulse is set out through the terminal 497 to the thyratron print circuit 78, 79 or 81 and therefore, no print magnet 121 is operated. However, the printing distributor (comprising transistor ring 501 to 525, Figs. 23 to 26) is operated to cause the spacing to be carried over one space or column of printing copy. As an example, it is assumed that the fifth code signal received in a line of printing is a "space" code signal. Then, the output of the space recognition gate 588 inhibits the transfer pulse for storage unit 68 that would ordinarily have occurred for the 5th character in the line. Thus, instead of a character being printed in the 5th position in the line, said position will be left blank to represent a space between words, and the distributors exemplified by transistor ring circuit 501–525, would be conditioned for the sixth character position in the line (to be printed under the control of storage unit 69 and thyratron print circuit 81).

The output of transistor 585 goes directly to the base of transistor 593, which is the transfer pulse amplifier. This is a common collector amplifier whose emitter follows the base and reproduces the input. The output from the emitter is the positive going transfer pulse swinging from —20 volts to —8 volts.

Associated with the transfer pulse generator 576–577 are three transfer pulse selector gates 601, 602 and 603, which are "AND" gates, the function of which is to convey the transfer pulses to the proper storage and character recognition unit 67, 68 or 69 as directed by the distributors 563, 564 and 565. The collectors of the three element distributors 563, 564 and 565 are connected to their respective selector gates 601, 602 and 603 over conductors 567, 568 and 569 respectively. The other input to the gates is the transfer pulse frnm transistor 593 over conductor 604. It is recalled that the transfer pulse lags the turning on of the distributor elements 563, 564 and 565 by 100 microseconds. A gate 601, 602 or 603 will have an output of —8 volts only upon coincidence of a —8 volt potential from a distributor element 563, 564 or 565, and similar potential from the transfer pulse. It is observed that a transfer pulse from gates 601, 602 or 603 occurs only when the respective distributor element 563, 564 or 565 is "on."

Associated with each gate 601, 602 and 603 is a transfer pulse amplifier 605, 606 and 607 respectively, which are common collector amplifiers. The amplifiers 605, 606 and 607 reproduce the outputs of their respective selector gates 601, 602 and 603, and output transfer pulses swinging from —20 volts to —8 volts appear on the emitters of said amplifiers 605, 606 and 607. The outputs of the transfer pulse amplifiers 605, 606 and 607 are connected over conductors 608, 609 and 611 respectively, to terminals 612, 613 and 614 respectively, from whence they are directed to their respective storage and character recognition units 67, 68 and 69 to actually effectuate the storage of the received character signals in their associated storage devices, for example, 401 to 406.

Referring to Fig. 28, there are provided a plurality of code pulse amplifiers, comprising transistors 615 to 619, and 621 to 625. These are common collector amplifiers whose inputs are the outputs of the five storage elements 347 to 351 (Fig. 20) of the receiving distributor unit 65 delivered through terminals 359 to 368, inclusive. Transistors 615 to 619 are the marking amplifiers for the five code pulses, and transistors 621 to 625 are the spacing amplifiers. For example, when the No. 1 code pulse is marking, the input to the base of transistor 615 is —7 volts, and the input to the base of transistor 621 is —20 volts. The emitter output potentials follow the base potentials.

The outputs of the marking code pulse amplifiers 615 to 619 are delivered over conductors 631 to 635, and the outputs of the spacing code pulse amplifiers 621 to 625 are delivered over conductors 641 to 645. These outputs from the ten code pulse amplifiers are connected to the function recognition gates 554 to 559, and 588, in accordance with the code combination for each function. Gates 554 to 559, and 588 are all "AND" gates for —7 volt potentials.

The space recognition gate 588 comprises rectifiers 646 to 652, which are connected to the conductors 631 to 635 and 641 to 645 in accordance with the "space" code signal, which is Nos. 1, 2, 4 and 5 spacing, and No. 3 marking. For example, rectifier 646 is connected to conductor 641, 647 to 642, 648 to 633, 649 to 644, 650 to 645 and 651 to stop pulse conductor 653 which branches off from conductor 545 at junction 654. Five of the six inputs to the "space" function gate 588 are connected to the code pulse amplifiers 615 to 619 and 621 to 625 which put out —7 volts when a "space" code signal is received. The sixth input is the stop pulse, which is fed over conductor 653 to all function recognition gates 554 to 559, and 588. When the "space" function signal is received, the output pulse is the same duration as the stop pulse and swings from —17 volts to —7 volts. The output of the "space" recognition gate 588 connects through rectifier 652 and over conductor 589 to the transfer pulse inhibitor (transistor) 585, as previously described.

The inputs to the "blank" function recognition gate 554 comes from the code pulse amplifiers 615 to 619, and 621 to 625, which put out —7 volts for a "blank" combination (Nos. 1, 2, 3, 4 and 5 spacing). The output of gate 554, through rectifier 655, connects to the stop pulse inhibitor amplifier (transistor) 548 (Fig. 28) and, as previously described, prevents operation of the distributor 563—564—565, and transfer pulse generator 576—577. Actually, rectifier 655 of the "blank" recognition gate 554 connects to the common bus or conductor 553 to which the outputs of all the function gates, except "space" gate 588, are connected. Bus or conductor 553 will be hereinafter referred to as the "stop pulse inhibit bus."

The inputs to the "figures" recognition gate 556 come from the code pulse amplifiers 615 to 619 and 621 to 625 which put out —7 volts for the "figures" code combination, Nos. 1, 2, 4 and 5 marking, and No. 3 spacing. One output from the gate 556 comes through the rectifier 657 to the stop pulse inhibit bus 553, and the other output connects over conductor 658, and through capacitance 659 and rectifier 661 to the base of transistor 662, in the "figures" storage circuit. When a "figures" code combination is received, it is necessary to add a sixth code pulse to the five code pulses of all subsequent characters, until a "letters" code combination is received.

Figure 23:
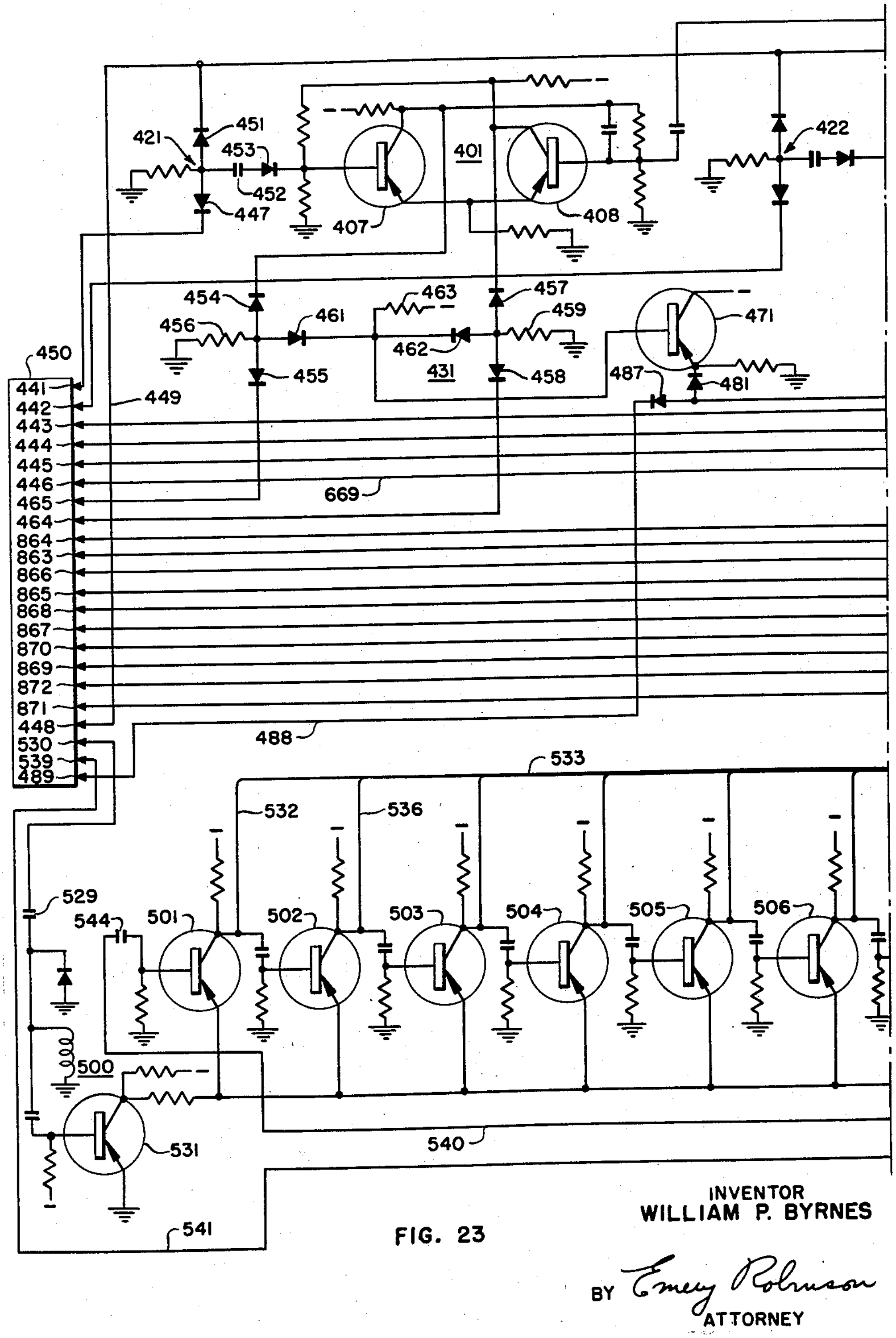
Figure 24:
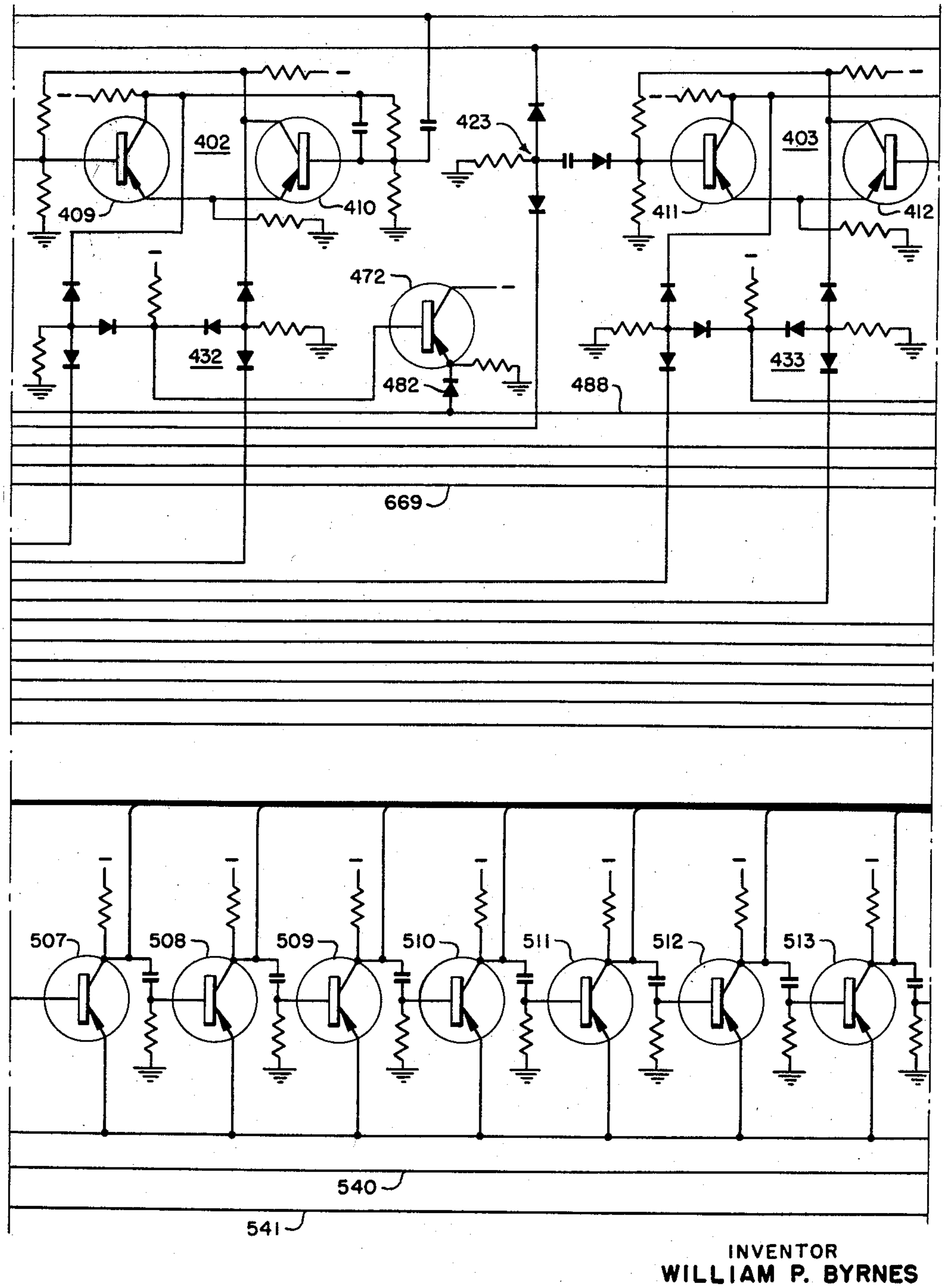
Figure 25:
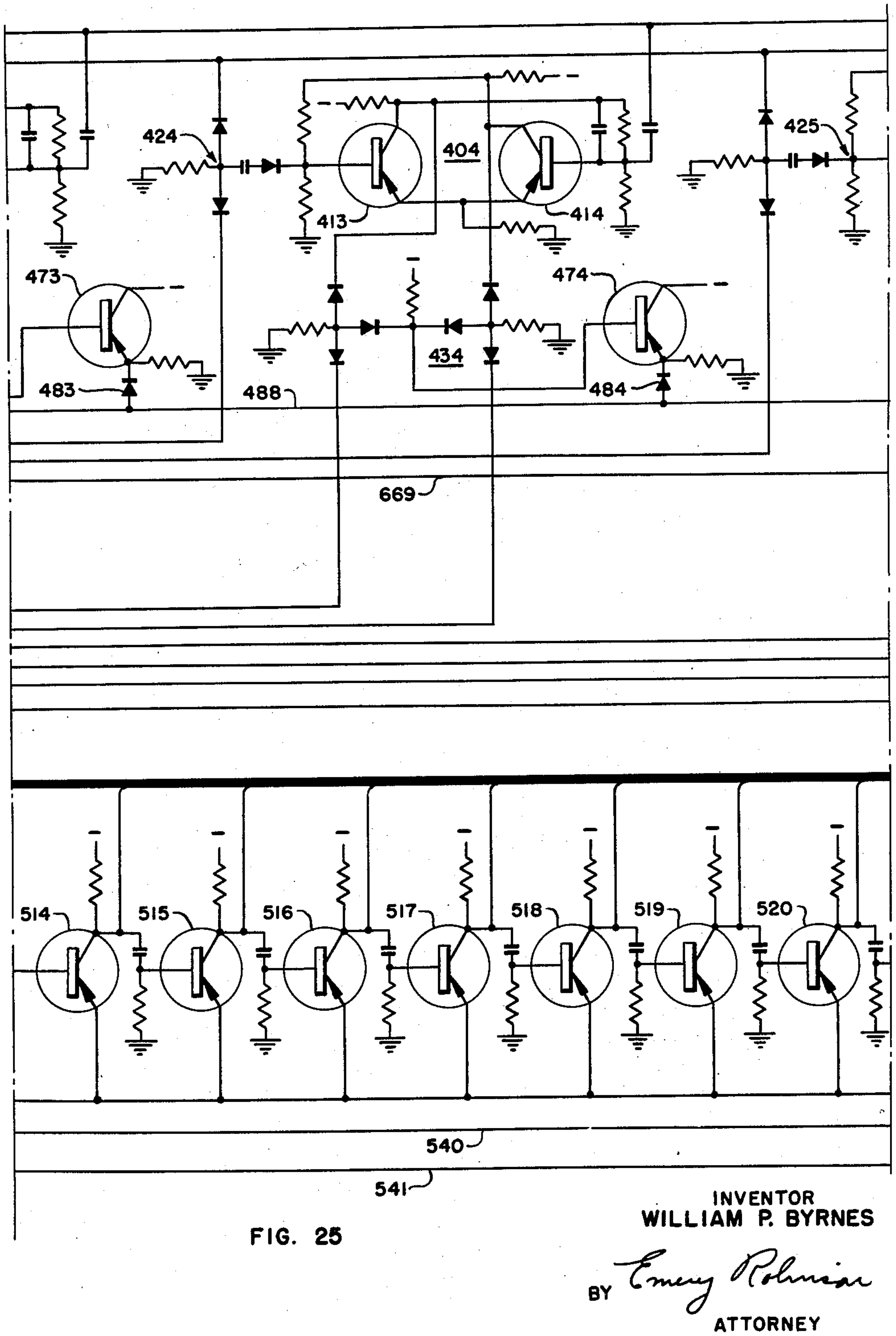

The "figures" storage circuit is a bi-stable storage device comprising transistors 662 and 663, which is triggered by the output of the "figures" recognition gate 556. Transistor 662 is normally conducting, with its collector at —7 volts; and transistor 663 is normally cut off, with its collector at —17 volts. Capacitance 659 differentiates the positive pulse output of the "figures" gate 556, and the resulting positive spike cuts off transistor 662 and triggers the circuit. The collector of transistor 663 swings from —17 to —7 volts. The output from this collector is connected to the sixth pulse amplifier (transistor) 665 (Fig. 29), a common collector amplifier. The emitter of transistor 665 follows the —17 to —7 volt swing and puts out a —7 volt potential over conductors 666 and 667 to terminal 668, from whence it is directed to terminal 446 (Fig. 23). This output then goes over conductor 669 (Figs. 23, 24, 25 and 26) to storage gate 426 to control the storage device 406 to effectively change the code from five units to six units.

Moreover, said output from the emitter of transistor 665 goes over conductors 666, 671 and 672 to the "signal bell" (upper case S) recognition gate 559 and the "motor stop" (upper case H) recognition gate 560.

The "letters" function recognition gate 555 puts out a —17 to —7 volt pulse upon receipt of a "letters" code signal (Nos. 1, 2, 3, 4 and 5 marking) being impressed on the code pulse amplifiers 615 to 619 and 621 to 625, similar to the manner previously described. The output of the gate 555 (Fig. 29) goes over conductor 673 and through capacitance 674 and rectifier 675 (Fig. 28) to the base of transistor 663 of the "figures" storage bistable device 662—663, and triggers the circuit back to its normal state. The collector of transistor 663 then swings from −7 volts to −17 volts, removing the sixth pulse from the character recognition storage circuits (exemplified by storage devices 401 to 406, Figs. 23 to 26) through the aforementioned terminals 668 and 446. Subsequent character signals, therefore, are all registered as "letters." The output of the gate 555 also is applied to the stop pulse inhibit bus 553, through rectifier 660.

The "carriage return" function recognition gate 558 puts out a −17 to −7 volt pulse upon receipt of a "carriage return" code signal (Nos. 1, 2, 3 and 5 spacing and No. 4 marking) being impressed on the code pulse amplifiers 615 to 619 and 621 to 625. This pulse is fed through rectifier 670 to the stop pulse inhibit bus 553, and also over conductor 676 and through capacitance 677 and rectifier 678 to the base of carriage return delay transistor 679 (Fig. 30). Transistors 679 and 681 comprise the carriage return delay univibrator circuit. The purpose of this circuit is to introduce a delay of approximately 30 milliseconds before the carriage return function is actually carried out. This delay is needed to allow time for printing the character received just before the carriage return signal is received. As an example, the maximum printing interval for any character is approximately equal to three line signal (character) periods. Therefore, the delay inserted must be between two and three character periods. A character period at 750 words per minute is 13.3 milliseconds. When the univibrator 679—681 is triggered, the collector of transistor 679 swings from −7 volts to −17 volts, and, after the 30 millisecond operating period, swings back to −7 volts. The pulse from the collector of transistor 679 goes to two places; (1) it is directed over conductors 682 and 683 and is differentiated by capacitance 684 and fed to transistor 685, and (2) it is directed over conductors 682 and 686 and is differentiated by capacitance 687 and fed to transistor 688.

The carriage return pulse amplifier 685 is a common emitter amplifier which is normally conducting with a collector potential at about −1 volt. The sharp positive pulse, resulting from the differentiation by capacitance 684 of the output of transistor 679, cuts off transistor 685. This produces a sharp negative spike on the collector swinging from −1 volt to about −20 volts. This pulse is the carriage return pulse and its function is to turn "on" the last element (transistor 565) of the distributor drive circuit comprising transistors 563, 564 and 565, Fig. 28, and the last element (transistor 525) of the three 25-element printing distributors (one each in each of the units 67, 68 and 69). This pulse prepares the distributors for the next printing character which must go to the unit 67 and be printed in the first position of the next line. The output of the collector of transistor 685 is fed through capacitors 689, 691 and 692, over conductors 693, 694 and 695 respectively, to terminals 696, 697 and 698 respectively; and also through the capacitor 699 and over conductor 701 to the base of transistor 565 (Fig. 28). Transistor 565, which is the last element of the distributor drive circuit, is thus turned "on" by the carriage return pulse.

Transistors 688 and 690 comprise the automatic carriage return-line feed delete univibrator, with the collector of transistor 688 normally at −7 volts and the collector of transistor 690 normally at −17 volts. This univibrator is triggered by the output of transistor 679, as previously described, over conductors 682 and 686, and through capacitor 687. The output is taken from the collector of transistor 688 which swings to −17 volts when the circuit is triggered, and remains there for the one millisecond operating period. When the circuit triggers back to normal, the collector of transistor 688 swings back to −7 volts. This pulse from the collector of transistor 688 is delivered over conductor 702 to the line feed delete gate 703, the function of which will be covered presently in the description of the automatic carriage return-line feed feature.

The "line feed" function recognition gate 557 puts out a −17 to −7 volt pulse upon receipt of a "line-feed" code signal (Nos. 1, 3, 4 and 5 spacing and No. 2 marking) being impressed on the code pulse amplifiers 615 to 619 and 621 to 625. This pulse is delivered over conductor 704 to the base of common collector amplifier 705, and said pulse is reproduced at the emitter thereof where it goes to the "single-double" line feed switch 706. It will be assumed for the present, that the switch 706 is in the "single" position, as shown. Said pulse is directed, therefore, from junction 707, over conductor 708, through capacitor 709 and rectifier 711 to the base of transistor 712 which with transistor 713 comprises the line feed recharge pulse generator circuit, which is a univibrator.

The collector of transistor 712 is normally at −7 volts and the collector of transistor 713 is normally at −17 volts. The purpose of the circuit is to generate a line feed pulse at the time the "line feed" signal is recognized by gate 557, and then to generate a recharge pulse four milliseconds later. Both of these pulses eventually go to the line feed circuits in the thyratron print circuit 81, and accordingly, their specific function will be covered hereinafter in the description of the thyratron print circuits. When the univibrator 712—713 is triggered by the positive pulse from transistor 705 to the base of transistor 712, the collector of transistor 712 swings from −7 volts to −17 volts. After an operating period of about four milli-seconds, the univibrator circuit (712—713) triggers back to normal, with the collector of transistor 713 swinging from −7 to −17 volts. The potential transitions at the collector of transistor 712 are delivered over conductor 714 and are differentiated through capacitor 715 and applied to the base of transistor 716 which is the line feed pulse amplifier. The potential transitions at the collector of transistor 713 are also delivered over conductor 717 and are differentiated through capacitor 718 and delivered to the base of transistor 719 which is the recharge pulse amplifier.

The line feed pulse amplifier 716 is a biased-to-cut-off common emitter amplifier which is energized by the differentiated negative going pulse from transistor 712. The negative pulse causes transistor (amplifier) 716 to conduct momentarily, producing a 21 volt positive pulse at the emitter. This pulse is fed over conductor 721 to the terminal 722, from where it goes to the thyratron print circuit (unit) 81 and fires the "line feed" thyratron, as will presently appear.

The recharge pulse amplifier 719 is a similar common emitter amplifier which is energized by the differentiated negative transition at the end of the four millisecond interval of operation of transistor 713. A sharp positive pulse is produced on the collector of transistor 719 and delivered over conductor 723 to terminal 724 from where it goes to the thyratron print circuit (unit) 81 and fires the recharge thyratron.

When the switch 706 is in the "double" line feed position, the output from the transistor 705 is fed not only to transistor 712 of the "single" line feed circuits, but also through capacitance 725 and rectifier 726 to the base of transistor 727. Transistors 727 and 728 comprise a univibrator circuit which is used as the double line feed pulse generator. Its purpose is to generate a second line feed operation approximately 20 milliseconds after the first. When the univibrator 727—728 is triggered, the collector of transistor 727 swings from −7 volts to −17 volts, and after 20 milliseconds reverts back to −7 volts. This latter positive going potential is differentiated by capacitance 729 (over conductor 730) and the resulting positive pulse triggers the line feed recharge univibrator 712—713 through rectifier 731, initiating a second line feed operation.

An output is obtained from the "signal bell" function recognition gate 559 when the "S" code signal (1 and 3 marking, 2, 4 and 5 spacing) is received after a shift to "figures" condition. The upper case condition (figures) is indicated by the "sixth pulse amplifier" transistor 665 (Fig. 29) which puts —7 volts (over conductor 666 and 671) on rectifier 720 (of gate 559) only after the "figures" signal has been received. The output of gate 559 swings from —17 to —7 volts and is connected over conductor 700 to terminal 710 and thence to thyratron print circuit or unit 79 where it serves to fire the "signal bell" thyratron (as will presently appear).

When the "H" code signal (3 and 5 marking, 1, 2 and 4 spacing) is received after a shift to "figures" condition, an output swinging from —17 to —7 volts is obtained from the "motor stop" function recognition gate 560 (Fig. 30). The motor stop storage circuit comprising transistors 732 and 733 (Fig. 29) is a bistable storage device with transistor 732 normally conducting and transistor 733 normally cut off, their collectors being at —7 and —17 volts, respectively. The output from the motor stop function recognition gate is differentiated by capacitance 734 (Fig. 29) and the resulting positive impulse cuts off transistor 732, causing its collector to drop from —7 to —17 volts while the voltage on the collector of transistor 733 rises immediately from —17 to —7 volts. The storage device 732—733 is reset by the first spacing pulse (start pulse of signal line break) that is received after a "motor stop" signal. The reset pulse is received over terminal 735 which is connected through terminal 740 (Fig. 20) to the storage release amplifier 346 in the receiving distributor unit 65. This reset pulse is delivered over conductor 736 and is differentiated by capacitance 737 (Fig. 29). The resulting positive pulse cuts off transistor 733 and turns on transistor 732, reverting the network to its initial state. The output from the collector of transistor 732 goes to the base of transistor 738 of the motor stop amplifiers 738—739 (Fig. 30). Transistor 738 is a common collector amplifier, and its emitter follows the —7 to —17 volt swing on the collector of transistor 732. Transistor 739 is normally in the nonconducting state by virtue of the —12 volt bias on the emitter. When the potential on its base is lowered from —7 to —17 volts by the output of transistor 738, then the transistor 739 conducts. The collector of transistor 739 is connected by conductor 741 to terminal 742, from whence the circuit goes to the coils of the motor stop relay in the printer unit, in well known manner. The previously mentioned reset pulse causes transistor 739 to be cut off, de-energizing said relay and allowing the motor to start.

The automatic carriage return-line feed feature will now be described. Normal operation requires that, on or before the 73rd character, two carriage return code combinations and one line feed code combination shall be received in order to shift the printing to the first position of the next line. In case these combinations are not received, the automatic carriage return-line feed feature will perform these functions. This is accomplished by recognizing when a printing or spacing character is to use the 75th printing position (which is the 25th element transistor) of the printing distributor in unit 69. It is observed that the carriage return portion of the automatic CR-LF operation is obtained, as previously described, without additional circuits, because the printing distributors (Fig. 26) of the unit 69 are normally stepped to the 25th element by the 75th character in the line. The output of the 25th element of the printing distributor of unit 69 then is used to generate a line feed pulse. This line feed pulse must be generated only when the 25th element is turned on by the 75th character, and not when it is turned on by a normal carriage return operation.

The output from the 25th element of the printing distributor of unit 69, at terminal 538 (Fig. 26), which is a positive going pulse swinging from —20 to —8 volts, comes in to the control unit 71 at terminal 743, and connects over conductor 744 and through capacitance 745 to the line feed delete gate 703, which is a two-input "AND" gate for —7 volt potentials. The other input to gate 703 comes from the collector of transistor 688 of the automatic CR-LF delete univibrator 688—690, over conductor 702 (as previously described). When automatic carriage return is to be used, the collector of transistor 688 is at —7 volts at the time the 25th element of the printing distributor of the unit 81 is turned on. Capacitance 745 differentiates the leading edge of said 25th element output into a positive spike. This spike is passed through gate 703 and over conductor 746 to junction 707, and thence to the base of transistor 712, which is the line feed recharge pulse generator, thereby initiating operation of the line feed circuits as previously described.

Under normal carriage return operation, the collector of transistor 688 is at —17 volts when the 25th element of the printing distributor of unit 69 is turned "on" by the carriage return pulse, as previously described. This closes the gate 703 to the pulse from said 25th element and thus the automatic line feed is deleted.

In Figs. 32, 33 and 34, which conjoin as shown in Fig. 35, is shown the circuit for the binary counter 77, the function of which was previously set forth. In accordance with Figs. 7 and 7*a*, six binary stages are contemplated, whereby 64 different combinations are accommodated. The binary counter circuit according to the present invention comprises the six binary counter stages 751 to 756. A binary counter stage is a transistor circuit, having two stable states (marking and spacing), which can be triggered from one state to the other. The bi-stable devices described hereinbefore in connection with the transmitting and receiving circuits basically meet the requirements of the binary counter circuit. However, because a binary counter state is to be triggered from either state to the other by pulses arriving at only one input point, the triggering method is somewhat different from the method used for the bi-stable storage devices, hereinbefore described.

Referring to the first binary counter stage 751 (Fig. 32), transistor 757 (spacing side) is conducting and transistor 758 (marking side) is cut off for the "zero" or "space" condition. The collector of transistor 757 is at —7 volts, and the collector of transistor 758 is at —20 volts. The positive swinging triggering pulse (controlled by the pick-up devices 126, Fig. 12) is received from amplifier (transistor) 807 or 808 and applied to the junction of rectifiers 761 and 762 and resistor 763. This junction is biased through resistor 763 to —22 volts. Since this is more negative than the potential at either collector, diodes (rectifiers) 761 and 762 are biased in the reverse direction. The purpose of rectifiers 761 and 762 is to direct the positive going trigger pulse toward the control element (base) of the conducting transistor only, in the present instance, transistor 757. The trigger pulse raises the input junction potential from —22 volts to approximately —10 volts. Since the collector of transistor 757 is at —7 volts, rectifier 761 remains cut off, and no appreciable change is felt through rectifier 761. The collector of transistor 758, however, is at —17 volts and this allows rectifier 762 to conduct when the input junction goes more positive than —17 volts, swinging the collector potential thereof to —10 volts. The connection from the collector of transistor 758 through the voltage divider comprising resistors 764 and 765 transfers this positive going change, with the aid of accelerating capacitor 766, to the base of transistor 757, cutting off said transistor 757 and triggering the circuit to the other state with transistor 758 conducting and transistor 757 cut off. The next pulse will pass through rectifier 761, divider comprising resistors 767 and 768, and accelerating capacitor 769 to the base of transistor 758, cutting off the latter and triggering the circuit back to the space condition.

The complete binary counter circuit is comprised of six interconnected stages 751 to 756, with drive pulses being brought in only to the first stage 751. The interconnection between stages is from the collector of the spacing side of the lowest numbered stage to the input circuit of the following stage. For example, the interconnection between stages 751 and 752 is from the collector of transistor 757 (spacing side of stage 751) over conductor 771 and 772 to the input circuits (including rectifiers 773 and 774) for transistors 775 and 776 of the second binary stage 752.

It is recalled that in the "zero" condition of the binary counter, all of the (spacing side) transistors 757 and 776 to 780, inclusive, are conducting, and the marking side transistors (exemplified by transistor 758) are cut off. Likewise, the spacing amplifiers 785 and 788 to 792, inclusive, associated with the spacing side of stages 751 to 756 are conducting. Then, upon receipt of the first drive pulse, the transistor 757 will be cut off and transistor 758 will become conducting to deliver a pulse over conductor 782 to the No. 1 marking amplifier (transistor) 783 indicative of the character "E" code, exemplified by line 1, of Fig. 7.

Upon receipt of the second drive pulse, the transistor 757 will become conducting, whereupon a pulse is generated thereby, to be delivered (1) over conductors 771 and 772 and through rectifier 773 to cut off the transistor 776 and to render transistor 775 conducting and also (2) over conductors 771 and 784 to the No. 1 spacing amplifier (transistor) 785. Transistor 775 upon becoming conductive, delivers a pulse over conductor 786 to the No. 2 marking amplifier (transistor) 787. Now, since the spacing amplifiers (transistors) 785 and 789 to 792, inclusive, are conducting, and the No. 2 marking amplifier 787 is conducting, then the binary circuit is set up for the line feed (LF) code, exemplified by line 2 in Fig. 7.

Upon receipt of the third drive pulse, the transistor 758 (marking side) will become conducting, whereupon a pulse is generated thereby to be delivered over conductor 782 to the No. 1 marking amplifier 783. This pulse will have no effect upon stages Nos. 2 to 6, inclusive, of the binary counter. Now, since the Nos. 1 and 2 marking amplifiers (transistors) 783 and 787 are conducting (note that amplifier 787 is still conducting), and the Nos. 3, 4, 5 and 6 spacing amplifiers 789 to 792 are conducting, then the binary counter circuit is set up for the character "A" code, exemplified by line 3, in Fig. 7.

Upon receipt of the fourth drive pulse, the transistor 757 (spacing side, stage No. 1) will become conducting, whereupon a pulse is generated thereby, to be delivered, as previously set forth, to the transistor 776 (spacing side, stage No. 2), and also to the No. 1 spacing amplifier 785 (transistor 783 being cut off). Accordingly, transistor 776 will become conducting, to deliver (1) a pulse over conductors 793 and 794, and through rectifiers 795 and 796 to cut off transistor 777 (spacing side, 3rd stage) and to render transistor 797 (marking side) conducting, and also (2) over conductors 793 and 798 to the No. 3 spacing amplifier 788 (transistor 787 being cut off). Transistor 797 upon being made conducting delivers a pulse over conductor 799 to the No. 3 marking amplifier 801. Now, since the spacing amplifiers 785, 788 and 790 to 792 are conducting, and the No. 3 marking amplifier 801 is conducting, then the binary circuit is set up for the "space" code, exemplified by line 4 in Fig. 7.

It is noted that the first stage 751 receives its drive (input) pulse under the control of an external source (namely, the magnetic pick-up device 126, Fig. 12). It is also noted that the second stage 752 receives its drive or input pulse from the first stage 751 when the collector of transistor 757 (spacing side) swings from —20 to —7 (that is, is rendered conducting upon a transition from marking to spacing), see line 2, Fig. 7. It is further noted, that the third stage 753 receives its drive or input pulse from the second stage 752 when the collector of transistor 776 swings from —20 to —7 volts (that is, when transistor 776 is rendered conducting) see line 4, Fig. 7. Therefore, it is observed from Figs. 7 and 7A, that it takes one initial input pulse to trigger the first stage 751 (see line 1, Fig. 7); it takes two initial input pulses to trigger the second stage 752 (see line 2, Fig. 7); it takes four pulses to trigger the third stage 753 (see line 4, Fig. 7); it takes eight pulses to trigger the fourth stage 754 (see line 8, Fig. 7), sixteen pulses to trigger the fifth stage 755 (see line 16, Fig. 7), and so on. From the foregoing it is observed that the positive pulse obtained when the collector of the spacing side swings from —20 volts to —7 volts occurs, for any one stage, on every other input pulse to that stage.

The index wheel 123 (Figs. 12 and 13) on the typewheel shaft 102 has three rows of teeth, and associated with each row is an electromagnetic pick-up device 126. A pulse is generated in the winding of a pick-up device 126 for each tooth that passes the pole face of the pick-up. Briefly, the pick-up device 126 comprises a coil (wound around core 802 and within the head of the device) whereby due to the movement of a tooth 124 past said core 802 the reluctance thereof is disturbed to cause an electrical pulse to be induced in the coil of the pick-up device, which pulse is delivered over conductor 803 to the binary counter terminals 804, 805 and 806, according to the row of teeth involved. One row has 52 evenly spaced teeth, one tooth for each character on the typewheel; and the pulses generated are called character index pulses. These pulses are shown in line 1 of Fig. 22. If this were the only source of index pulses, one revolution would produce only 52 pulses; and the binary counter could be stepped to only a count of 52. The code combinations for nine of the characters on the typewheel, however, exceed the binary count for 52, while the codes for certain nontyping functions are included in the first 52 counts registered. Therefore, it is necessary to introduce ten more pulses into the counter input, from a separate source, corresponding to the nonprinting characters. These pulses occur in between the various character index pulses. Nine of the ten pulses are generated by the second row of teeth on the typewheel, and are shown in line 3 of Fig. 22. These are known as function index pulses.

The third row on the index wheel 123 contains one tooth which is used to generate a set zero pulse. This pulse sets the binary counter back to zero, that is, with all transistors 757 and 776 to 780 (spacing side) in the conductive state. This pulse will return the counter to zero from any count, but under normal operation occurs only between the character ";" (semicolon) and "E." Should the counter, however, happen to get out of phase with the typewheels, the set zero pulse brings it back into synchronism before more than one errored character can be printed.

The 52 character index pulses, nine function index pulses, and set zero pulse, are brought into the binary counter (over conductors 803) through terminals 804, 805 and 806, respectively (Fig. 32). These —5 volt pulses are fed to bases of their respective amplifiers (transistors) 807, 808 and 809, all common emitter amplifiers. Transistor 807 amplifies the 52 character index pulses, and transistor 808 amplifies the nine function index pulses. The outputs of transistors 807 and 808 are positive going pulses, swing from —22 volts to —1 volt, which are differentiated by capacitors 811 and 812, respectively. The output sides of capacitors 811 and 812 are connected to a common conductor 813, and the sharp, positive spikes are fed to the input circuit of the first binary counter stage 751 and, as previously described, trigger the first stage 751 through rectifiers 761 and 762.

The set zero pulse is delivered over conductor 814 to the base of transistor 809 which puts out a positive going pulse similar to that provided by transistors 807 and 808. The pulse is delivered over conductor 815 to common conductor 816 from whence it is delivered through differentiating capacitors 817 to 822, inclusive, to the bases of the "marking" sides of all six stages 751 to 756 (that is, to transistors 758, 775, 797, 823, 824 and 825, respectively) driving all operated stages to the spacing, or "zero" state. The set zero pulse is strong enough to overpower any interconnecting pulse that is generated as a result of resetting a stage from "mark" to "space" thus insuring the setting up of the full "zero" combination in the counter (exemplified by line 1, Fig. 7).

As previously described, the outputs of the stages 751 to 756 of the binary counter circuit are amplified by marking amplifiers (transistors) 783, 787, 801, 826, 827 and 828, respectively; and by spacing amplifiers (transistors) 785, 788, 789, 790, 791 and 792, respectively. As the index pulses drive the counter, the collector potentials of the transistors, comprising said six stages 751 to 756, indicate the count, and, consequently, the code combination of the character represented by the count. Fig. 22, illustrates how the function index pulses change the count in between the character index pulses.

The potentials from the collectors of the binary counter stages 751 to 756 are delivered to the bases of their respective output amplifiers. These are common emitter amplifiers whose emitters reproduce the pulse applied to their bases. The twelve outputs from the emitters are connected by conductors 831 to 842 to terminals 851 to 862 of terminal block 830 and from there are delivered to terminals 464, 465 and 863 to 872 on terminal block 450 (Fig. 23) of the storage and character recognition units 67, 68 and 69 to be compared with the code combinations in storage. As indicated in Fig. 2, the output of the binary counter 77 is delivered simultaneously to all three of the units 67, 68 and 69, and a matching will occure in only that one of the units 67, 68 or 69 to which a character received by unit 65 is directed by the control unit 71, as previously described. Accompanying the twelve outputs of the binary counter 77 through terminals 851 to 862, are the character index pulses generated by the amplifier 807 (Fig. 32). It is noted that the amplified character index pulses from transistor 807, besides being directed over conductor 813 to the binary counter stage 751, are also directed over conductor 873 to terminal 874 from whence they are delivered to terminal 489 (Fig. 23) of the storage and character recognition circuit (units 67, 68 and 69). As previously described, these character index pulses insure that the character recognition gate will recognize a character only at the beginning of a change in code from the binary counter 77.

One of the ten extra pulses (line 3, Fig. 22) is produced by the counter itself and is fed back to the input. This pulse occurs on the upper case "space" combination (line 36, Fig. 7A), and steps the counter to the upper case "S" (signal bell) code combination (line 37, Fig. 7A). The upper case "space" feed back gate 875 (Fig. 33) is the circuit used to produce this single extra index pulse. The inputs to the gate 875 (which is an "AND" gate) come from the amplifiers 785, 788, 801, 790, 791 and 828 and are delivered to the diode rectifiers 881 to 886, respectively, in accordance with the upper case "space" code combination, Nos. 1, 2, 4, and 5 spacing and Nos. 3 and 6 marking (see line 36, Fig. 7A). The delivery of a pulse of −7 volts potential occurs only when the binary counter is stepped to the upper case "space" code combination. Gate 875 supplies a −20 volt potential at all other times. The positive swinging pulse from the gate 875 is applied through rectifier 887 and capacitor 888 and over conductors 889 and 813 to the binary counter input (that is, to the first binary counter stage 751), which immediately steps the counter one additional count (to the "bell" code combination, line 37, Fig. 7A). It is noted in the first stage 751 that immediately after the upper case "space" pulse turns the marking side (758) off and the spacing side (757) on, the pulse fed back from the gate 875 reverses the state of the first stage to transistor 758 marking and transistor 757 spacing.

The output of the marking side, transistor 828, of the sixth counter stage 756, is applied to the counter indicator amplifier (transistor) 891 (Fig. 34) over conductors 841, 892 and 893, which drives the indicator lamp 894. Lamp 894 is thus lighted each time the counter goes through the last half of the counting cycle (exemplified by Fig. 7A) and serves to show proper operation of the counting circuits.

As previously indicated the three thyratron print units 78, 79 and 81 (Fig. 2) contain the circuits for energizing the magnets 121 (Fig. 10) in the printer unit. Each of the units 78, 79 and 81 is associated with a particular storage and character recognition unit 67, 68 and 69 respectively. The units are identical, except that unit 81 contains two extra thyratron circuits for operating the line feed mechanism, and unit 79 contains one extra circuit for energizing the signal bell magnet. There are 26 thyratron print circuits in each unit 78, 79 and 81, twenty-five of which are being used in the embodiment according to the present invention, thus providing a maximum length of line of 75 characters.

Briefly, reviewing the relationship between the character recognition units 67, 68 and 69, and the thyratron print units 78, 79 and 81, it is recalled that the unit 67 controls the print circuits of unit 78; unit 68 controls unit 79 and unit 69 controls unit 81. For example, the pulse sent out from the printing distributor circuit 501 (Fig. 23) through terminal 534 (Fig. 26) is used to prime one of the control grids of the first thyratron circuit in the thyratron print circuit unit 78. Then, when there is a matching of characters (under the control of the binary counter 77) as previously described, the character recognition pulse, which goes through terminal 497 (Fig. 26) to the thyratron unit (through terminal 997, as will presently appear) and is impressed on the other control grid of all thyratrons in the unit 78, fires that thyratron in unit 78 that has been primed, and the corresponding character is printed by the print hammer magnet to which said thyratron is connected.

Specifically, having reference to Figs. 36, 37 and 38, which conjoin as shown in Fig. 39, to illustrate the printing, line feed and signal bell circuits, the priming potentials for grid 931 of each of the 25 printing thyratrons 901–925 are brought in through terminals 1001 to 1025, respectively, from the associated storage and character recognition unit 67, 68 or 69. As previously described, these potentials are derived from the printing distributor elements 501 to 525, respectively (Figs. 23 to 26). The pulses from terminals 1001 to 1025 are delivered over conductors 1101 to 1125 to the grids 931 of their respective thyratrons 901 to 925. The outputs of thyratrons 901 to 925, as will presently appear, are delivered over conductors 1201 to 1225, respectively, to terminals 1301 to 1325 (Fig. 38) from whence they are delivered to the respective print magnet 121.

For example, the printing of the first character in a line is controlled by unit 67, so the first element 501 of the printing distributor 501–521 of unit 67 applies a −7 volt priming potential to terminal 1001 of the print circuit unit. This pulse is delivered to grid 931 of thyratron 901 by means of voltage divider 932 and 933 raising the grid potential from −8 volts to −2 volts. Thyratron 901, therefore, is primed for eventual firing by the character recognition pulse that comes into terminal 997 (Fig. 38) from terminal 497 (Fig. 26) and is delivered over conductor 934 to the several thyratrons 901 to 925. All the other thyratrons have −8 volts on their grids 931, because their respective printing distributor elements apply −17 volts to the grid output circuits. The −8 volts keeps these thyratrons from being fired.

Basically, under quiescent conditions, thyratron 901 is not conducting, and capacitor 935, connecting to its anode, is charged to a full 300 volts. Upon receipt of a character recognition pulse over conductor 934, with grid 931 primed to −2 volts, the thyratron 901 is fired, and the plate potential drops instantaneously from +300 volts to about +10 volts. Capacitor 935 immediately begins to discharge through the print magnet 121 associated therewith, while thyratron 901 remains conducting, passing current both from resistor 936 and capacitor 935. The inductance and resistance of the print magnet 121, the capacitance of capacitor 935, and the low resistance of the fired thyratron 901 form a series resonant circuit that is less than critically damped. Resistor 936, being a relatively large resistance, does not appreciably affect the operation of the resonant circuit, but does supply current to the thyratron until the capacitor discharge current builds up.

Initially, all the energy is stored in capacitor 935. The discharge of capacitor 935 builds up the pulse of current that flows through the magnet 121 and the thyratron 901. When the current reaches a peak, all the energy that was available in the capacitor has been transferred to the magnetic field of the magnet 121. The current then begins to decrease, but the action of the inductance is to try to keep it flowing in the same direction, thus charging capacitor 935 in the opposite direction to its original condition. The collapse of the magentic field delivers energy back to the capacitor, and the point is soon reached where the current in the coil again is zero. Due to losses in the circuit, the peak voltage across the charged capacitor is only a fraction of the original potential difference. Capacitor 935 then discharges again, but in the opposite direction to the original discharge. Since this discharge current is in the wrong direction to pass through the thyratron, it is drawn from the +300 volt power supply through resistor 936 causing an increased drop across resistor 936. This drives the plate of thyratron 901 in the negative direction and extinguishes the thyratron. Capacitor 935 continues to discharge through the zero potential condition and then recharges through resistor 936 and the print magnet 121 to the original +300 volts.

With the low resistance of the conducting thyratron 901 removed from the circuit, the large resistance of resistor 936 now becomes dominant and takes the resonant circuit out of the oscillatory condition and puts it in the overdamped condition. Therefore, after the thyratron 901 is extinguished, capacitor 935 recharges exponentially with the value of resistor 936 being a controlling factor in the rate of charge. Resistor 936 is adjustable so that the value of the recharging current can be varied. Since the charging current also flows through the print magnet 121, it produces an exponentially decaying magnetic field which exerts a small force on the print magnet armature. By this time, the armature has almost been attracted as the result of the initial current pulse, which was in the form of the first half cycle wave of a damped oscillation. The recharge current that follows the operating current pulse has a negligible effect on the armature pull up. It does, however, affect the armature return. The proper value of recharge current decreases the armature return velocity and aids in suppressing a bounce that could occur if the armature returned to its rest position at a high velocity. Resistor 936 may be adjusted so as to provide maximum effect in suppressing bounce.

The foregoing description of the basic thyratron circuit was given for thyratron 901 by way of example. Thyratrons 902 to 925, of course, function similarly under analogous conditions. As previously mentioned, the outputs of thyratrons 901 to 925 are delivered over conductors 1201 to 1225, respectively, to terminals 1301 to 1325, respectively, from whence they are cabled to their respective print magnets 121 in the printing unit.

A twenty-sixth thyratron, 926, is provided for those circumstances when a 78 character line is desired. Thyratron 926 is energized by signals appearing at terminal 1026 and applied over conductor 1126 to grid 931. The output of thyratron 926 is over conductor 1226 to terminal 1326 and thence to corresponding magnet 121 in the printing unit.

The signal bell circuit, comprising thyratron 951, is a thyratron circuit that is substantially identical to the previously described print circuit. The principal differences are that grid 952 is strapped to the cathode, meaning that only a pulse on grid 953 is required to fire the tube (thyratron 951); and that the output from capacitor 954 goes out over conductor 948 and through terminal 949 to the operating magnet (not shown) of the signal bell mechanism, which is mounted in the printing unit cabinet. The positive going firing pulse (−19 volts to −7 volts, for example) for thyratron 951 comes from the signal bell recognition gate 559 (Fig. 30) in the control unit 71 through terminal 668 (Fig. 30) to terminal 955 (Fig. 38) and over conductor 956, and is differentiated into a positive spike by capacitor 957. Resistors 958 and 959 bias grid 953 of thyratron 951 to −6 volts.

The signal bell thyratron circuit just described (comprising thyratron 951) is located in unit 79 and is shown within a dotted line block 961 (Fig. 38).

The line feed circuit comprising thyratrons 962 and 963 is located in unit 81 and is shown within a dotted line block 964 (Fig. 38). Thyratron 962 occupies the same space in unit 81 that the signal bell thyratron 951 occupies in unit 79. Thyratron 962 is used to energize the line feed magnet 181 (Fig. 9) on the printer unit, by discharging capacitors 965 and 966, and thyratron 963 is used to recharge said capacitors 965 and 966.

The operation of thyratron 962 is substantially identical to that of the afore-described print circuits, except that only one input is required for firing. This input comes from the line feed recognition circuit in the control unit 71, exemplified by line feed recognition gate 557 (Fig. 30), and through terminal 722 (Fig. 30) to terminal 967 (Fig. 39) and over conductor 968. This input (pulse) is a positive going pulse swinging from −20 volts to 0 volts, which pulse is differentiated by capacitor 969 into a sharp spike. The plate of thyratron 962 is connected over conductor 971 to terminal 972, from whence it goes to the line feed magnet 181 (Fig. 9).

The return from magnet 181 comes in on terminal 973 (Fig. 38) and connects over conductor 974 to parallelly connected capacitors 965 and 966 (totaling 5 mf). It is observed that this is the same general circuit as the print circuit, except that in the print circuit the circuit is completed through a capacitor attached to a thyratron anode, thence through the winding of the print magnet 121 to ground, as shown in Fig. 2, while in the line feed circuit, the circuit extends from the thyratron anode through the winding of the line feed magnet 181 and returns to terminal 973, and thence over conductor 974 to capacitors 965 and 966, the other terminals of which are grounded. The resulting current pulse energizes the line feed magnet 181, whose armature trips the line feed clutch, as previously described. The capacitors 965 and 966 would not recharge fast enough if allowed to recharge through a plate circuit resistor, as in the print circuits. Therefore, thyratron 963 is used to recharge the capacitors from +300 volts through resistor 975. Resister 975 is adjusted low enough to enable fast recharge. Thyratron 963 is fired by a 20 volt pulse (−20 to 0 volts) which comes from the line feed circuits of the control unit 71. This pulse comes in on terminal 976, and over conductor 977, and is differentiated into a positive spike by capacitor 978. This pulse lags the line feed pulse by 4 milliseconds, and is necessary in order to allow thyratron 962 to be extinguished. Grid 979 of thyratron 963 is biased to −45 volts through resistor 981. It is noted that when thyratron 962 is extinguished the potential on the cathode of thyratron 963 is approximately −40 volts and begins to climb exponentially toward +300 volts, as capacitors 965 and 966 charge. This rate of charge is determined by resistor 982. When the recharge pulse fires thyratron 963, the majority of the recharge current comes through thyratron 963, with the lower resistance of resistor 975 accelerating the recharge of capacitors 965 and 966. Thyratron 963 conducts until the capacitors are charged, at which time there is no more plate to cathode potential to sustain conduction. The 6.3 volt A.C. filament voltage for thyratron 963 comes from a separate, floating, transformer secondary in the power supply (not shown). This is necessary because the cathode to filament potential may be +300 volts and this would have damaging effect on the thyratron. Therefore, the cathode is connected to one side of the filament. This is indicated by numeric 983 in Fig. 38.

Although a specific embodiment of the invention has been shown and described, it will be understood that this embodiment is but illustrative, and that various modifications may be made therein without departing from the scope and spirit of the invention.

What is claimed is:

1. In combination, selective signal condition receiving means a printer having a constantly rotating typewheel, binary counting means controlled by said impulse generating means and including facilities for establishing signal conditions corresponding in selective attributes to those receivable by said receiving means, an impulse generating means secured to said typewheel, and matching means controlled jointly by said receiving means and said binary counting means to determine, upon a coincidence of like signal conditions from said receiving means and said binary counting means, the character to be recorded according to the position of the typewheel when said jointly controlled means recognizes a predetermined condition of said impulse generating means in relation to a signal received by said signal receiving means.

2. In combination, selective signal condition receiving means, a printer having a constantly rotating typewheel, a timing means comprising magnetic pickup instrumentalities secured to said typewheel, binary counting means controlled by said instrumentalities and including facilities for establishing signal conditions corresponding in selective attributes to those receivable by said receiving means, and matching means controlled jointly by said receiving means and said binary counting means to determine, upon a coincidence of like signal conditions from said receiving means and said binary counting means, the character to be recorded according to the position of the typewheel when said jointly controlled means recognizes a predetermined condition of said binary counting means in relation to a signal received by said signal receiving means.

3. In combination, means for receiving selective signal conditions, a printer having a constantly rotating typewheel, an impulse generating means secured to said typewheel, binary counting means controlled by said impulse generating means and including facilities for establishing signal conditions corresponding in selective attributes to those receivable by said receiving means, and matching means controlled jointly by said received signals and said binary counting means to determine, upon a coincidence of received signal conditions with a corresponding signal condition established in said binary counting means, the character to be recorded according to the position of the typewheel when said jointly controlled means recognizes a predetermined condition of said binary counting means in relation to a signal received by said signal receiving means.

4. In combination, means for receiving selective signal conditions, a printer having a constantly rotating typewheel, recording means in said printer cooperable with said typewheel to effect a printing operation, an impulse generating means secured to said typewheel, binary counting means controlled by said impulse generating means and including facilities for establishing signal conditions corresponding in selective attributes to those receivable by said receiving means, printing control means for governing the operation of said recording means, and matching means controlled jointly by said received signals and said binary counting means to activate said printing control means upon a coincidence of like signal conditions from said signal receiving means and said binary counting means, whereby said recording means is effective to record a character according to the position of the typewheel when the jointly controlled means recognizes a predetermined condition of said binary counting means in relation to a signal received by said signal receiving means.

5. In combination, means for receiving selective signal conditions, a recorder having a constantly rotating typewheel, recording means in said recorder cooperable with said typewheel to effect a recording operation, an impulse generating means secured to said typewheel, binary counting means controlled by said impulse generating means and including facilities for establishing signal conditions corresponding in selective attributes to those receivable by said receiving means, a thyratron control circuit for governing the operation of said recording means, and matching means controlled jointly by said signal receiving means and said binary counting means to activate said thyratron control circuit upon a coincidence of like signal conditions from said signal receiving means and said binary counting means, whereby said recording means is effective to record a character according to the position of the typewheel when said jointly controlled means recognizes a predetermined condition of said binary counting means in relation to a signal received by the signal receiving means.

6. In combination, means for receiving signal conditions, a recorder having a constantly rotating typewheel, recording means in said recorder cooperable with said typewheel to effect a recording operation, an impulse generating means secured to said typewheel, means to store signals received by said signal receiving means, signal matching means, binary counting means governed by said impulse generating means to control said matching means, and print control means effective upon a coincidence of like signal conditions in said matching means and said storing means to determine the character to be recorded according to the position of the typewheel when the signal matching means recognizes a matching of the condition of said binary counting means with a signal stored in said signal storing means.

7. In combination, signal receiving means, a recorder having a constantly rotating typewheel, recording means in said recorder cooperable with said typewheel to effect a recording operation, an impulse generating means secured to said typewheel, means to store signals received by said signal receiving means, signal matching means associated with said storing means, binary counting means governed by said impulse generating means to control said matching means, a thyratron control circuit for governing the operation of said recording means, and means effective upon a coincidence of like signal conditions in said matching means and said storing means to activate said thyratron control circuit, whereby said recording means is effective to record a character according to the position of the typewheel when said signal matching means recognizes a matching of the condition of the binary counting means with a signal stored in the signal storing means.

8. In combination, signal receiving means, a recorder having a constantly rotating typewheel, recording means in said recorder cooperable with said typewheel to effect a recording operation, a timing means comprising a magnetic pickup device secured to said typewheel for generating control impulses, binary counting means controlled by said control impulses and including facilities for establishing signal conditions a thyratron control circuit for governing the operation of said recording means, and means controlled jointly by said signal receiving means and said binary counting means to activate said thyratron control circuit upon a coincidence of like signal conditions from said signal receiving means and said binary counting means, whereby said recording means is effective to record a character according to the position of the typewheel when said jointly controlled means recognizes a predetermined condition of said binary counting means in relation to a signal received by said signal receiving means.

9. In combination, signal receiving means, a recorder having a constantly rotating typewheel, recording means in said recorder cooperable with said typewheel to effect a recording operation, indexing means comprising a magnetic pickup device secured to said typewheel for generating control impulses, binary counting means controlled by said control impulses, and including facilities for establishing signal conditions, a thyratron control circuit for governing the operation of said recording means, and means controlled jointly by said signal receiving means and said binary counting means to activate said thyratron control circuit upon a coincidence of like signal conditions from said signal receiving means and said binary counting means, whereby said recording means is effective to record a character according to the position of the typewheel when the jointly controlled means recognizes a predetermined condition of said binary counting means in relation to a signal received by said signal receiving means.

10. In combination, signal receiving means, a recorder having a constantly rotating typewheel, recording means in said recorder cooperable with said typewheel to effect a recording operation, a timing means comprising a magnetic pickup device secured to said typewheel for generating control impulses, means to store signals received by said signal receiving means, signal matching means, binary counting means governed by said control impulses to control said matching means, a thyratron control circuit for governing the operation of said recording means, and means effective upon a coincidence of like signal conditions in said matching means and said storing means to activate said thyratron control circuit, whereby said recording means is effective to record a character according to the position of the typewheel when the signal matching means recognizes a matching of the condition of the binary counting means with a signal stored in said signal storing means.

11. In combination, signal receiving means, a recorder including a typewheel having a predetermined series of character elements arranged around its periphery, recording means including a print hammer cooperable with said typewheel to effect a printing operation, means to cause said predetermined series of elements to make a continuous traversal past said print hammer, an impulse generating means secured to said typewheel, binary counting means controlled by said impulse generating means and including facilities for establishing signal conditions, printing control means for governing the operation of said recording means, and matching means controlled jointly by said signal receiving means and said binary counting means to activate said printing control means upon a coincidence of like signal conditions from said signal receiving means and said binary counting means, whereby said recording means is effective to record a character according to the position of the typewheel when the jointly controlled means recognizes a predetermined condition of said binary counting means in relation to a signal received by said signal receiving means.

12. In combination, signal receiving means, a recorder including a typewheel having a predetermined series of character elements around its periphery, recording means including a print hammer cooperable with said typewheel to effect a printing operation, means to cause said predetermined series of elements to make a continuous traversal past said printing hammer, an impulse generating means secured to said typewheel, binary counting means controlled by said impulse generating means and including facilities for establishing signal conditions, a thyratron control circuit for governing the operation of said recording means, and matching means controlled jointly by said signal receiving means and said binary counting means to activate said thyratron control circuit upon a coincidence of like signal conditions from said signal receiving means and said binary counting means, whereby said recording means effectuates a printing operation whenever a received signal corresponds to the character element in registration with the print hammer.

13. In combination, means for receiving code signals having permutations of marking and spacing attributes, a recorder having a constantly rotating typewheel, recording means in said recorder cooperable with said typewheel to effect a recording operation, an impulse generating means secured to said typewheel, means comprising a plurality of bi-stable devices adapted to store said received code signals according to the marking and spacing attributes of said signals, means comprising a corresponding plurality of signal matching gates associated with said storing means, binary counting means controlled by said impulse generating means and including facilities for establishing code signal conditions comprising permutations of marking and spacing attributes to control said matching gates, printing control means for governing the operation of said recording means, and means effective in response to a coincidence of marking and spacing attributes on corresponding ones of said storage devices and said gates to activate said printing control means, whereby said recording means is effective to record a character according to the position of the typewheel when the matching gates recognize a matching of a predetermined condition of the binary counting means with the marking and spacing attributes of a signal stored in the bi-stable storing devices.

14. In combination, means for receiving code signals having permutations of marking and spacing attributes, a recorder including a typewheel having a predetermined series of character elements around its periphery, recording means including a print hammer cooperable with said typewheel to effect a printing operation, means to cause said predetermined series of elements to make a continuous traversal past said printing hammer, an impulse generating means secured to said typewheel, means comprising a plurality of bi-stable devices adapted to store said received signals according to the marking and spacing attributes of said signals, means comprising a corresponding plurality of signal matching gates associated with said storing means, binary counting means controlled by said impulse generating means and including facilities for establishing code signal conditions comprising permutations of marking and spacing attributes to control said matching gates, printing control means for governing the operation of said recording means, and means effective in response to a coincidence of marking and spacing attributes on corresponding ones of said storage devices and said gates to activate said printing control means, whereby said recording means effectuates a printing operation whenever a received signal corresponds to the character element in registration with the print hammer.

15. In combination, means for receiving code signals having permutations of marking and spacing attributes, a recorder including a typewheel having a predetermined series of character elements around its periphery, recording means including a print hammer cooperable with said typewheel to effect a printing operation, means to cause said predetermined series of elements to make a continuous traversal past said print hammer, an impulse generating means secured to said typewheel, means comprising a plurality of bi-stable devices adapted to store said received signals according to the marking and spacing attributes of said signals, means comprising a corresponding plurality of signal matching gates associated with said storing means, binary counting means controlled by said impulse generating means and including facilities for establishing code signal conditions comprising permutations of marking and spacing attributes to control said matching gates, a thyratron control circuit for governing the operation of said recording means, and means effective in response to a coincidence of marking and spacing attributes on corresponding ones of said storage devices and said gates to activate said thyratron control circuit, whereby said recording means effectuates a printing operation whenever a received signal corresponds to the character element in registration with the print hammer.

16. In combination, signal receiving means for receiving code signal conditions comprising permutations of marking and spacing attributes, a recorder including a type carrier having a plurality of circumferential rows of character elements, said rows arranged in a plurality of groups, juxtapositioned ones of said rows being identifiable with different ones of said groups, recording means including a plurality of print hammers, one individual to each of said rows, means to cause said circumferential rows of character elements to make a continuous traversal past their respective print hammers, an impulse generating means secured to said type carrier, binary counting means controlled by said impulse generating means and including facilities for establishing code signal conditions comprising permutations of marking and spacing attributes, printing control means associated with each of said groups, a storage and recognition means comprising code signal matching facilities associated with each of said groups, said storage and recognition means controlled jointly by said received signals and said binary counting means to activate said printing control means upon a coincidence of like code signal conditions from said signal receiving means and said binary counting means, and control means cooperable with said jointly controlled means for selecting the print hammer of the group wherein printing will be effected, whereby the recording means effectuates the printing operation solely in said selected group whenever a received signal corresponds to the character element in registration with the print hammer.

17. In combination, signal receiving means for receiving signal conditions comprising permutations of marking and spacing attributes, a recorder including a typewheel having a predetermined series of character elements around its periphery, recording means including a print hammer cooperable with said typewheel to effect a printing operation, means to cause said predetermined series of elements to make a continuous traversal past said print hammer, binary counting means including facilities for establishing signal conditions comprising permutations of marking and spacing attributes, indexing means secured to said typewheel and movable therewith, instrumentalities carried on said indexing means severally coincident with the character elements on said typewheel, magnetic pickup means cooperable with said instrumentalities to generate impulses for controlling said binary counting means, printing control means for governing the operation of said recording means, and matching means controlled jointly by said signal receiving means and said binary counting means to activate said printing control means upon a coincidence of like signal conditions from said signal receiving means and said binary counting means, whereby said recording means effectuates a printing operation whenever a received signal corresponds to the character element in registration with the print hammer.

18. In combination, signal receiving means for receiving code signal conditions comprising permutations of marking and spacing attributes, a recorder including a type carrier having a plurality of circumferential rows of character elements assigned to groups, each row in each group being non-juxtapositioned to other rows in the same group, a plurality of printing means, one individual to each row, means to cause said character elements to make a continuous traversal past said printing means, an impulse generating means secured to said type carrier, storing means for each group comprising a plurality of bi-stable devices adapted to store signals received by said signal receiving means, matching means for each group comprising a corresponding plurality of signal matching gates associated with their respective storing means, binary counting means controlled by said impulse generating means and including facilities for establishing code signal conditions comprising permutations of marking and spacing attributes to control all of said matching gates, a thyratron control circuit for each group for governing the operation of the printing means of that group, a control circuit, a ring-type multistage distributor for each group controlled by said control circuit for conditioning said thyratron circuit for operation, and means effective upon a coincidence of like code signal conditions in said bi-stable devices and said matching gates to generate a firing impulse to establish the operation of said thyratron control circuit, whereby said printing means effectuates a printing operation whenever a received signal corresponds to the character element in registration with the printing means.

19. In combination, means for receiving code signals having permutations of marking and spacing attributes, a recorder including a type carrier having a plurality of circumferential rows of character elements assigned to groups, each row in each group being non-juxtapositioned to other rows in the same group, a plurality of printing means, one individual to each row, means to cause said character elements to make a continuous traversal past said printing means, an impulse generating means secured to said type carrier, means comprising a plurality of groups of bi-stable devices adapted to store code signals received by said receiving means according to the marking and spacing attributes of said received signals, means comprising a corresponding plurality of groups of signal matching gates associated with said storing means, a binary counting means controlled by said impulse generating means and including facilities for establishing signal conditions comprising permutations of marking and spacing attributes to control all of said groups of matching gates simultaneously, and a control unit cooperable with said binary counting means, whereby the group in which printing occurs is controlled by said control unit, and the sequence of printing in said groups is controlled by said binary counting means and said signal receiving means upon a coincidence of like signal conditions in said bi-stable devices and said matching gates.

20. In combination, signal receiving means for receiving code signal conditions comprising permutations of marking and spacing attributes, a recorder having a constantly rotatable typewheel, means in said recorder cooperable with said typewheel to effect a recording operation, an impulse generating means secured to said typewheel, binary counting means controlled by said impulse generating means and including facilities for establishing code signal conditions comprising permutations of marking and spacing attributes, and means comprising storage facilities adapted to be conditioned by signals received by said signal receiving means and character recognition facilities adapted to be conditioned by said binary counting means, whereby in response to a coincidence of like code signal conditions from said signal receiving means and said binary counting means said recording means is effective to record a character according to the position of the typewheel when the coincidence occurs.

21. In combination, signal receiving means for receiving code signal conditions comprising permutations of marking and spacing attributes, a recorder having a constantly rotatable typewheel, means in said recorder cooperable with said typewheel to effect a recording operation, an impulse generating means secured to said typewheel, binary counting means controlled by said impulse generating means and including facilities for establishing code signal conditions comprising permutations of marking and spacing attributes, a thyratron control circuit for governing the operation of said recording means, and means comprising storage facilities adapted to be conditioned by signals received by said signal receiving means and character recognition facilities adapted to be conditioned by said binary counting means, whereby in response to a coincidence of like code signal conditions from said signal receiving means and said binary counting means said thyratron control circuit is activated to render said recording means effective to record a character according to the position of the typewheel when the coincidence occurs.

22. In combination, means for receiving signals having permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, an impulse generating means secured to said type carrier, storing means for each group comprising a plurality of bi-stable devices adapted to store said received signals according to the marking and spacing attributes of said signals, matching means for each group comprising a corresponding plurality of signal matching gates associated with their respective bi-stable devices, binary counting means controlled by said impulse generating means and including facilities for establishing signal conditions comprising permutations of marking and spacing attributes to control all of said matching gates simultaneously, a thyratron control circuit for each group, and control means effective conjointly with said received signals and said binary counting means to activate one of said thyratron control circuits upon a coincidence of like signal conditions in said bi-stable devices and said matching gates, whereby recording is effected in said groups according to the sequential order of traversal of said character elements past said printing means.

23. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, impulse generating means secured to said type carrier, storage facilities for each group adapted to be conditioned by said received signals, matching means for each group adapted to be operably associated respectively with said storage facilities, binary counting means controlled by said impulse generating means and including facilities for establishing signal conditions comprising permutations of marking and spacing attributes to control all of said matching means simultaneously, a thyratron control circuit for each group, and control means effective conjointly with said received signals and said binary counting means to activate one of said thyratron control circuits upon a coincidence of like signal conditions in said storage facilities and said matching means, whereby recording is effected in said groups according to the sequential order of traversal of said character elements past said printing means.

24. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, impulse generating means secured to said type carrier, storage facilities for each group adapted to be conditioned by said received signals, matching means for each group adapted to be operably associated respectively with said storage facilities, binary counting means controlled by said impulse generating means and including facilities for establishing signal conditions comprising permutations of marking and spacing attributes to control all of said matching means simultaneously, a thyratron control circuit for each group, a ring-type multistage distributor for each group having one stage corresponding to each thyratron in its associated thyratron control circuit, and control means for applying a series of operating pulses to said distributor to render the operating stage nonoperative and the next succeeding stage operative to condition respective thyratrons for operation, said control means effective conjointly with said received signals and said binary counting means to activate said conditioned thyratron upon a coincidence of like signal conditions in said storage facilities and said matching means, whereby recording is effected in said groups according to the sequential order of traversal of said character elements past said printing means.

25. In combination, means for receiving signals having permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, an impulse generating means secured to said type carrier, storing means for each group comprising a plurality of bi-stable devices adapted to store said received signals according to the marking and spacing attributes of said signals, matching means for each group comprising a corresponding plurality of signal matching gates associated with their respective bistable devices, binary counting means controlled by said impulse generating means and including facilities for establishing signal conditions comprising permutations of marking and spacing attributes to control all of said matching gates simultaneously, a thyratron control circuit for each group, a ring-type multistage distributor for each group having one stage corresponding to each thyratron in its associated thyratron control circuit, and control means for applying a series of operating pulses to said distributor to render the operating stage nonoperative and the next succeeding stage operative to condition respective thyratrons for operation, said control means effective conjointly with said received signals and said binary counting means to activate said conditioned thyratron upon a coincidence of like signal conditions in said bi-stable devices and said matching gates, whereby recording is effected in said groups according to the sequential order of traversal of said character elements past said printing means.

26. In combination, signal receiving means for receiving signal conditions comprising permutations of marking and spacing attributes, a recorder having a constantly rotatable typewheel, means in said recorder cooperable with said typewheel to effect a recording operation, an impulse generating means secured to said typewheel, binary counting means controlled by said impulse generating means and including facilities for establishing signal conditions comprising permutations of marking and spacing attributes, a thyratron control circuit for governing the operation of said recording means, a ring-type multistage distributor having one stage corresponding to each thyratron in said thyratron control circuit, matching means comprising storage facilities adapted to be conditioned by said received signals and including character recognition facilities adapted to be conditioned by said binary counting means, and control means for applying a series of operating pulses to said distributor to render the operating stage nonoperative and the next succeeding stage operative to condition respective thyratrons for operation, said control means effective conjointly with said received signals and said binary counting means to activate said conditioned thyratron upon a coincidence of like signal conditions in said storage facilities and said character recognition facilities to record a character according to the position of the typewheel when said control means recognizes a predetermined condition of said binary counting means in relation to a signal received by said signal receiving means.

27. In a transistorized telegraph system, a signal channel, key operated means for generating a single impulse upon each key operation, a diode converter for converting said single impulse into plural-unit permutation code signals on a parallel channel basis, transistorized transmitting means comprising bi-stable facilities for effecting a parallel-to-series conversion of said code signals for transmission over said signal channel, said transmitting means including facilities for adding start and stop impulses to said code signals, transistorized receiving means including bi-stable facilities for receiving and storing said code signals, matching means comprising a plurality of signal matching gates associated respectively with said receiving and storing facilities, a recorder having a constantly rotatable typewheel, means in said recorder cooperable with said typewheel to effect a recording operation, an impulse generating means secured to said typewheel, binary counting means comprising transistorized facilities controlled by said impulse generating means and including facilities for establishing code signals comprising permutations of marking and spacing attributes for controlling said matching means, printing control means for governing the operation of said recording means, and transistorized control means governed by said stop impulses, said control means effective pursuant to a code signal coincidence in said storing bi-stable facilities and said matching gates to activate said printing control means, whereby said recording means effectuates a printing operation to record a character according to the position of the typewheel when the coincidence occurs.

28. In a transistorized telegraph system, a signal channel, key operated means for generating a single impulse upon each key operation, a diode converter for converting said single impulse into plural-unit permutation code signals on a parallel channel basis, transistorized transmitting means comprising bi-stable facilities for effecting a parallel-to-series conversion of said code signals for transmission over said signal channel, said transmitting means including facilities for adding start and stop impulses to said code signals, transistorized receiving means including a plurality of groups of bi-stable facilities for receiving and storing said code signals, matching means comprising a corresponding plurality of signal matching gates associated respectively with said receiving and storing facilities, a recorder including a type carrier having a plurality of like circumferential rows of character elements assigned to said plurality of groups, each row in each group being non-juxtapositioned to other rows in the same group, a plurality of printing means, one individual to each row, means to cause said character elements to make a continuous traversal past said printing means, impulse generating means secured to said type carrier, binary counting means comprising transistorized facilities controlled by said impulse generatng means and including facilities for establishing code signals comprising permutations of marking and spacing attributes for controlling all of said matching means simultaneously, printing control means for governing the operation of said printing means, and transistorized control means governed by said stop impulses, said control means effective pursuant to a code signal coincidence in said bi-stable facilities and said matching gates to activate said printing control means, whereby recording is effected in said groups according to the sequential order of traversal of said character elements past said printing means.

29. In combination, signal receiving means for receiving signal conditions comprising permutations of marking and spacing attributes, a recorder including a typewheel having a predetermined series of character elements around its periphery, recording means including a print hammer cooperable with said typewheel to effect a printing operation, means to cause said predetermined series of elements to make a continuous traversal past said print hammer, binary counting means including facilities for establishing signal conditions comprising permutations of marking and spacing attributes, indexing means secured to said typewheel for movement therewith, instrumentalities carried on said indexing means, certain of said instrumentalities coincident severally with the character elements on said typewheel, other of said instrumentalities interjacent said certain of said instrumentalities for controlling recorder functions, magnetic pickup means cooperable with said instrumentalities to generate impulses for controlling said binary counting means, printing control means controlled by said certain of said instrumentalities for governing the operation of said recording means, function control means controlled by said other of said instrumentalities for inhibiting the operation of said printing control means under certain predetermined operating conditions, and means controlled jointly by said signal receiving means and said binary counting means to activate said printing control means upon a coincidence of like signal conditions from said signal receiving means and said binary counting means, whereby said recording means effectuates a printing operation whenever a received signal corresponds to the character element in registration with the print hammer.

30. In a transistorized telegraph system, a signal channel, key operated means for generating a single impulse upon each key operation, a diode converter for converting said single impulses into plural-unit permutation code signals on a parallel channel basis, transistorized transmitting means comprising bi-stable facilities for effecting a parallel-to-series conversion of said code signals for transmission over said signal channel, said transmitting means including facilities for adding start and stop impulses to said code signals, transistorized receiving means including a plurality of storage units, each unit comprising bi-stable devices for receiving and storing said code signal impulses, a gating circuit operably associated with each of said devices, a control unit governed by said stop impulses, and means in said control unit for generating transfer pulses to be applied to said gating circuits to effect with said signal impulses a coincidence to effectuate the storage of said received impulses in said bi-stable devices.

31. In a transistorized telegraph system, a signal channel, key operated means for generating a single impulse upon each key operation, a diode converter for converting said single impulses into plural-unit permutation code signals on a parallel channel basis, transistorized transmitting means comprising bi-stable facilities for effecting a parallel-to-series conversion of said code signals for transmission over said signal channel, said tranmitting means including facilities for adding start and stop impulses of said code signals, transistorized receiving means including a plurality of storage units, each unit comprising bi-stable devices for receiving and storing said code signal impulses, a coincident "and" gate operably associated with each of said devices, a control unit governed by said stop impulses, means in said control unit for generating transfer pulses to be applied to said "and" gates to effect with said signal impulses a coincidence to effectuate the storage of said received impulses in said bi-stable devices, matching means comprising a plurality of signal matching gates associated respectively with said bi-stable devices, a recorder including a type carrier having a plurality of like circumferential rows of character elements assigned to said plurality of groups, each row in each group being non-juxtapositioned to other rows in the same group, a plurality of printing means, one individual to each row, means to cause said character elements to make a continuous traversal past said printing means, impulse generating means secured to said type carrier, binary counting means comprising transistorized facilities controlled by said impulse generating means for controlling all of said matching means simultaneously, printing control means for governing the operation of said printing means, and transistorized means in said control means effective pursuant to a code signal coincidence in said bi-stable devices and said matching gates to activate said printing control means, whereby recording is effected in said groups according to the sequential order of traversal of said character elements past said printing means.

32. In a transistorized telegraph system, a signal channel, key operated means for generating a single impulse upon each key operation, a diode converter for converting said single impulses into plural-unit permutation code signals on a parallel channel basis, transistorized transmitting means comprising bi-stable facilities for effecting a parallel-to-series conversion of said code signals for transmission over said signal channel, said transmitting means including facilities for adding start and stop impulses to said code signals, transistorized receiving means including a plurality of storage units, each unit comprising bi-stable devices for receiving and storing said code signal impulses, a coincident "and" gate operably associated with each of said devices, a control unit governed by said stop impulses and containing input facilities related derivatively to said bi-stable devices in said receiving means, said input facilities having marking and spacing potentialities, means in said control unit for generating transfer pulses to be applied to said "and" gates to effect with said signal impulses a coincidence to effectuate the storage of said received impulses in said bi-stable devices, matching means comprising a plurality of signal matching gates associated respectively with said bi-stable devices, a recorder including a type carrier having a plurality of like circumferential rows of character elements assigned to said plurality of groups, each row in each group being non-juxtapositioned to other rows in the same group, a plurality of printing means, one individual to each row, means to cause said character elements to make a continuous traversal past said printing means, impulse generating means secured to said type carrier, binary counting means comprising transistorized facilities controlled by said impulse generating means for controlling all of said matching means simultaneously, printing control means for governing the operation of said printing means, transistorized means in said control means effective pursuant to a code signal coincidence in said bi-stable devices and said matching gates to generate a printing impulse to activate said printing control means, whereby recording is effected in said groups according to the sequential order of traversal of said character elements past said printing means, and a plurality of function recognition gates in said control unit, each of said function recognition gates comprising a group of diodes connected to said input facilities in permuted manner according to the code of the function to be recognized.

33. A system as defined in claim 32 including transistorized means in said control unit for inhibiting said transfer and printing impulses to prevent printing and spacing operations during a function operation.

34. A system as defined in claim 32 including a space recognition gate in said control unit, said gate responsive to the space code signal to prevent printing during the consummation of the spacing function.

35. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, printing control means for each group, means to cause said character elements to make a continuous traversal past said printing means, storage facilities for each group adapted to be conditioned by said received signals, matching means for each group adapted to be operably associated respectively with said storage facilities, binary counting means including electronic facilities for establishing signal conditions comprising permutations of marking and spacing attributes, indexing means secured to said type carrier for generating index pulses to drive said binary counting means in accordance with the consecutive positionment of the character elements on said type carrier, said binary counting means adapted to electronically inform said matching means as to which character element on said type carrier is in printing position, control means effective conjointly with said received signals and said binary counting means to activate said printing control means upon a coincidence of like signal conditions from said signal receiving means and said binary counting means, whereby a number of printing operations equal to the number of groups may be effected during one revolution of the type carrier, and zeroizing means on said indexing means effective automatically for setting said binary counting means to zero to synchronize the consecutive counting operation of said binary counting means with said type carrier positionment.

36. In a transistorized telegraph system, a signal channel, a key actuated means for impressing signals on said signal channel comprising means for storing each element of a multi-element signal, said means effective to maintain a signal in storage until the depression of the next key clears the storage, transistorized means effective upon the depression of a key to simultaneously store the signal code pertaining thereto and release the signal according to the previously operated key from storage, a repeat key means in said key actuated means, and a gating circuit operable in response to the actuation of said repeat key means to effectuate the repeated transmission of any stored signal.

37. In a transistorized telegraph system, a signal channel, a key actuated means for impressing signals on said signal channel comprising means for storing each element of a multi-element signal, said means effective to maintain a signal in storage until the depression of the next key clears the storage, transistorized means effective upon the depression of a key to simultaneously store the signal code pertaining thereto and release the signal according to the previously operated key from storage, a repeat key means in said key actuated means, a ring type multistage distributor having one stage corresponding to each storage means, diode coincident circuits interconnecting each storage means with its corresponding distributor stage, a resistance and a single source of potential cooperating with all said coincident diode circuits to form an "or" gate, means for driving said distributor through a cycle of operation whereby said "or" gate is operated when a signal element is stored in said storage means and the corresponding distributor stage is operated, a signal generator operated by said "or" gate to impress signal conditions on said signal channel indicative of said stored signal elements, and an "and" gate circuit effective in response to the actuation of said repeat key means to effectuate the repeated transmission of any stored signal.

38. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, impulse generating means secured to said type carrier, storage facilities for each group adapted to be conditioned by said received signals, matching means for each group adapted to be operably associated respectively with said storage facilities, binary counting means controlled by said impulse generating means and including facilities for establishing signal conditions comprising permutations of marking and spacing attributes to control all of said matching means simultaneously, a thyratron control circuit for each group, a ring-type multistage distributor for each group having one stage corresponding to each thyratron in its associated thyratron control circuit, control means for applying a series of operating pulses to step said distributor to render the operating stage non-operative and the next succeeding stage operative to condition respective thyratrons for operation, said control means effective conjointly with said received signals and said binary counting means to activate said conditioned thyratron upon a coincidence of like signal conditions from said signal receiving means and said binary counting means, whereby recording is effected in said groups according to the sequential order of traversal of said character elements past said printing means, input facilities in said control unit, said input facilities having marking and spacing potentialities, function control means comprising a plurality of function recognition gates in said control means, each of said function recognition gates including a group of diodes connected to said input facilities in permuted manner according to the code of the function to be recognized for inhibiting the stepping of said distributor upon receipt of function code signals.

39. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, means to cause said character elements to make a continuous traversal past said printing means, impulse generating means secured to said type carrier, storage facilities for each group adapted to be conditioned by said received signals, matching means for each group adapted to be operably associated with said storage facilities, binary counting means controlled by said impulse generating means and including facilities for establishing signal conditions comprising permutations of marking and spacing attributes to control all of said matching means simultaneously, a thyratron control circuit for each group, a ring-type multi-stage distributor for each group having one stage corresponding to each thyratron in its associated thyratron control circuit, control means for applying a series of operating pulses to step said distributor to render the operating stage non-operative and the next succeeding stage operative to condition respective thyratrons for operation, said control means effective conjointly with said received signals and said binary counting means to activate said conditioned thyratron upon a coincidence of like signal conditions from said signal receiving means and said binary counting means, whereby recording is effected in said groups according to the sequential order of traversal of said character elements past said printing means, input facilities in said control unit, said input facilities having marking and spacing potentialities, function control means comprising a plurality of function recognition gates in said control means, each of said function recognition gates including a group of diodes connected to said input facilities in permuted manner according to the code of the function to be recognized, said plurality of function recognition gates including a "figures" recognition gate for adding an impulse indicative of upper case to all character codes subsequent to the recognition of a "figures" code signal, and a "letters" recognition gate for deleting said added impulse from all character codes subsequent to the recognition of a "letters" code signal.

40. In combination, signal receiving means for receiving signal conditions comprising permutations of marking and spacing attributes, a recorder including a type carrier having a plurality of like circumferential rows of character elements assigned to groups, each row in each group being non-juxtapositioned to other rows in the same group, a plurality of printing means, one individual to each row, printing control means for each group, means to cause said character elements to make a continuous traversal past said printing means, storage facilities for each group adapted to be conditioned by said received signals, matching means for each group adapted to be operably associated respectively with said storage facilities, binary counting means including electronic facilities for establishing signal conditions comprising permutations of marking and spacing attributes, impulse generating means secured to said type carrier for generating pulses to drive said binary counting means in accordance with the consecutive positionment of the character elements on said type carrier, said binary counting means adapted to electronically inform said matching means as to which character element on said type carrier is in printing position, and control means effective conjointly with said received signals and said binary counting means to activate, upon a coincidence of like signal conditions from said signal receiving means and said binary counting means, said printing control means, whereby a number of printing operations equal to the number of groups may be effected during one revolution of the type carrier.

41. In combination, selective signal condition receiving means, a printer having a constantly rotating type wheel and recording means therefor, an impulse generating means secured to said type wheel, character-position informing means controlled by said impulse generating means and including facilities for establishing signal conditions corresponding in selective attributes to those receivable by said receiving means, and matching means controlled jointly by said receiving means and said character-position informing means to determine, upon a coincidence of like signal conditions from said receiving means and said character-position informing means, the character to be recorded according to the position of the type wheel when said matching means recognizes a predetermined condition of said impulse generating means in relation to a signal received by said signal receiving means.

42. In combination, selective signal condition receiving means, a printer having a constantly rotating type wheel and recording means therefor, a timing means comprising magnetic pickup instrumentalities secured to said type wheel, character-position informing means controlled by said instrumentalities and including facilities for establishing signal conditions corresponding in selective attributes to those receivable by said receiving means, and matching means controlled jointly by said receiving means and said character-position informing means to determine, upon a coincidence of like signal conditions from said receiving means and said character-position informing means, the character to be recorded according to the position of the type wheel when the matching means recognizes a predetermined condition of said impulse generating means in relation to a signal received by said signal receiving means.

43. In combination, signal receiving means for receiving code signal conditions comprising permutations of marking and spacing attributes, a recorder including a type carrier having a plurality of circumferential rows of character elements assigned to groups, each row in each group being non-juxtapositioned to other rows in the same group, a plurality of printing means for each group, one individual to each row, means to cause said character elements to make a continuous traversal past said printing means, an impulse generating means secured to said type carrier, storing means for each group comprising a plurality of bi-stable devices adapted to store signals received by said signal receiving means, matching means for each group comprising a corresponding plurality of signal matching gates associated with their respective storing means, binary counting means controlled by said impulse generating means for receiving code signal conditions comprising permutations of marking and spacing attributes to control all of said matching gates, a control circuit for each group for governing the operation of the printing means of that group, a ring-type distributor for each group controlled by said control circuit for conditioning the printing means of that group successively, and means effective upon a coincidence of like code signal conditions in said bi-stable devices and said matching gates to establish an operating condition for said printing means, whereby a printing operation is effectuated in successive ones of said plurality of printing means whenever a received signal corresponds to the character element in registration with said printing means.

44. In combination, signal receiving means for receiving code signal conditions comprising permutations of marking and spacing attributes, a recorder including a type carrier having a plurality of circumferential rows of character elements assigned to groups, each row in each group being non-juxtapositioned to other rows in the same group, a plurality of printing means for each group, one individual to each row, means to cause said character elements to make a continuous traversal past said printing means, an impulse generating means secured to said type carrier, storing means for each group comprising a plurality of bi-stable devices adapted to store signals received by said signal receiving means, matching means for each group comprising a corresponding plurality of signal matching gates associated with their respective storing means, character-position informing means controlled by said impulse generating means for receiving code signal conditions comprising permutations of marking and spacing attributes to control all of said matching gates, a control circuit for each group for governing the operation of the printing means of that group, a ring-type distributor for each group controlled by said control circuit for conditioning the printing means of that group successively, and means effective upon a coincidence of like code signal conditions in said bi-stable devices and said matching gates to establish an operating condition for said printing means, whereby a printing operation is effectuated sequentially in successive ones of said plurality of printing means whenever a received signal corresponds to the character element in registration with said printing means.

References Cited in the file of this patent

UNITED STATES PATENTS

| | | |
|---|---|---|
| 1,933,650 | Bascom | Nov. 7, 1933 |
| 2,614,169 | Cohen | Oct. 14, 1952 |
| 2,668,870 | Ridler | Feb. 9, 1954 |
| 2,692,551 | Potter | Oct. 26, 1954 |
| 2,706,215 | Van Duuren | Apr. 12, 1955 |

OTHER REFERENCES

"Review of Input and Output Equipment Used in Computing System," March 1953, pages 95 to 97 and 106 to 112.

UNITED STATES PATENT OFFICE

CERTIFICATE OF CORRECTION

March 8, 1960

Patent No. 2,927,960

William Patrick Byrnes

It is hereby certified that error appears in the printed specification of the above numbered patent requiring correction and that the said Letters Patent should read as corrected below.

Column 3, line 52, for "repreats" read -- repeats --; column 22, line 25, strike out "and", second occurrence; column 23, line 27, for "frnm" read -- from --; column 31, line 39, for "occure" read -- occur --; column 32, line 42, for "o" read -- on --; line 65, for "501-521" read -- 501-525 --; column 43, line 40, after "said" strike out "storing"; column 44, line 65, for "of" read -- to --.

Signed and sealed this 11th day of April 1961.

(SEAL)
Attest:
ERNEST W. SWIDER

Attesting Officer

ARTHUR W. CROCKER
Acting Commissioner of Patents

UNITED STATES PATENT OFFICE
CERTIFICATE OF CORRECTION

Patent No. 2,927,960 March 8, 1960

William Patrick Byrnes

It is hereby certified that error appears in the above numbered patent requiring correction and that the said Letters Patent should read as corrected below.

Column 35, line 26, beginning with "1. In combination" strike out all to and including "receiving means." in line 40, same column 35, and insert instead 1. In combination, selective signal condition receiving means, a printer having a constantly rotating typewheel, an impluse generating means secured to said typewheel, binary counting means controlled by said impluse generating means and including facilities for establishing signal conditions corresponding in selective attributes to those receivable by said receiving means, and matching means controlled jointly by said receiving means and said binary counting means to determine, upon a coincidence of like signal conditions from said receiving means and said binary counting means, the character to be recorded according to the position of the typewheel when said jointly controlled means recognizes a predetermined condition of said impulse generating means in relation to a signal received by said signal receiving means.

Signed and sealed this 16th day of March 1965.

(SEAL)
Attest:

ERNEST W. SWIDER
Attesting Officer

EDWARD J. BRENNER
Commissioner of Patents